(12) United States Patent
Shimizu

(10) Patent No.: US 7,702,534 B1
(45) Date of Patent: Apr. 20, 2010

(54) MERCHANDISE PLANNING AND DEVELOPMENT SYSTEM AND METHOD FOR THE SAME, AND A COMPUTER PRODUCT

(75) Inventor: Yuji Shimizu, Nagoya (JP)

(73) Assignees: Ricoh Elemex Corporation, Nagoya-shi (JP); Ricoh Company, Limited, Tokyo (JP)

( * ) Notice: Subject to any disclaimer, the term of this patent is extended or adjusted under 35 U.S.C. 154(b) by 1652 days.

(21) Appl. No.: 09/642,227

(22) Filed: Aug. 21, 2000

(30) Foreign Application Priority Data

| Mar. 3, 2000 | (JP) | ................................ 2000-059666 |
| May 2, 2000 | (JP) | ................................ 2000-134060 |

(51) Int. Cl.
*G06F 17/30* (2006.01)
*G06F 3/00* (2006.01)
*G06Q 30/00* (2006.01)

(52) U.S. Cl. .............................. 705/10; 715/700; 705/26
(58) Field of Classification Search ................ 705/9, 705/10
See application file for complete search history.

(56) References Cited

U.S. PATENT DOCUMENTS

| 5,041,972 | A | * | 8/1991 | Frost ............................ 705/10 |
| 5,124,911 | A | * | 6/1992 | Sack ............................ 705/10 |
| 5,319,542 | A | | 6/1994 | King, Jr. et al. ................ 705/27 |
| 5,357,439 | A | * | 10/1994 | Matsuzaki et al. ............. 700/96 |
| 5,717,865 | A | * | 2/1998 | Stratmann ..................... 705/10 |
| 5,835,896 | A | | 11/1998 | Fisher et al. ................... 705/37 |
| 5,999,908 | A | * | 12/1999 | Abelow .......................... 705/1 |
| 6,012,045 | A | * | 1/2000 | Barzilai et al. ................. 705/37 |
| 6,012,051 | A | * | 1/2000 | Sammon et al. ................ 706/52 |
| 6,195,643 | B1 | * | 2/2001 | Maxwell ....................... 705/10 |
| 6,206,750 | B1 | * | 3/2001 | Barad et al. .................. 446/268 |
| 6,397,212 | B1 | * | 5/2002 | Biffar ............................. 707/5 |
| 6,526,526 | B1 | * | 2/2003 | Dong et al. .................... 714/46 |
| 6,578,014 | B1 | * | 6/2003 | Murcko, Jr. ................... 705/26 |

FOREIGN PATENT DOCUMENTS

| EP | 0 697 669 A2 | 2/1996 |
| EP | 0 866 408 A2 | 9/1998 |
| JP | 11-25161 | 1/1999 |

(Continued)

OTHER PUBLICATIONS

Anonymous, "Fresh Cargo Brand Is Renamed," Dec. 21, 1992, Supermarket News, p. 38.*

(Continued)

*Primary Examiner*—C. Luke Gilligan
*Assistant Examiner*—Rachel L Porter
(74) *Attorney, Agent, or Firm*—Oblon, Spivak, McClelland, Maier & Neustadt, L.L.P.

(57) ABSTRACT

The merchandise planning and development system includes a WWW server 33 for informing many and unspecified customers $3_1$ to $3_n$ of merchandise planning and development information about planning and/or development of new merchandise through the Internet 20, and a news server 35 for collecting the opinion information of the customers $3_1$ to $3_n$ looking up the merchandise planning information through the Internet 20. The WWW server 33 informs the customers $3_1$ to $3_n$ of the merchandise information suited to the needs of the customers on the basis of the opinion information by way of the Internet 20.

26 Claims, 50 Drawing Sheets

FOREIGN PATENT DOCUMENTS

| | | |
|---|---|---|
| KR | 1998-041808 | 8/1998 |
| KR | 2000-0007066 | 2/2000 |

OTHER PUBLICATIONS

Palmer, Jay, "Fancy Labels, Plain Prices," Sep. 26, 1988, Barron's National Business and Financial Weekly, p. 18.*

Magazine—"Bart", Publication Date: Oct. 1, 1999 (Publisher: Shueisha).

Internet Website, Publication Date: Sep. 4, 1999 (Publisher: Ricoh Elemex Corporation).

WWW."CLUBWERKS.COM".

* cited by examiner

FIG.14

<ELECTRONIC BULLETIN BOARD>

- TITLE: [                    ]
- CATEGORY: [SELECT CATEGORY ▽]
- NAME: [           ]
- SEX:  ○ MALE  ○ FEMALE
- AGE: [     ]
- PREFECTURE: [SELECT PREFECTURE ▽]
- TYPE OF BUSINESS: [SELECT TYPE OF BUSINESS ▽]
- OCCUPATION: [SELECT OCCUPATION ▽]
- E-MAIL [       ]

WRITE YOUR OPINION ABOUT ...

[                    ]

[UPLOAD] [DELETE]

| No.555 2000/1/6 21:10:30 | ABOUT DESIGN |||||
|---|---|---|---|---|---|
| | DESIGN IN GENERAL |||||
| | MALE | 29 | SAITAMA | PHARMACEUTICAL | SALES |
| THE DESIGN OF THIS WATCH IS .... ||||||

⋮

| No.777 2000/1/30 09:12:40 | ABOUT PRICE |||||
|---|---|---|---|---|---|
| | PRICE |||||
| | FEMALE | 25 | TOKYO | SOFTWARE | ENGINEERING DEVELOPMENT |
| THE PRICE OF THIS WATCH IS .... ||||||

FIG.15

INQUIRY INPUT FORM

- NAME:
- KANA:
- AGE: ☐ YEARS
- SEX: ○ MALE ○ FEMALE
- OCCUPATION: [SELECT OCCUPATION ▽]
- POSTAL CODE:
- PREFECTURE: [SELECT PREFECTURE ▽]
- ADDRESS:
- TELEPHONE NO. (INCL. CELL-PHONE):
- E-MAIL :

1. INTERESTED IN ANY PRODUCT?

○ ××××　　○ ××××　　○ ××××

○ ××××　　○ ××××

○ NONE

2. YOU LIKE WHICH POINT ?
　(PLURALITY OF ANSWERS ACCEPTED):

☐ DESIGN OF DIAL PLATE  ☐ DESIGN OF FRAME  ☐ DESIGN OF WATCHBAND  ☐ SENSE OF MATERIAL  ☐ COLOR OF DIAL PLATE
☐ PRODUCT NAME  ☐ MIRROR FINISH  ☐ PRICE  ☐ FUNCTION  ☐ SIZE
☐ WINDING CROWN  ☐ PROJECT ITSELF  ☐ BACK CASE MARKING

☐ OTHER

COMMENT ON PARTICULAR POINT YOU LIKE
(WITHIN 300 WORDS)

FIG.16

<(INQUIRY INPUT FORM CONTINUED)>
3. YOU DON'T LIKE WHICH POINT? (PLURALITY OF ANSWERS ACCEPTED)
- ☐ DESIGN OF DIAL PLATE
- ☐ DESIGN OF FRAME
- ☐ DESIGN OF WATCHBAND
- ☐ SENSE OF MATERIAL
- ☐ COLOR OF DIAL PLATE
- ☐ PRODUCT NAME
- ☐ PRICE
- ☐ FUNCTION
- ☐ SIZE
- ☐ WINDING CROWN

☐ OTHER [_____]
COMMENT ON PARTICULAR POINT YOU DON'T LIKE (WITHIN 300 WORDS)
[_____]

4. YOU FEEL WHAT IMAGE ABOUT THE PRODUCT? (PLURALITY OF ANSWERS ACCEPTED)
- ☐ SIMPLE
- ☐ MESSY
- ☐ BRAND-NEW
- ☐ PLAIN
- ☐ URBAN
- ☐ CONSERVATIVE
- ☐ STRANGE
- ☐ GENERAL
- ☐ SPORTY
- ☐ FORMAL
- ☐ NOT SEEN BEFORE
- ☐ SEEN BEFORE
- ☐ FASHIONABLE
- ☐ ORDINARY
- ☐ ACTIVE
- ☐ PASSIVE
- ☐ GROOVY
- ☐ CYBERESQUE

☐ OTHER [_____]

5. YOU LIKE TO WEAR ON WHICH OCCASION? (PLURALITY OF ANSWERS ACCEPTED)
- ☐ BUSINESS
- ☐ DATING
- ☐ HOLIDAY
- ☐ FORMAL (WEDDING CEREMONY, PARTY)

☐ OTHER [_____]

. . .

THANK YOU FOR COOPERATION.
IF OK, PRESS SEND BUTTON.
IF DOING AGAIN, PRESS CLEAR BUTTON.

[SEND]  [CLEAR]
  75      76

<DESIGN, SPECIFICATION AND PRICE OF MERCHANDISE A>

| WA$_1$ | WA$_2$ | WA$_3$ |
|---|---|---|
| (PRODUCT A (GREEN)) | (PRODUCT A (YELLOW)) | (PRODUCT A (BLUE)) |

- FUNCTION:XXXXXXXXXXXX
- WATERPROOF:XXXXXXXXXXXXX
- MATERIAL:XXXXXXXXXXXX
- PRECISION:XXXXXXXXXXXXX
- BATTERY LIFE:XXXXXXXXXX
- SIZE:XXXXXXXXXXX

⋮

- PRICE:30000 YEN
  (NO. RESERVED: UP TO 3000 PCS)
  25000 YEN
  (NO. RESERVED: UP TO 6000 PCS)
  20000 YEN
  (NO. RESERVED: 6001 PCS OR MORE)

CONFIRM RESERVATION STATUS — 78

<RESERVATION ACCEPTANCE FORM>

- ● NAME: ▭
- ● KANA: ▭
- ● AGE: ▭ YEARS
- ● SEX: ○ MALE ○ FEMALE
- ● OCCUPATION: [SELECT OCCUPATION ▽]
- ● POSTAL CODE: ▭
- ● PREFECTURE: [SELECT PREFECTURE ▽]
- ● ADDRESS: ▭
- ● TELEPHONE NO. (INCL. CELL-PHONE): ▭
- ● E-MAIL: ▭

SPECIFY MERCHANDISE AND QUANTITY.

- ◆ [MERCHANDISE A (BLUE)] [1] PC.
  - 82, 83
- ◆ [MERCHANDISE B (YELLOW)] [1] PC.
  - 84, 85

IF OK, PRESS SEND BUTTON.
IF DOING AGAIN, PRESS CLEAR BUTTON.

[SEND] [CLEAR]
 86    87

FIG.22

<CATALOG REQUEST FORM>

- NAME:
- KANA:
- AGE:
- SEX: ○ MALE ○ FEMALE
- OCCUPATION: [SELECT OCCUPATION ▽]
- POSTAL CODE:
- PREFECTURE: [SELECT PREFECTURE ▽]
- ADDRESS:
- TELEPHONE NO. (INCL. CELL-PHONE):
- E-MAIL:

MERCHANDISE CATALOG WILL BE SENT TO YOU
AFTER CONFIRMING YOUR MAIL.

IF OK, PRESS SEND BUTTON.
IF DOING AGAIN, PRESS CLEAR BUTTON.

[SEND] [CLEAR]

FIG.33

<RESERVATION ACCEPTANCE FORM>

- NAME:
- KANA:
- AGE: ☐ YEARS
- SEX: ○ MALE ○ FEMALE
- OCCUPATION: [SELECT OCCUPATION ▽]
- POSTAL CODE:
- PREFECTURE: [SELECT PREFECTURE ▽]
- ADDRESS:
- TELEPHONE NO. (INCL. CELL-PHONE):
- E-MAIL:
- PROFILE: [SURFER TYPE ▽] —125

SPECIFY MERCHANDISE AND QUANTITY.

◆ [____] PC.   [CUSTOMIZED PRODUCT A'$_1$ (GREEN)]  [1] PC.
   82    83                 114                   115

◆ [____] PC.   MERCHANDISE DELIVERY METHOD
   84    85    ☑ SALES REPRESENTATIVE  ☐ CASH ON DELIVERY —116

IF OK, PRESS SEND BUTTON.
IF DOING AGAIN, PRESS CLEAR BUTTON.

[SEND]  [CLEAR]
  86      87

FIG.34

<DESIGN, SPECIFICATION AND PRICE OF MERCHANDISE B>

WB₁    WB₂    WB₃

(PRODUCT B (BLACK))    (PRODUCT B (SILVER))    (PRODUCT B (WHITE))

- FUNCTION:×××××××××××
- WATERPROOF:××××××××××××
- MATERIAL:×××××××××××
- PRECISION:××××××××××××
- BATTERY LIFE:××××××××××
- SIZE:××××××××××

·
     ·
     ·

- PRICE: 50000 YEN
    (NO. RESERVED: UP TO 3000 PCS)
    45000 YEN
    (NO. RESERVED: UP TO 6000 PCS)
    40000 YEN
    (NO. RESERVED: 6001 PCS OR MORE)

| CONFIRM RESERVATION STATUS (79) | CUSTOMIZE (117) |

FIG.35

<CUSTOMIZING PARTS OF MERCHANDISE B>
<WATCH CRYSTAL:3 TYPES>

(WATCH CRYSTAL BF₁)  (WATCH CRYSTAL BF₂)  (WATCH CRYSTAL BF₃)

<WINDING CROWN:2 TYPES>

(WINDING CROWN BR₁)  (WINDING CROWN BR₂)

SELECT YOUR CHOICE FOR CUSTOMIZING.
◆ WATCH CRYSTAL  ☑BF₁ ☐BF₂ ☐BF₃   —118
◆ WINDING CROWN  ☑BR₁ ☐BR₂
◆ DIAL PLATE COLOR  ☑BLACK ☐SILVER ☐WHITE

[DISPLAY CUSTOMIZED IMAGE] —119

NAMING VOTING FORM

- NAME: ☐
- KANA: ☐
- AGE: ☐ YEARS
- SEX: ○ MALE ○ FEMALE
- OCCUPATION: [SELECT OCCUPATION ▽]
- POSTAL CODE: ☐
- PREFECTURE: [SELECT PREFECTURE ▽]
- ADDRESS: ☐
- TELEPHONE NO. (INCL. CELL-PHONE): ☐
- E-MAIL: ☐
- NAMING FOR MERCHANDISE A: [XXXXX] —121
- NAMING FOR MERCHANDISE B: [XXXXX] —122

IF OK, PRESS SEND BUTTON.
IF DOING AGAIN, PRESS CLEAR BUTTON.

[SEND] [CLEAR]
 123      124

NOTICE OF CONFIRMING
NAMING

THE NAMING HAS BEEN CONFIRMED AS
FOLLOWS AMONG MANY VOTED NAMES.

MERCHANDISE A: X X X X X
NAMED BY: M. , 26, OFFICE WORKER, TOKYO

MERCHANDISE B: Y Y Y Y Y Y
NAMED BY: M. , 35, PROPRIETOR, OKINAWA

FIG.40

| RESERVE DATA | DATE | SUBSCRIBER | PROFILE | ADDRESS | FLAG | CUSTOMIZE | MERCHANDISE | QUANTITY | METHOD OF DELIVERY | SALES REPRESENTATIVE | SELLING PRICE |
|---|---|---|---|---|---|---|---|---|---|---|---|
| 1 | 2000.3.1 15:33 | K K K | SURFER | T T T | 1 | WATCH CRYSTAL A F$_1$ WINDING CROWN AR$_1$ | CUSTOMIZED PRODUCT A$_1$' (GREEN) | 1 | SALES REPRESENTATIVE | SALES REPRESENTATIVE 90$_1$ | 25000 YEN |
| 2 | 2000.3.2 8:40 | L L L | SHIBUYA | E E E | 0 | | PRODUCT B (WHITE) | 1 | CASH ON DELIVERY | | 45000 YEN |
| 3 | | | | | | | | | | | |

| CUSTOMERS | 1-3000 | 3001-6000 | 6001- |
|---|---|---|---|
| PRICE | 20000 YEN | 25000 YEN | 30000 YEN |

| PERIOD | 3/1-3/31 | 4/1-4/30 | 5/1- |
|---|---|---|---|
| PRICE | 20000 YEN | 25000 YEN | 30000 YEN |

| CUSTOMERS | 1-3000 | 3001-6000 | 6001- |
|---|---|---|---|
| DISCOUNT RATE | 30% | 20% | 0% |

| RESERVATION SOLD-OUT TIME | LESS THAN 5 MIN | 5 TO LESS THAN 10 MIN | 10 MIN OR MORE |
|---|---|---|---|
| PRICE | 20000 YEN | 25000 YEN | 30000 YEN |

<AUCTION BIDDING FORM>

- NAME: ☐
- KANA: ☐
- AGE: ☐ YEARS
- SEX: ○ MALE ○ FEMALE
- OCCUPATION: [SELECT OCCUPATION ▽]
- POSTAL CODE: ☐
- PREFECTURE: [SELECT PREFECTURE ▽]
- ADDRESS: ☐
- TELEPHONE NO. (INCL. CELL-PHONE): ☐
- E-MAIL: ☐

◆ TENDER IN 1000 YEN UNITS

BIDDING AMOUNT FOR MERCHANDISE A [13000] YEN — 127
BIDDING AMOUNT FOR MERCHANDISE B [37000] YEN — 128

[TENDER]   [CLEAR]
   129        130

| BIDDING AMOUNT | NO. OF BIDS FOR MERCHANDISE A | AVERAGE AMOUNT | NO. OF BIDS FOR MERCHANDISE B | AVERAGE AMOUNT |
|---|---|---|---|---|
| 1000~5000 YEN | 4 | 4300 | 10 | 3600 |
| 6000~10000 YEN | 51 | 7500 | 25 | 8300 |
| 11000~15000 YEN | 185 | 12200 | 462 | 14500 |
| 16000~20000 YEN | 317 | 18000 | 101 | 17000 |

MERCHANDISE PLANNING AND DEVELOPMENT SYSTEM AND METHOD FOR THE SAME, AND A COMPUTER PRODUCT

FIELD OF THE INVENTION

The present invention relates to a merchandise planning and development system for planning and/or developing new merchandise by exchanging opinions over the Internet, magazines and other media, a method for the same, and a computer product. More particularly, this invention relates to a merchandise planning and development system capable of executing all steps from planning of merchandise to setting of price by exchanging opinions among the consumers, the media providing enterprises, and manufacturers, a method for the same, and a computer product.

BACKGROUND OF THE INVENTION

Recently, as needs of customers are diversified, and consumers tend to purchase merchandise by choosing only those truly necessary for the own self, it is becoming more and more difficult for the enterprises engaged in development of new merchandise to satisfy the needs of the individual customers sufficiently.

To differentiate the merchandise, it is very important for the enterprises to operate activities for distributing the merchandise and service from the manufacturers to the consumes rationally and efficiently, that is, to investigate the latent needs of customers by market research or other unit, and feed back the results to the merchandise development.

On the other hand, to investigate the latent needs of customers, the enterprises are attempting to utilize the exiting Internet, and feed back the results to development of new merchandise.

However, hitherto, no method is known to cover all steps of development of new merchandise from planning and/or developing to sales of products by exchanging opinions over the Internet, magazines or the other media, that is, by exchanging opinions among the consumers, the media providing enterprises, and manufacturers.

SUMMARY OF THE INVENTION

In the light of the above background, it is hence an object of the invention to present a merchandise planning and development system capable of executing all steps from planning and development till sales of merchandise by exchanging opinions among the consumers, the media providing enterprises, and manufacturers, over the Internet, magazines or other media, thereby differentiating the merchandise, and feeding back the versatile needs of individual customers to development of new merchandise, its merchandise planning and development method, and a computer-readable recording medium recording a merchandise planning and development program.

To achieve the object, the merchandise planning and development system according to one aspect comprises a merchandise planning information notice unit for informing many and unspecified customers of merchandise planning and development information relating to planning and/or development of new merchandise through a network; an opinion information collecting unit for collecting the opinion information from the customers looking up the merchandise planning information through the network; and a merchandise information notice unit for informing the many and unspecified customers of the merchandise information suited to the needs of the customers according to the opinion information through the network.

In the above invention, the merchandise planning and development information relating to planning and/or development of new merchandise is noticed to many and unspecified customers through the network. As a result, the customers can look up the merchandise planning and development information, and come to have opinions about the new merchandise. The opinions are collected as opinion information by the opinion information collecting unit, and the enterprise planning and developing the new merchandise will understand the needs of customers on the basis of the opinion information. Further, the enterprise can announce the merchandise information suited to the needs through the network.

Thus, the opinion information of customers is interactively collected through the network, and the merchandise information suited to the needs of customers on the basis of the opinion information is noticed, and therefore differentiation of merchandise can be expressed, and versatile needs of individual customers can be fed back to development of new merchandise.

Further, there is provided a trial product information notice unit for informing the many and unspecified customers of the trial product information suited to the needs of the customers according to the opinion information through the network, in which the opinion information collecting unit collects the opinion information of the customers looking up the trial product information in addition to the merchandise planning information. Thus, since the trial product information suited to the needs of customers on the basis of opinion information is noticed through the network, the trial products can be manufactured the plurality of times, and the needs of customers can be appropriately fed back to development of new merchandise.

Further, there is provided a trial product popularity investigation unit for investigating the popularity of each trial product corresponding to the information of the plurality of trial products, in the event of presence of a plurality of the trial product information, by an electronic technique. Thus, since the popularity of the plurality of trial products is investigated in the stage of planning and/or development by an electronic technique, the needs of customers can be understood promptly and easily on the basis of the investigation result.

Further, there is provided a trial product popularity investigation result notice unit for informing the many and unspecified customers of investigation results of the trial product popularity investigation unit through the network. Thus, since the investigation result of the popularity of the plurality of trial products can be noticed to many and unspecified customers in the stage of planning and/or development, the directivity of planning and/or development can be established in an early stage.

Further, the opinion information collecting unit is an electronic bulletin board system. Thus, since the opinion information of customers can be collected by the highly interactive electronic bulletin board system, and the merchandise information suited to the needs of customers on the basis of the opinion information is noticed, differentiation of merchandise can be expressed, and versatile needs of individual customers can be fed back to development of new merchandise.

Further, the opinion information collecting unit is an electronic mail system. Thus, since the opinion information of customers can be collected by the highly interactive electronic mail system, and the merchandise information suited to the needs of customers on the basis of the opinion information is noticed, differentiation of merchandise can be expressed, and versatile needs of individual customers can be fed back to development of new merchandise.

Further, the opinion information collecting unit collects the opinion information from the many and unspecified customers, on the basis of the results of electronic inquiry in order to analyze the needs. Thus, since the opinion information of customers can be collected on the basis of the results of the highly interactive electronic inquiry, and the merchandise information suited to the needs of customers on the basis of the opinion information is noticed, differentiation of merchandise can be expressed, and versatile needs of individual customers can be fed back to development of new merchandise.

Further, there are provided a sales booking for accepting sales reservation of new merchandise to, be released corresponding to the merchandise information from the many and unspecified customers through the network; and a selling price determining unit for determining the selling price of the new merchandise so that the price may be lower in proportion to the increase in the sales reserved quantity depending on the sales reserved quantity of the new merchandise. Thus, when accepting the sales reservations, since the selling price of the new merchandise is determined so that the price may be lower in proportion to the increase in the number of reserved pieces, excessive stock is not needed, and the service quality to the customers is enhanced at low cost.

Further, there are provided a sales booking unit for accepting sales reservation of new merchandise to be released corresponding to the merchandise information from the many and unspecified customers through the network; and a selling price determining unit for determining the selling price of the new merchandise in gradual steps so that the price may be lower on the first-come-first-served basis of the sales reservation. Thus, when accepting the sales reservations, since the selling price of the new merchandise is determined so that the price may be lower on the first-come-first-served basis of the sales reservation, it stimulates the desire of customers to buy the new merchandise at lower price, and many reservations will be obtained earlier, so that manufacture of new merchandise can be started earlier.

Further, the selling price determining unit once sets the discount rate so that the discount rate of the fixed price may be higher in gradual steps on the first-come-first-served basis of the sales reservation, and determines the selling price according to the discount rate. Thus, when accepting the sales reservations, since the selling price of the new merchandise is determined so that the discount rate may be higher on the first-come-first-served basis of the sales reservation, it stimulates the desire of customers to buy the new merchandise at lower price, and many reservations will be obtained earlier, so that manufacture of new merchandise can be started earlier.

Further, there are provided a sales booking unit for accepting sales reservation of new merchandise to be released corresponding to the merchandise information from the many and unspecified customers through the network; and a selling price determining unit for determining the selling price of the new merchandise so that the price may be lower as the sales reservation is accepted earlier. Thus, when accepting the sales reservations, since the selling price of the new merchandise is determined so that the price may be lower as the sales reservation is accepted earlier, it stimulates the desire of customers to buy the new merchandise at lower price, and many reservations will be obtained earlier, so that manufacture of new merchandise can be started earlier.

Further, the selling price determining unit once sets the discount rate so that the discount rate of the fixed price may be higher in gradual steps as the sales reservation is accepted earlier, and determines the selling price according to the discount rate. Thus, when accepting the sales reservations, since the selling price of the new merchandise is determined so that the discount rate may be higher as the sales reservation is accepted earlier, it stimulates the desire of customers to buy the new merchandise at lower price, and many reservations will be obtained earlier, so that manufacture of new merchandise can be started earlier.

Further, there are provided a sales booking unit for accepting sales reservation of new merchandise to be released corresponding to the merchandise information from the many and unspecified customers through the network; and a selling price determining unit for determining the selling price of the new merchandise so that the price may be lower as the reservation sold-out time from start of acceptance of sales reservation until reaching a specified reservation quantity is shorter. Thus, when accepting the sales reservations, since the selling price of the new merchandise is determined so that the price may be lower as the reservation sold-out time from start of acceptance of sales reservation until reaching a specified reservation quantity is shorter, it stimulates the desire of customers to buy the merchandise limited in the number of reservation copies, and to buy the new merchandise at lower price, and many reservations will be obtained earlier, so that manufacture of new merchandise can be started earlier, and moreover the new merchandise may be provided with a premium.

Further, the selling price determining unit once sets the discount rate so that the discount rate of the fixed price may be higher as the reservation sold-out time is shorter, and determines the selling price according to the discount rate. Thus, since the selling price of the new merchandise is determined so that the discount rate may be higher as the reservation sold-out time from start of acceptance of sales reservation until reaching a specified reservation quantity is shorter, it stimulates the desire of customers to buy the merchandise limited in the number of reservation copies, and to buy the new merchandise at lower price, and many reservations will be obtained earlier, so that manufacture of new merchandise can be started earlier, and moreover the new merchandise may be provided with a premium.

Further, there are provided a bidding price collecting unit for collecting the bidding prices of new merchandise to be released corresponding to the merchandise information from the many and unspecified customers; and a selling price determining unit is provided for investigating the distribution of bidding prices on the basis of the result of collection of the bidding price collecting unit, and determining the selling price of the new merchandise on the basis of the bidding price zone of the greatest number of bids. Thus, since the bidding system is intended to determine the selling price of the new merchandise on the basis of the bidding price zone of the greatest number of bids, the customer-oriented selling price can beset, and the new merchandise is presented to the customers at an appropriate selling price.

Further, there are provided a auction unit for auctioning new merchandise to be released corresponding to the merchandise information through the network among the many and unspecified customers; and a selling price determining unit for determining the selling price of the new merchandise on the basis of the auction result of the auction unit. Thus, since the selling price of the new merchandise is determined by the auction unit, the customers have the right to determine the selling price of the new merchandise, and the customers' consciousness of participation in planning and/or development of merchandise can be enhanced, while the effects of current topic and advertisement can be enhanced by the auction.

Further, the sales booking unit, being installed at a sales representative and accommodating sales representative clients connected to the network, transmits information about reservation to the sales representative clients through the network, while the sales representative sells the new merchandise according to the reservation information. Thus, having sales representative clients accommodated in a sales representative, since the information about reservation is transmitted to the sales representative clients through the network, choices of method purchase for customers are increased, and the convenience for customers is enhanced.

Further, there are provided a customized component display unit for displaying the plurality of types of customized components different in design about the components for composing the new merchandise to the many and unspecified customers through the network; and a customized component selecting unit for allowing the customers to select desired customized components from the plurality of types of customized components at the time of booking, in which the sales booking unit accepts the merchandise adopting the selected customized component as new customized merchandise. Thus, since the customer is allowed to select a desired customized component among the plurality of customized components when reserving the sale, and the customized new merchandise is sold, the customer's preference is carefully satisfied, and the customer comes to have the affection of one's own original merchandise.

Further, there are provided a naming voting unit for allowing the many and unspecified customers to vote for naming of the new merchandise through the network; and a naming notice unit for informing the many and unspecified customers of the naming determined on basis of the voting result of the naming voting unit through the network. Thus, receiving votes of naming of new merchandise by the naming voting unit, since the determined name is noticed to many and unspecified customers, and the "godfather" of the merchandise is also the customer, the customers' consciousness of participation in planning and/or development of merchandise is enhanced, and the psychological distance between the new merchandise and customers can be shortened.

The merchandise planning and development system according to another aspect comprises a merchandise planning information notice unit for informing many and unspecified customers of merchandise planning and development information relating to planning and/or development of a plurality of new merchandise on the basis of one concept through a network; an opinion information collecting unit for collecting the opinion information from the customers looking up the merchandise planning information through the network; and a merchandise information notice unit for informing the many and unspecified customers of the merchandise information relating to the plurality of new merchandise suited to the needs of the customers according to the opinion information through the network.

According to the above invention, the merchandise planning and development information about planning and/or development of a plurality of new products (for example, shoes, bags, belts) on the basis of one concept is noticed to many and unspecified customers through the network. As a result, the customers can look up the merchandise planning and development information, and come to have opinions about the plurality of new merchandise according to the key of this one concept. The opinions are collected as opinion information by the opinion information collecting unit, and the enterprise planning and developing the plurality of new merchandise will understand the needs of customers on the basis of the opinion information. Further, the enterprise can announce the merchandise information suited to the needs through the network.

Thus, the opinion information of customers about the plurality of new merchandise on the basis of one concept is interactively collected through the network, and the merchandise information suited to the needs of customers on the basis of the opinion information is noticed, and therefore needs of customers about the plurality of new merchandise being totally coordinated can be fed back to development of new merchandise.

The merchandise planning and development method according to still another aspect comprises a merchandise planning information notice step of informing many and unspecified customers of merchandise planning and development information relating to planning and/or development of new merchandise through a network, an opinion information collecting step of collecting the opinion information from the customers looking up the merchandise planning information through the network, and a merchandise information notice step of informing the many and unspecified customers of the merchandise information suited to the needs of the customers according to the opinion information through the network.

According to the above invention, the merchandise planning and development information relating to planning and/or development of new merchandise is noticed to many and unspecified customers through the network. As a result, the customers can look up the merchandise planning and development information, and come to have opinions about the new merchandise.

The opinions are collected as opinion information at the opinion information collecting step, and the enterprise planning and developing the new merchandise will understand the needs of customers on the basis of the opinion information. Further, the enterprise can announce the merchandise information suited to the needs through the network.

Thus, the opinion information of customers is interactively collected through the network, and the merchandise information suited to the needs of customers on the basis of the opinion information is noticed, and therefore differentiation of merchandise can be expressed, and versatile needs of individual customers can be fed back to development of new merchandise.

Further, there is provided a trial product information notice step of informing the many and unspecified customers of the trial product information suited to the needs of the customers according to the opinion information through the network, in which the opinion information collecting step collects the opinion information of the customers looking up the trial product information in addition to the merchandise planning information. Thus, since the trial product information suited to the needs of customers on the basis of opinion information is noticed through the network, the trial products can be manufactured the plurality of times, and the needs of customers can be appropriately fed back to development of new merchandise.

Further, there is provided a trial product popularity investigation step of investigating the popularity of each trial product corresponding to the information of the plurality of trial products, in the event of presence of a plurality of the trial product information, by an electronic technique. Thus, since the popularity of the plurality of trial products is investigated in the stage of planning and/or development by an electronic technique, the needs of customers can be understood promptly and easily on the basis of the investigation result.

Further, there is provided a trial product popularity investigation result notice step of informing the many and unspecified customers of investigation results of the trial product popularity investigation step through the network. Thus, since the investigation result of the popularity of the plurality of trial products can be noticed to many and unspecified customers in the stage of planning and/or development, the directivity of planning and/or development can be established in an early stage.

Further, there are provided a sales booking step of accepting sales reservation of new merchandise to be released corresponding to the merchandise information from the many and unspecified customers through the network, and a selling price determining step of determining the selling price of the new merchandise so that the price may be lower in proportion to the increase in the sales reserved quantity depending on the sales reserved quantity of the new merchandise. Thus, since the selling price of the new merchandise is determined so that the price may be lower in proportion to the increase in the sales reserved quantity, excessive stock is not needed, and the service quality to the customers is enhanced at low cost.

Further, there are provided a sales booking step of accepting sales reservation of new merchandise to be released corresponding to the merchandise information from the many and unspecified customers through the network, and a selling price determining step of determining the selling price of the new merchandise in gradual steps so that the price may be lower on the first-come-first-served basis of the sales reservation. Thus, since the selling price of the new merchandise is determined so that the price may be lower on the first-come-first-served basis of the sales reservation, it stimulates the desire of customers to buy the new merchandise at lower price, and many reservations will be obtained earlier, so that manufacture of new merchandise can be started earlier.

Further, the selling price determining step once sets the discount rate so that the discount rate of the fixed price may be higher in gradual steps on the first-come-first-served basis of the sales reservation, and determines the selling price according to the discount rate. Thus, since the selling price of the new merchandise is determined so that the discount rate may be higher on the first-come-first-served basis of the sales reservation, it stimulates the desire of customers to buy the new merchandise at lower price, and many reservations will be obtained earlier, so that manufacture of new merchandise can be started earlier.

Further, there are provided a sales booking step of accepting sales reservation of new merchandise to be released corresponding to the merchandise information from the many and unspecified customers through the network, and a selling price determining step of determining the selling price of the new merchandise so that the price may be lower as the sales reservation is accepted earlier. Thus, since the selling price of the new merchandise is determined so that the price may be lower as the sales reservation is accepted earlier, it stimulates the desire of customers to buy the new merchandise at lower price, and many reservations will be obtained earlier, so that manufacture of new merchandise can be started earlier.

Further, the selling price determining step once sets the discount rate so that the discount rate of the fixed price may be higher in gradual steps as the sales reservation is accepted earlier, and determines the selling price according to the discount rate. Thus, since the selling price of the new merchandise is determined so that the discount rate may be higher as the sales reservation is accepted earlier, it stimulates the desire of customers to buy the new merchandise at lower price, and many reservations will be obtained earlier, so that manufacture of new merchandise can be started earlier.

Further, there are provided a sales booking step of accepting sales reservation of new merchandise to be released corresponding to the merchandise information from the many and unspecified customers through the network, and a selling price determining step of determining the selling price of the new merchandise so that the price may be lower as the reservation sold-out time from start of acceptance of sales reservation until reaching a specified reservation quantity is shorter. Thus, since the selling price of the new merchandise is determined so that the price may be lower as the reservation sold-out time from start of acceptance of sales reservation until reaching a specified reservation quantity is shorter, it stimulates the desire of customers to buy the merchandise limited in the number of reservation copies, and to buy the new merchandise at lower price, and many reservations will be obtained earlier, so that manufacture of new merchandise can be started earlier, and moreover the new merchandise may be provided with a premium.

Further, the selling price determining step once sets the discount rate so that the discount rate of the fixed price may be higher as the reservation sold-out time is shorter, and determines the selling price according to the discount rate. Thus, since the selling price of the new merchandise is determined so that the discount rate may be higher as the reservation sold-out time from start of acceptance of sales reservation until reaching a specified reservation quantity is shorter, it stimulates the desire of customers to buy the merchandise limited in the number of reservation copies, and to buy the new merchandise at lower price, and many reservations will be obtained earlier, so that manufacture of new merchandise can be started earlier, and moreover the new merchandise may be provided with a premium.

Further, there are provided a bidding price collecting step of collecting the bidding prices of new merchandise to be released corresponding to the merchandise information from the many and unspecified customers, and a selling price determining step of investigating the distribution of bidding prices on the basis of the result of collection of the bidding price collecting step, and determining the selling price of the new merchandise on the basis of the bidding price zone of the greatest number of bids. Thus, since the bidding system is intended to determine the selling price of the new merchandise on the basis of the bidding price zone of the greatest number of bids, the customer-oriented selling price can be set, and the new merchandise is presented to the customers at an appropriate selling price.

Further, there are provided an auction step of auctioning new merchandise to be released corresponding to the merchandise information through the network among the many and unspecified customers, and a selling price determining step of determining the selling price of the new merchandise on the basis of the auction result of the auction step. Thus, since the selling price of the new merchandise is determined by the auction unit, the customers have the right to determine the selling price of the new merchandise, and the customers' consciousness of participation in planning and/or development of merchandise can be enhanced, while the effects of current topic and advertisement can be enhanced by the auction.

Further, the sales booking step transmits information about reservation to sales representative clients provided at a sales representative through the network, while the sales representative sells the new merchandise according to the reservation information. Thus, having sales representative clients accommodated in a sales representative, since the information about reservation is transmitted to the sales representative clients through the network, choices of method purchase for customers are increased, and the convenience for customers is enhanced.

Further, there are provided a customized component display step of displaying the plurality of types of customized components different in design about the components for composing the new merchandise to the many and unspecified customers through the network, and a customized component selecting step of allowing the customers to select desired customized components from the plurality of types of customized components at the time of booking, in which the sales booking step accepts the merchandise adopting the selected customized component as new customized merchandise. Thus, since the customer is allowed to select a desired customized component among the plurality of customized components when reserving the sale, and the customized new merchandise is sold, the customer's preference is carefully satisfied, and the customer comes to have the affection of one's own original merchandise.

Further, there are provided a naming voting step of allowing the many and unspecified customers to vote for naming of the new merchandise through the network, and a naming notice step of informing the many and unspecified customers of the naming determined on basis of the voting result of the naming voting step through the network. Thus, receiving votes of naming of new merchandise by the naming voting unit, since the determined name is noticed to many and unspecified customers, and the "godfather" of the merchandise is also the customer, the customers' consciousness of participation in planning and/or development of merchandise is enhanced, and the psychological distance between the new merchandise and customers can be shortened.

The merchandise planning and development method according to still another aspect comprises a merchandise planning information notice step of informing many and unspecified customers of merchandise planning and development information relating to planning and/or development of a plurality of new merchandise on the basis of one concept through a network, an opinion information collecting step of collecting the opinion information from the customers looking up the merchandise planning information through the network, and a merchandise information notice step of informing the many and unspecified customers of the merchandise information relating to the plurality of new merchandise suited to the needs of the customers according to the opinion information through the network.

According to the above invention, the merchandise planning and development information about planning and/or development of a plurality of new products (for example, shoes, bags, belts) on the basis of one concept is noticed to many and unspecified customers through the network. As a result, the customers can look up the merchandise planning and development information, and come to have opinions about the plurality of new merchandise according to the key of this one concept. The opinions are collected as opinion information at the opinion information collecting step, and the enterprise planning and developing the plurality of new merchandise will understand the needs of customers on the basis of the opinion information. Further, the enterprise can announce the merchandise information suited to the needs through the network.

Thus, the opinion information of customers about the plurality of new merchandise on the basis of one concept is interactively collected through the network, and the merchandise information suited to the needs of customers on the basis of the opinion information is noticed, and therefore needs of customers about the plurality of new merchandise being totally coordinated can be fed back to development of new merchandise.

The merchandise planning and development system according to still another aspect comprises trial product and/or merchandise information notice unit for informing many and unspecified customers of information of a plurality of trial products or merchandise through a network, and popularity investigation unit for investigating the popularity of information of the plurality of trial products or merchandise by an electronic technique.

According to the above invention, after noticing the merchandise information of a plurality of trial products, since the popularity is investigated by an electronic technique, the needs of customers can be understood promptly and easily on the basis of the investigation result.

The merchandise planning and development system according to still another aspect comprises trial product and/or merchandise information notice unit for informing many and unspecified customers of information of a plurality of trial products or merchandise through a network, popularity investigation unit for investigating the popularity of information of the plurality of trial products or merchandise by an electronic technique, and popularity investigation result notice unit for informing the many and unspecified customers of investigation results of the popularity investigation unit through the network.

According to the above invention, since the investigation result of the popularity of a plurality of trial products or merchandise can be noticed to many and unspecified customers, the directivity of planning and/or development can be established in an early stage.

Further, there are provided comprising sales booking unit for accepting sales reservation of new merchandise to be released corresponding to the merchandise information from the many and unspecified customers through the network, and selling price determining unit for determining the selling price of the new merchandise in gradual steps so that the price may be lower on the first-come-first-served basis of the sales reservation. Thus, since the selling price of the new merchandise is determined so that the price may be lower on the first-come-first-served basis of the sales reservation, it stimulates the desire of customers to buy the new merchandise at lower price, and many reservations will be obtained earlier, so that manufacture of new merchandise can be started earlier.

Further, the selling price determining unit once sets the discount rate so that the discount rate of the fixed price may be higher in gradual steps on the first-come-first-served basis of the sales reservation, and determines the selling price according to the discount rate. Thus, since the selling price of the new merchandise is determined so that the discount rate may be higher on the first-come-first-served basis of the sales reservation, it stimulates the desire of customers to buy the new merchandise at lower price, and many reservations will be obtained earlier, so that manufacture of new merchandise can be started earlier.

Further, there are provided comprising sales booking unit for accepting sales reservation of new merchandise to be released corresponding to the merchandise information from the many and unspecified customers through the network, and selling price determining unit for determining the selling price of the new merchandise so that the price may be lower as the sales reservation is accepted earlier. Thus, since the selling price of the new merchandise is determined so that the price may be lower as the sales reservation is accepted earlier, it stimulates the desire of customers to buy the new merchandise at lower price, and many reservations will be obtained earlier, so that manufacture of new merchandise can be started earlier.

Further, the selling price determining unit once sets the discount rate so that the discount rate of the fixed price may be higher in gradual steps as the sales reservation is accepted earlier, and determines the selling price according to the discount rate. Thus, since the selling price of the new merchandise is determined so that the discount rate may be higher as the sales reservation is accepted earlier, it stimulates the desire of customers to buy the new merchandise at lower price, and many reservations will be obtained earlier, so that manufacture of new merchandise can be started earlier.

Further, there are provided sales booking unit for accepting sales reservation of new merchandise to be released corresponding to the merchandise information from the many and unspecified customers through the network, and selling price determining unit for determining the selling price of the new merchandise so that the price may be lower as the reservation sold-out time from start of acceptance of sales reservation until reaching a specified reservation quantity is shorter. Thus, since the selling price of the new merchandise is determined so that the price may be lower as the reservation sold-out time from start of acceptance of sales reservation until reaching a specified reservation quantity is shorter, it stimulates the desire of customers to buy the merchandise limited in the number of reservation copies, and to buy the new merchandise at lower price, and many reservations will be obtained earlier, so that manufacture of new merchandise can be started earlier, and moreover the new merchandise may be provided with a premium.

Further, the selling price determining unit once sets the discount rate so that the discount rate of the fixed price may be higher as the reservation sold-out time is shorter, and determines the selling price according to the discount rate. Thus, since the selling price of the new merchandise is determined so that the discount rate may be higher as the reservation sold-out time from start of acceptance of sales reservation until reaching a specified reservation quantity is shorter, it stimulates the desire of customers to buy the merchandise limited in the number of reservation copies, and to buy the new merchandise at lower price, and many reservations will be obtained earlier, so that manufacture of new merchandise can be started earlier, and moreover the new merchandise may be provided with a premium.

Further, the sales booking unit informs the many and unspecified customers of profile information about the already booked subscribers. Thus, since the profile information about the subscribers is noticed, the tendency of the subscribers having already reserved the new merchandise can be recognized by the customers, and the material for judging whether or not to buy can be presented to the customers.

Further, there is provided manufacture decision unit for deciding manufacture of at least the new merchandise of the greatest number of reservations, after closing of the reservations, if reservations of a plurality of new merchandise are accepted by the sales booking unit. Thus, manufacture of the new merchandise recording the greatest number of reservations only can be decided, and manufacture of other new merchandise can be stopped, so that the thrilling sensation and interest of planning can be presented to the subscribers.

The merchandise planning and development method according to still another aspect comprises a trial product and/or merchandise information notice step of informing many and unspecified customers of information of a plurality of trial products or merchandise through a network, and a popularity investigation step of investigating the popularity of information of the plurality of trial products or merchandise by an electronic technique.

According to the above invention, after noticing the merchandise information of a plurality of trial products, since the popularity is investigated by an electronic technique, the needs of customers can be understood promptly and easily on the basis of the investigation result.

The merchandise planning and development method according to still another aspect comprises a trial product and/or merchandise information notice step of informing many and unspecified customers of information of a plurality of trial products or merchandise through a network, a popularity investigation step of investigating the popularity of information of the plurality of trial products or merchandise by an electronic technique, and a popularity investigation result notice step of informing the many and unspecified customers of investigation results of the popularity investigation step through the network.

According to the above invention, since the investigation result of the popularity of a plurality of trial products or merchandise can be noticed to many and unspecified customers, the directivity of planning and/or development can be established in an early stage.

Further, there are provided comprising a sales booking step of accepting sales reservation of new merchandise to be released corresponding to the merchandise information from the many and unspecified customers through the network, and a selling price determining step of determining the selling price of the new merchandise in gradual steps so that the price may be lower on the first-come-first-served basis of the sales reservation. Thus, since the selling price of the new merchandise is determined so that the price may be lower on the first-come-first-served basis of the sales reservation, it stimulates the desire of customers to buy the new merchandise at lower price, and many reservations will be obtained earlier, so that manufacture of new merchandise can be started earlier.

Further, the selling price determining step once sets the discount rate so that the discount rate of the fixed price may be higher in gradual steps on the first-come-first-served basis of the sales reservation, and determines the selling price according to the discount rate. Thus, since the selling price of the new merchandise is determined so that the discount rate may be higher on the first-come-first-served basis of the sales reservation, it stimulates the desire of customers to buy the new merchandise at lower price, and many reservations will be obtained earlier, so that manufacture of new merchandise can be started earlier.

Further, there are provided a sales booking step of accepting sales reservation of new merchandise to be released corresponding to the merchandise information from the many and unspecified customers through the network, and a selling price determining step of determining the selling price of the new merchandise so that the price may be lower as the sales reservation is accepted earlier. Thus, since the selling price of the new merchandise is determined so that the price may be lower as the sales reservation is accepted earlier, it stimulates the desire of customers to buy the new merchandise at lower price, and many reservations will be obtained earlier, so that manufacture of new merchandise can be started earlier.

Further, the selling price determining step once sets the discount rate so that the discount rate of the fixed price may be higher in gradual steps as the sales reservation is accepted earlier, and determines the selling price according to the discount rate. Thus, since the selling price of the new merchandise is determined so that the discount rate may be higher as the sales reservation is accepted earlier, it stimulates the desire of customers to buy the new merchandise at lower price, and many reservations will be obtained earlier, so that manufacture of new merchandise can be started earlier.

Further, there are provided a sales booking step of accepting sales reservation of new merchandise to be released corresponding to the merchandise information from the many and unspecified customers through the network, and a selling price determining step of determining the selling price of the new merchandise so that the price may be lower as the reservation sold-out time from start of acceptance of sales reservation until reaching a specified reservation quantity is shorter. Thus, since the selling price of the new merchandise is determined so that the price may be lower as the reservation sold-out time from start of acceptance of sales reservation until reaching a specified reservation quantity is shorter, it stimulates the desire of customers to buy the merchandise limited in the number of reservation copies, and to buy the new merchandise at lower price, and many reservations will be obtained earlier, so that manufacture of new merchandise can be started earlier, and moreover the new merchandise may be provided with a premium.

Further, the selling price determining step once sets the discount rate so that the discount rate of the fixed price may be higher as the reservation sold-out time is shorter, and determines the selling price according to the discount rate. Thus, since the selling price of the new merchandise is determined so that the discount rate may be higher as the reservation sold-out time from start of acceptance of sales reservation until reaching a specified reservation quantity is shorter, it stimulates the desire of customers to buy the merchandise limited in the number of reservation copies, and to buy the new merchandise at lower price, and many reservations will be obtained earlier, so that manufacture of new merchandise can be started earlier, and moreover the new merchandise may be provided with a premium.

Further, the sales booking step informs the many and unspecified customers of profile information about the already booked subscribers. Thus, since the profile information about the subscribers is noticed, the tendency of the subscribers having already reserved the new merchandise can be recognized by the customers, the material for judging whether or not to buy can be presented to the customers.

Further, there is provided a manufacture decision step of deciding manufacture of at least the new merchandise of the greatest number of reservations, after closing of the reservations, if reservations of a plurality of new merchandise are accepted at the sales booking step. Thus, manufacture of the new merchandise recording the greatest number of reservations only can be decided, and manufacture of other new merchandise can be stopped, so that the thrilling sensation and interest of planning can be presented to the subscribers.

The computer-readable recording medium according to still another aspect stores thereon instructions which when executed realize the steps of the merchandise planning and development method mentioned above. Thus, the merchandise planning and development method of this invention can be realized on a computer.

Other objects and features of this invention will become apparent from the following description with reference to the accompanying drawings.

BRIEF DESCRIPTION OF THE DRAWINGS

FIG. 14 is a diagram showing an example of electronic bulletin board screen $G_1$ in the first embodiment.

FIG. 15 is a diagram showing an example of inquiry input screen $G_2$ in the first embodiment.

FIG. 16 is a diagram showing an example of inquiry input screen $G_2$ in the first embodiment.

FIG. 18 is a diagram showing an example of merchandise (mass production model) notice screen $G_4$ in the first embodiment.

FIG. 21 is a diagram showing an example of reservation acceptance screen $G_7$ in the first embodiment.

FIG. 22 is a diagram showing an example of catalog request screen $G_8$ in the first embodiment.

FIG. 33 is a diagram showing an example of reservation acceptance screen $G_{12}$ in the second embodiment.

FIG. 34 is a diagram showing an example of merchandise (mass production model) notice screen $G_{13}$ in the second embodiment.

FIG. 35 is a diagram showing an example of merchandise B customized component selecting screen $G_{14}$ in the second embodiment.

FIG. 37 is a diagram showing an example of naming voting form screen $G_{16}$ in the second embodiment.

FIG. 38 is a diagram showing an example of naming notice screen $G_{17}$ in the second embodiment.

FIG. 40 is a diagram showing an example of reservation information table J in the second embodiment.

FIG. 41A and FIG. 41B show selling price final decision logic $H_1$ and $H_2$ respectively in the modified examples 1 and 2 of the second embodiment.

FIG. 44A and FIG. 44B show selling price final decision logic $H_3$ and $H_4$ respectively in the modified examples 3 and 4 of the second embodiment.

FIG. 47 is a diagram showing an example of auction bidding form screen $G_{19}$ in modified example 5 of the second embodiment.

DESCRIPTION OF THE PREFERRED EMBODIMENTS

Figure 1:
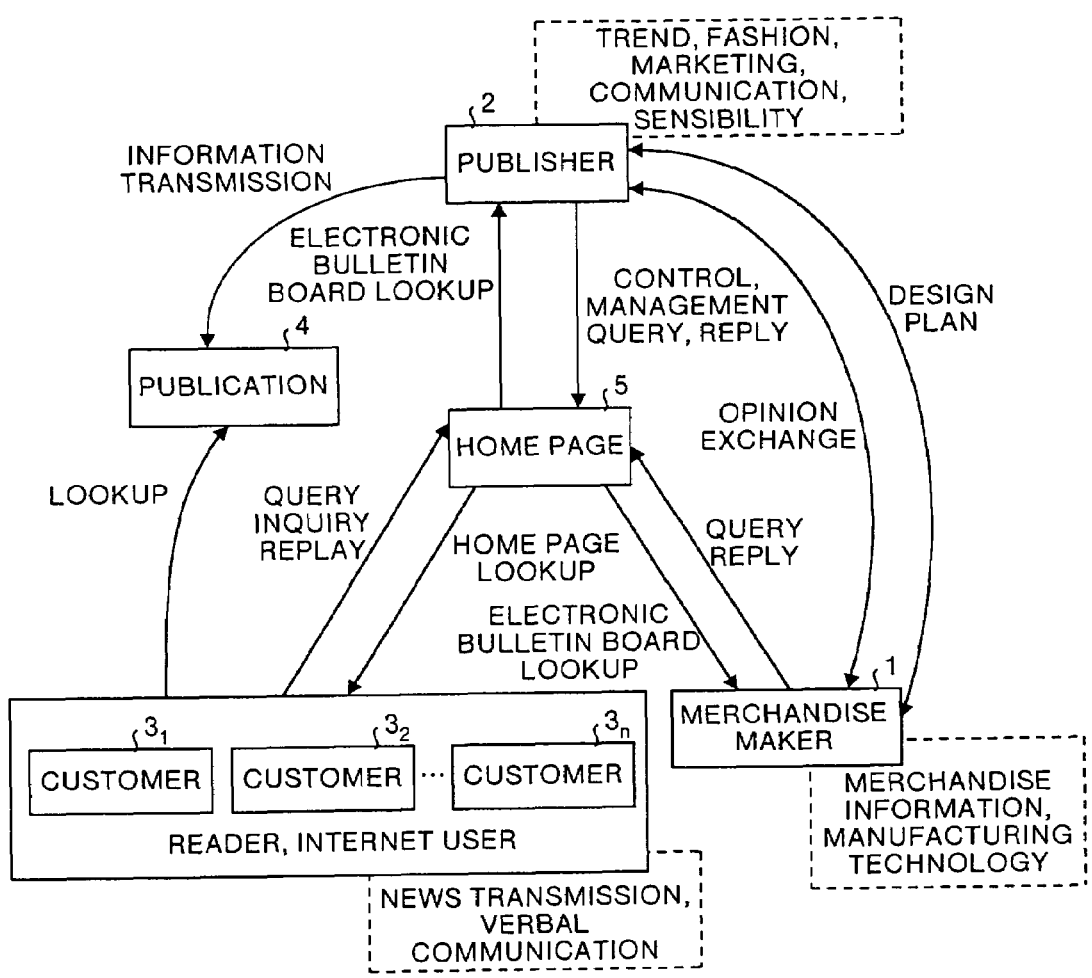
FIG. 1 is a diagram explaining an outline of a first embodiment of the invention.

Referring now to the drawings, first and second embodiments of merchandise planning and development system, merchandise planning and development method, and computer-readable recording medium recording merchandise planning and development program of the invention are described in detail below.

Figure 2:
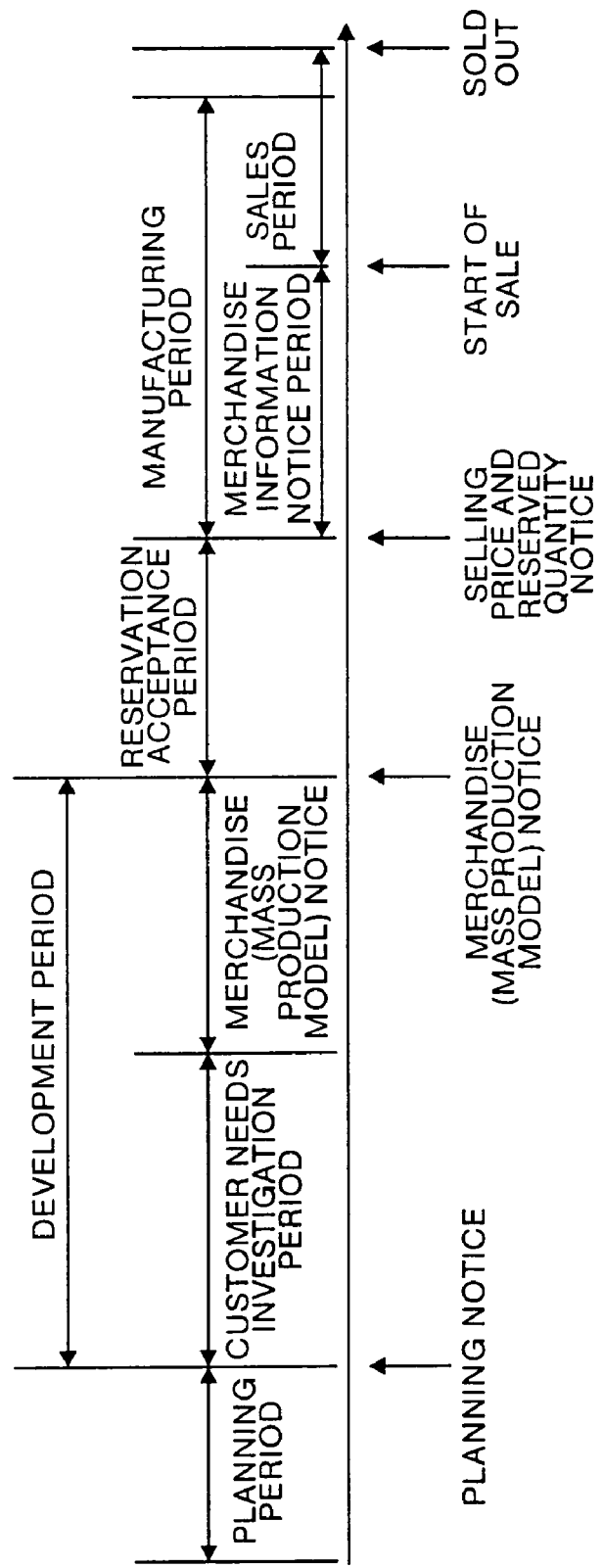
FIG. 2 is a diagram showing the schedule from planning and/or development to sales of merchandise in the first embodiment.

FIG. 1 is a diagram which shows the outline of the first embodiment of the invention. FIG. 2 is a diagram showing the schedule from planning and/or development to sales of merchandise in the first embodiment. A merchandise maker 1 and a publisher 2 shown in FIG. 1 tie up in the business, opinions of customers $3_1$ to $3_n$ are interactively applied in planning and development of merchandise through the publication 4 and home page 5, and the merchandise suited to the needs of the customers $3_1$ to $3_n$ is presented. Herein, tying-up in the business unit the business partnership in planning, development, sales and marketing of the merchandise. A watch is taken up as an example of the merchandise.

Thus, the merchandise maker 1 shown in the figures is a watch manufacturing enterprise, which presents merchandise information, manufacturing technology and others to the publisher 2, its business partner. The publisher 2 is an enterprise publishing fashion magazines, daily life information journals and other publications 4, which transmits the information of trend, fashion, communication, sensibility, etc. to the customers $3_1$ to $3_n$. The publisher 2 also presents the market information to its business partner, that is, the merchandise maker 1. The customers $3_1$ to $3_n$ are readers of the publication 4 or Internet users, and play the role of transmitting the news about the merchandise or telling the merchandise information directly to friends.

Opinions are exchanged between the merchandise maker 1 and the publisher 2, according to the business partnership, in order to promote merchandise planning, and merchandise design plans are discussed. The home page 5 is the Web on the Internet, which is the electronic media for transmitting the information about planning, development and sales of merchandise to the customers $3_1$ to $3_n$, or collecting opinions about planning and development from the customers $3_1$ to $3_n$. That is, the home page 5 is to connect the three parties, that is, the merchandise maker 1, the publisher 2, and the customers $3_1$ to $3_n$, by making use of the interactive benefits of the Internet. This home page is controlled and managed by the publisher 2.

In the business partnership between the merchandise maker 1 and the publisher 2, planning, development and sales of merchandise are executed in the schedule shown in FIG. 2. According to the shown schedule, the planning period, development period (customer needs survey period, merchandise (mass production model) establishing period), reservation receiving period, and manufacturing period (merchandise information notice period, sales period) are determined. In the planning period, the merchandise to be planned and developed (in this case, the wash) is determined, the merchandise settling targets are determined, the concept is set up, the system is built up for opening the home page 5, and the publication 4 is created. After this planning period, the detail of the planning is noticed to the customers $3_1$ to $3_n$ through the medium of the publication 4 and the home page 5.

The development period mainly consists of the customer $3_1$ to $3_n$ needs survey period, and the merchandise (mass production model) establishing period for determining the merchandise (mass production model) conforming to the needs through the home page 5. In the customer needs survey period, the information of trial products is uploaded on the home page 5, and the opinions of the customers $3_1$ to $3_n$ are collected by way of the electronic bulletin board or the like, and the needs are investigated. Receiving the results of investigation, between the publisher 2 and the merchandise maker 1, opinions are exchanged and the design plans are discussed closely. After the development period, the information (design, specification, price, etc.) about the merchandise (mass production model) is noticed to the customers $3_1$ to $3_n$ through the publication 4 and the home page 5.

In the reservation receiving period, reservations for purchasing the merchandise (mass production model) are received from the customers $3_1$ to $3_n$. After this reservation receiving period, in the merchandise information notice period, the final selling price and the number of reservations are noticed to the subscribers (customers $3_1$ to $3_n$) by way of the medium of the publication 4 and the home page 5. Parallel to this merchandise information notice period, in the manufacturing period, the merchandise is sequentially manufactured for the reserved quantity. After the merchandise information notice period, in the sales period, the merchandise is sold in the sequence of reservations, and the sales period ends when the merchandise is sold to the final subscriber.

Figure 3:
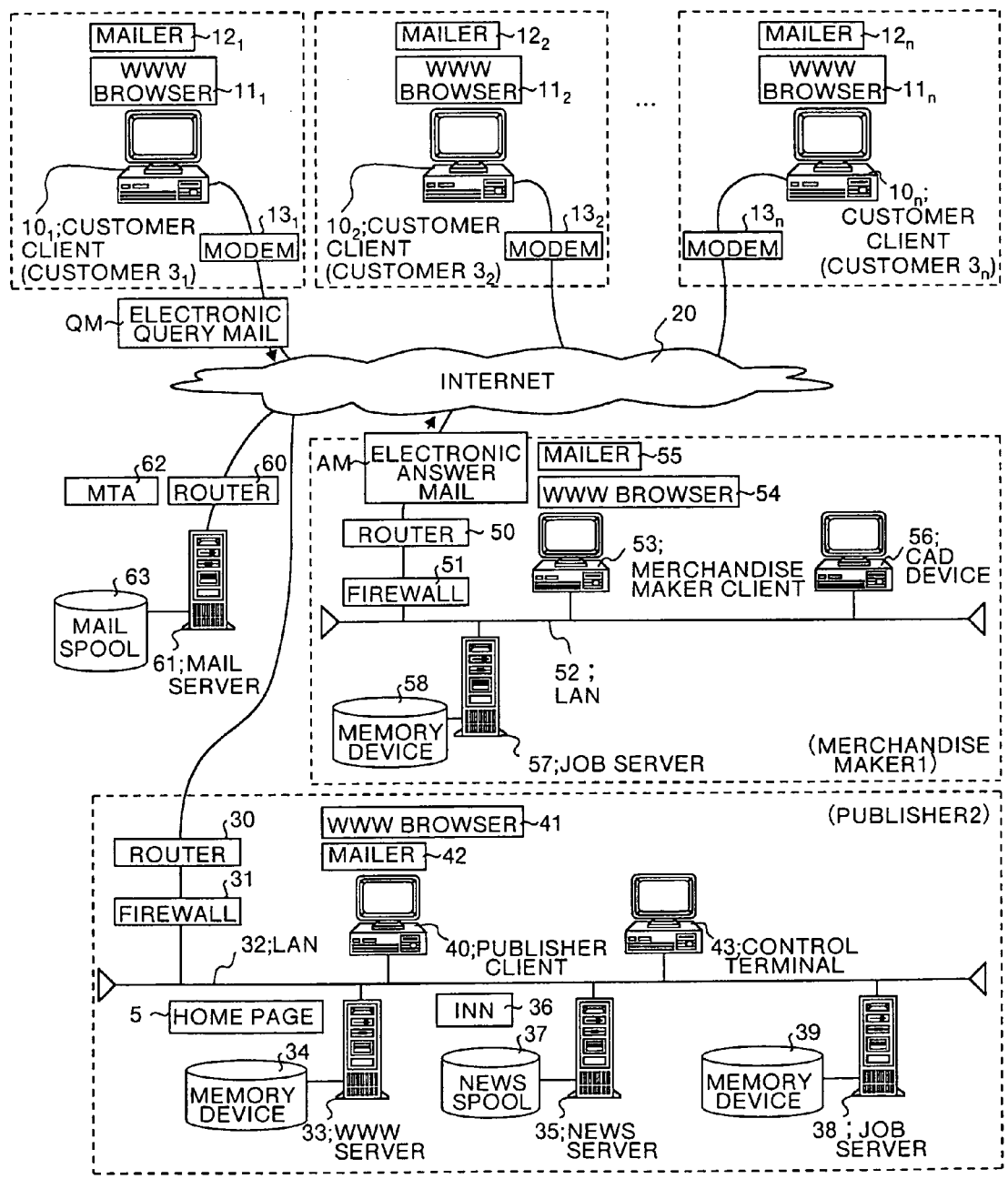
FIG. 3 is a diagram showing the configuration of the first embodiment.
Figure 4:
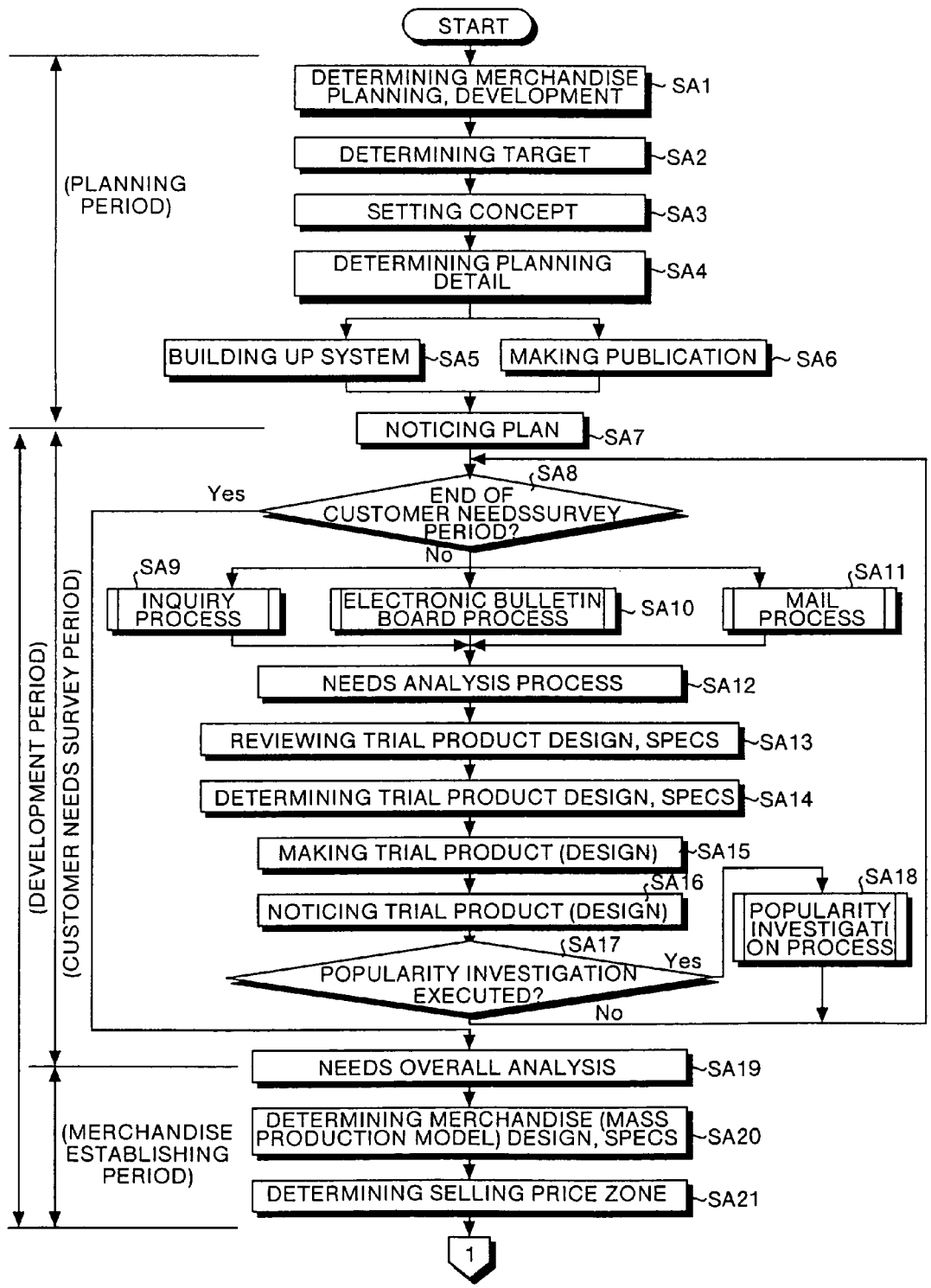
FIG. 4 is a flowchart explaining the operation of the first embodiment.

To realize the process from planning, development and sales of the merchandise, a specific configuration is explained by referring to FIG. 3. In FIG. 3, the parts corresponding to those in FIG. 1 are identified with same legends. Customer clients $10_1$ to $10_n$ are provided at the side of the customers $3_1$ to $3_n$ (see FIG. 1) respectively, and are connected to the Internet 20. These customer clients $10_1$ to $10_n$ are computer terminals for accessing the Internet through the TCP/IP (Transmission Control Protocol/Internet Protocol).

The customer client $10_1$ is composed of computer main body, display, keyboard, mouse and others, and is manipulated by the customer $3_1$. This customer client $10_1$ receives presentation of various services on the Internet 20 by the WWW (World Wide Web) browser $11_1$ and mailer $12_1$. The WWW browser $11_1$ is a computer program for looking up the home page 5 by accessing a WWW server 33 described below.

The mailer $12_1$ is a computer program for creating electronic mails or transmitting and receiving electronic mails according to POP3 (Post Office Protocol version 3). The customer client $10_1$ is connected to the Internet 20 through a modem $13_1$.

The customer client $10_2$ is composed, same as the customer client $10_1$, of computer main body, display, keyboard, mouse and others, and is manipulated by the customer $3_2$. This customer client $10_2$, same as the customer client $10_1$, receives presentation of various services on the Internet 20 by the WWW browser $11_2$ and mailer $12_2$. The customer client $10_2$ is connected to the Internet 20 through a modem 132.

The customer client $10_n$ is composed, same as the customer client $10_1$, of computer main body, display, keyboard, mouse and others, and is manipulated by the customer $3_n$. This customer client $10_n$, same as the customer client $10_1$, receives presentation of various services on the Internet 20 by the WWW browser $11_n$ and mailer $12_n$. The customer client $10_n$ is connected to the Internet 20 through a modem $13_n$.

At the publisher 2, a router 30 is a routing (relay route setting) device for repeating a packet transferred on the Internet 20 according to the IP address, and is interposed between the Internet 20 and a LAN (Local Area Network) 32. The LAN 32 is an in-house network of the publisher 2. A firewall 31 is provided between the router 30 and the LAN 32. The firewall protects the LAN 32 from illegal invasion from outside.

This firewall 31 may be realized by any of the following methods. That is, 1) passing only a specific packet by identifying the IP address of the packet, 2) using a proxy server, or 3) using a very complicated validation mechanism. The WWW server 33 is connected to the LAN 32, and it is a server for presenting the information (in this case, the home page 5) written in the HTML (HyperText Markup Language) composed of multimedia information (ordinary text, still image, moving image and sound) according to the WWW server program.

A memory device 34 storing HTML file or external database is connected to this WWW server 33. Herein, the WWW server 33 communicates with the external database according to the application program called the CGI (Common Gateway Interface). A news server 35 is a server connected to the LAN 32 for realizing an electronic bulletin board according to the application program called INN (InterNet News) 36.

This news server 35 performs at least the following functions. That is, 1) storing the transmitted articles in a news spool 37, 2) reading out articles from the news spool 37, 3) deleting the articles, 4) relaying the articles. The electronic bulletin board is utilized for sharing information among the merchandise maker 1, publisher 2 and customers $3_1$ to $3_n$, from planning and/or development to sales of merchandise. Modes of using the electronic bulletin board are explained later in specific examples.

A job server 38 is connected to the LAN 32, and it is a server used in various jobs in the publisher 2. A memory device 39 for storing various data occurring in the process of execution of jobs is connected to the job server 38. A publisher client 40 is connected to the LAN 32. The publisher client 40 receives presentation of various services on the LAN 32 and the Internet 20 from the WWW browser 41 and mailer 42. The publisher client 40 is composed of computer main body, display, keyboard, mouse, and others. A control terminal 43 is connected to the LAN 32, and it is a terminal for maintenance of the WWW server 33 and updating of the home page 5.

At the merchandise maker 1, a router 50 is interposed between the Internet 20 and a LAN 52. The router 50 is a routing (relay route setting) device for repeating a packet transferred on the Internet 20 according to the IP address. The LAN 52 is an in-house network of the merchandise maker 1. A firewall 51 is placed between the router 50 and the LAN 52. The firewall 51 protects the LAN 52 from illegal invasion from outside. This firewall 51 may be realized by the methods by which the firewall 31 is realized.

A merchandise maker client 53 is connected to the LAN 52, and receives presentation of various services on the LAN 52 and the Internet 20 by a WWW browser 54 and a mailer 55. This merchandise maker client 53 is composed of computer main body, display, keyboard, mouse, etc.

A CAD (Computer Aided Design) device 56 is connected to the LAN 52. The CAD device 56 is used for drafting merchandise design and others by making use of the computer graphics technology. A job server 57 is connected to the LAN 52. The job server 57 is a server used in various jobs of the merchandise maker 1. A memory device 58 for storing various data occurring from execution of jobs is connected to this job server 57.

A mail server 61 is connected to the Internet 20 through a routing router 60. The mail server 61 is a server for realizing an electronic mail system. This mail server 61 transmits and receives electronic mails with the client according to the application program called MTA (Mail Transfer Agent) 62. The mail server 61 also transfers the electronic mails to other mail servers which are not shown in the figures. The mail server 61 also stores the received electronic mails temporarily in a mail spool 63.

Operation of the first embodiment will be described here while referring to the flowcharts shown in FIG. 4 to FIG. 12. The planing period to the sales period shown in FIG. 4 and FIG. 5 correspond to the corresponding periods shown in FIG. 2. At step SA1 shown in FIG. 4, the merchandise maker 1 and the publisher 2 mutually negotiate and determine the merchandise to be planned and developed (in the case, the watch). At step SA2, the merchandise maker 1 and the publisher 2 determine the target of selling the merchandise in consideration of the characteristics of the merchandise and marketing results. In this case, it is supposed that the selected targets are young office working men in the age group of 25 to 35 years, with full of individuality and sensibility.

At step SA3, the merchandise maker 1 and the publisher 2 set up the concept of the merchandise. Among the key words characterizing the young office working men, such as creativity, positiveness, recklessness, and freedom, suppose the concept of high spirit is selected. At step SA4, the merchandise maker 1 and the publisher 2 determine, on the basis of the merchandise, targets, concept, etc., the notice method to the customers $3_1$ to $3_n$, and the preview, including the merchandise design, specification, price setting, sales method, and other details of planning.

At step SA5, the publisher 2 builds up a system for executing the plan determined at step SA4. Precisely, the publisher 2 sets up the WWW server 33, news server 35, and others, and develops a program for realizing the home page 5. On the other hand, the merchandise maker 1 prepares the design as the preview by the CAD device 56. The design data is transferred through the Internet 20, and is incorporated into the HTML file operating on the WWW server 33.

Parallel to system build-up at step SA5, at step SA6, the publication 4 including an article announcing the plan is manufactured by the publisher 2. This article includes the merchandise concept, planning method, schedule, preview, URL (Uniform Resource Locator) of the home page 5 and other information. At step SA7, the plan is noticed to the customers $3_1$ to $3_n$.

That is, the plan is noticed by selling the publication 4 and opening the home page 5. The home page 5 shows the merchandise concept, planning method, schedule, preview design, etc. The reader reading the article in the publication 4 recognizes the URL of the home page 5, and can access the home page 5.

At step SA8, the WWW server 33 (merchandise maker 1 and publisher 2) judges if the preset customer needs survey period (see FIG. 2) is terminated or not, and in this case the result of judgement is NO. As a result, the process from step SA9 to step SA11 is executed parallel.

Herein, the inquiry process at step SA9 is the process of inquiring the customers accessing the home page 5 about the information of merchandise development. The electronic bulletin board process at step SA10 is the process for writing or looking up the electronic bulletin board opened by the news server 35. The mail process at step SA11 is the process of sending and receiving electronic mails among the customers $3_1$ to $3_n$, the merchandise maker 1, and the publisher 2, by utilizing the function of the mail server 61.

Suppose that the client 3, has browsed the home page 5. That is, when the WWW browser $11_1$ is started, the customer client $10_1$ accesses the WWW server 33 through the modem $13_1$, the Internet 20, router 30, firewall 31, and LAN 32 according to the URL entered by the customer $3_1$. As a result, the home page 5 appears on the display (not shown) of the customer client $10_1$.

Figure 13A:
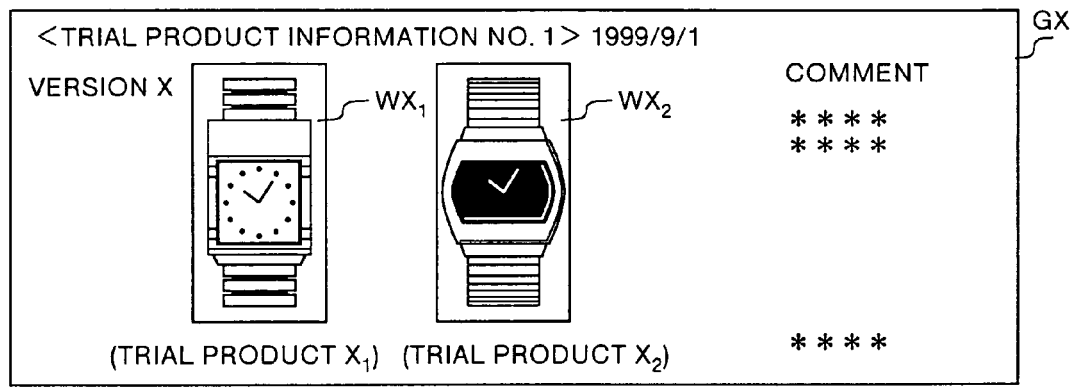
FIG. 13A to FIG. 13C show examples of version X trial product notice screen GX, version Y trial product notice screen GY, and version Z trial product notice screen GZ respectively in the first embodiment.

The home page 5 shows the version X trial product notice screen GX as the preview show, for example, in FIG. 13A, in addition to the merchandise concept, planning method and schedule. This version X trial product notice screen GX displays version X trial product image $WX_1$ and version X trial product image $WX_2$ about two kinds of trial products $X_1$ and $X_2$ (designs of the watch). The version X trial product image $WX_1$ and version X trial product image $WX_2$ are drafted by the CAD device 56 as the preview. By looking up the home page 5, the customer $3_1$ recognizes the merchandise concept and watch design, and evaluates the design.

Figure 6:
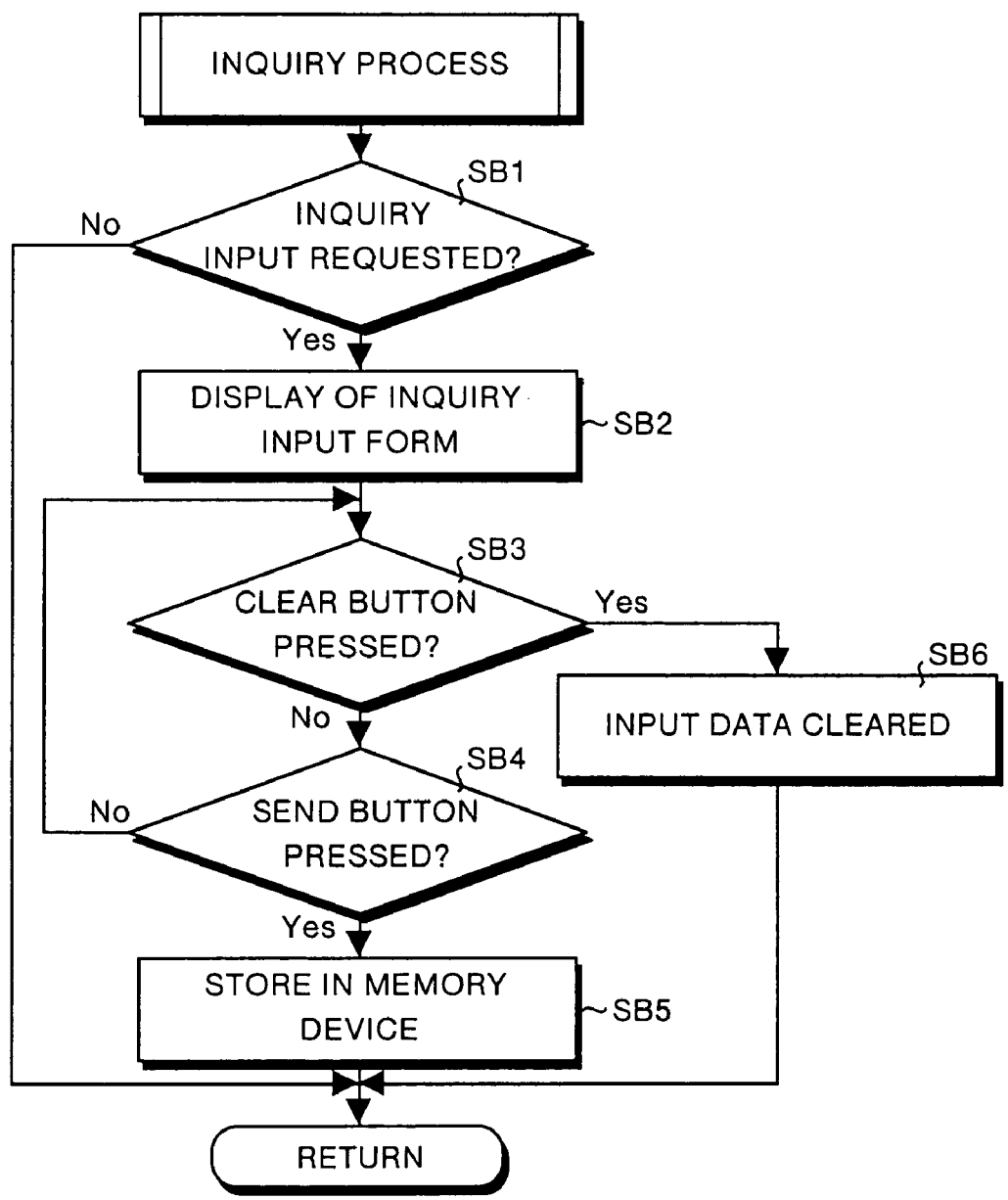
FIG. 6 is a flowchart explaining the inquiry process shown in FIG. 4.

In the inquiry process, at step SB1 shown in FIG. 6, the WWW server 33 judges if there is an inquiry input request for entering the inquiry to the customer looking up the home page 5 or not. Precisely, the WWW server 33 judges if the inquiry input button (not shown) on the home page 5 is pressed or not. If this result of judgement is NO, the WWW server 33 returns to the process in the main routine shown in FIG. 4.

In this case, supposing the inquiry request button on the browser is pressed by the customer $3_1$ at step SB2, the WWW server 33 displays the inquiry input form, that is, the inquiry input screen $G_2$ shown in FIG. 15 and FIG. 16 on the display of the customer client $10_1$. This inquiry input screen $G_2$ shows, aside from the customer personal information (name, . . . , e-mail), the inquiry items about the image of the trial product shown on the home page 5 (in this case, version X trial product image $WX_1$ and version X trial product image $WX_2$ shown in FIG. 13A) in choice format.

As shown in FIG. 15 and FIG. 16, the inquiry items are as follows. That is,

1. Interested in any product? (plurality of answers accepted),

2. You like which point? (plurality of answers accepted),

3. You don't like which point? (plurality of answers accepted),

4. You feel what image about the product? (plurality of answers accepted), and

5. You like to wear on which occasion? (plurality of answers accepted).

The product here is the trial product $X_1$ and trial product $X_2$ shown in FIG. 13A. The customer 3, selects or enters the answers sequentially in every inquiry item.

Returning to FIG. 6, at step SB3, the WWW server 33 judges if a clear button 76 shown in FIG. 16 is pressed or not. This clear button 76 is pressed when clearing the input items of the inquiry input screen $G_2$. If the result of judgement is YES, at step SB6, the WWW server 33 clears the input items of the inquiry input screen $G_2$, and returns to the process in the main routine shown in FIG. 4.

If the result of judgement at step SB3 is NO, at step SB4, the WWW server 33 judges if a send button 75 shown in FIG. 16 is pressed or not. Let us assume that the result of this judgement is NO. When all inputs of answers to the inquiry items on the inquiry input screen $G_2$ are over, the customer 3, pressed the send button 75 by manipulating the mouse or the like.

As a result, the WWW server 33 judges the result at step SB4 to be YES. At step SB5, the WWW server 33 stores the inquiry answers in the inquiry answer result database in the memory device 34 by corresponding to the individual information. Hereinafter, the process of step SB1 to step SB5 is repeated, and the customer needs, evaluation and other information about the merchandise are sequentially accumulated in the inquiry result database.

Figure 7:
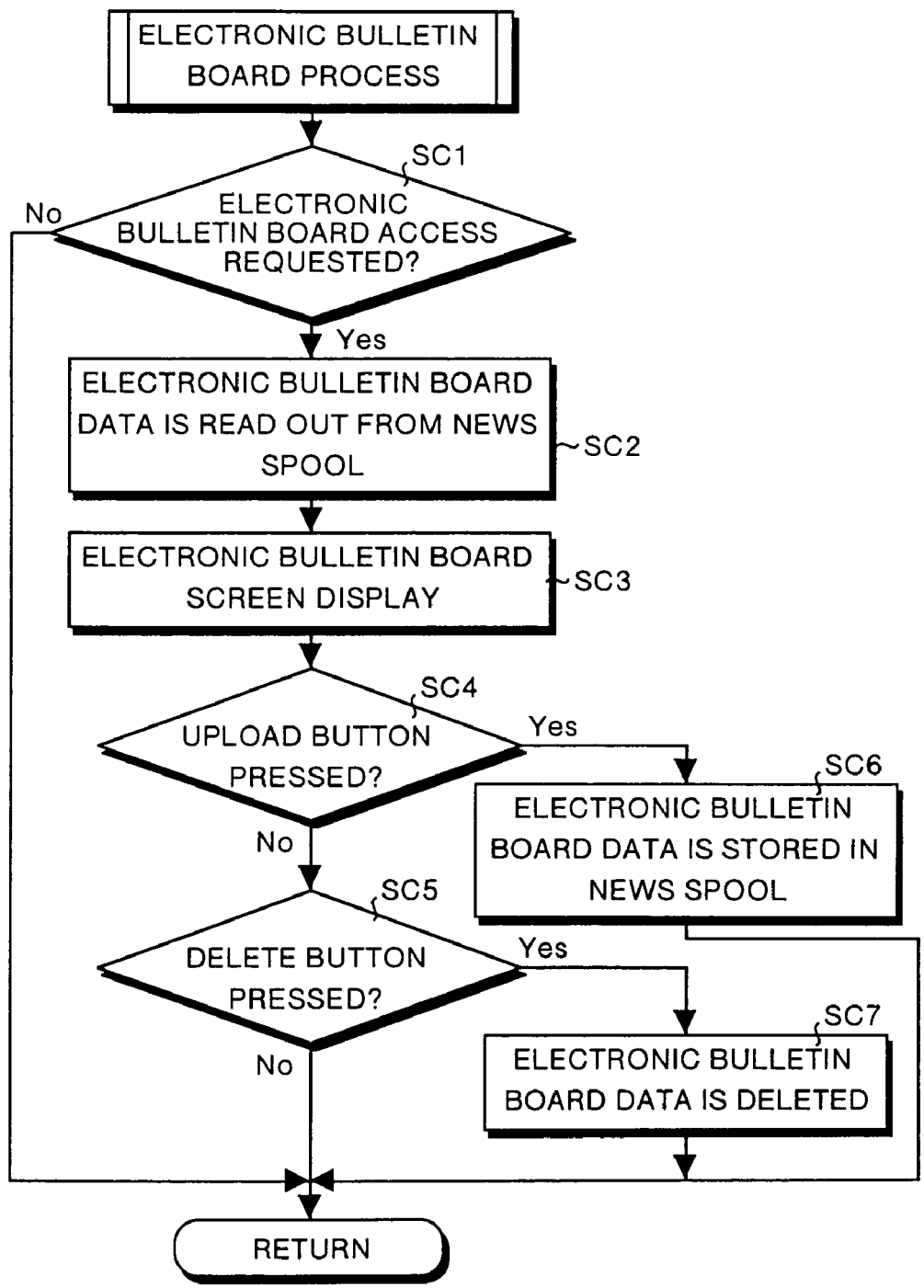
FIG. 7 is a flowchart explaining the electronic bulletin board process shown in FIG. 4 and FIG. 5.

In the electronic bulletin board processing, at step SC1 shown in FIG. 7, the news server 35 judges if there is any access request to the electronic bulletin board from the customer browsing the home page 5, the merchandise maker 1 or the publisher 2. The new server 35 operates together with the WWW server 33. Precisely, the news server 35 judges if an electronic bulletin board button (not shown) on the home page 5 has been pressed or not. If the result of judgement is NO, the news server 35 returns to the main routine shown in FIG. 4.

Herein, when uploading the impression about the merchandise or questions on the electronic bulletin board, the customer $3_1$ manipulates to press the electronic bulletin board button (not shown). As a result, the news server 35 judges the result at step SC1 to be YES. At step SC2, the news server 35 reads out the electronic bulletin board data from the news spool 37. At step SC3, the news server 35 displays the electronic bulletin board screen $G_1$ shown in FIG. 14 on the display of the customer client $10_1$. This electronic bulletin board screen $G_1$ shows an uploading information input section 70, electronic bulletin board data 73 uploaded in the past, and electronic bulletin board data 74.

The uploading information input section 70 is for input of the title of the electronic bulletin board data to be uploaded, category, personal information of the uploading customer (name, . . . , e-mail), and opinions. Herein, the category is intended to classify the objects of questions and opinions, which may be selected from the following. That is, 1) general design, 2) dial plate, 3) material, 4) hands, 5) wristband, 6) functions, 7) color, 8) price, 9) product name, 10) watch to like, watch to dislike, 11) celebrity supposed to look well with this watch, and 12) others.

The customer $3_1$ selects or enters the items in the uploading information input section 70 sequentially. Herein, the electronic bulletin board screen $G_1$ is used not only for writing of queries from the customer $3_1$ (questions, opinions), but also for writing of answers from the merchandise marker 1 or the publisher 2 to the queries. The electronic bulletin board screen $G_1$ also shows the electronic bulletin board data 73 uploaded in the past, aside from the new opinions, and the electronic bulletin board data 74, and therefore the electronic bulletin board screen $G_1$ is monitored not only by the customers but also by the merchandise maker 1 and the publisher 2.

Returning to FIG. 7, at step SC4, the news server 35 judges if an upload button 71 shown in FIG. 14 has been pressed or not. In this case, when all inputs about the uploading information input section 70 shown in FIG. 14 are over, the customer $3_1$ manipulates to press the upload button 71. As a result, the news server 35 judges the result at step SC4 to be YES.

At step SC6, the news server 35 stores the entered electronic bulletin board data in the news spool 37, and returns to the process in the main routine. The stored electronic bulletin board data is displayed in the electronic bulletin board screen $G_1$ as new data for review. The process at step SC1 to step SC4 and SC6 is repeated, and the electronic bulletin board data is sequentially accumulated in the news spool 37.

On the other hand, if the judgment at step SC4 is NO, then at step SC5, the news server 35 judges if a delete button 72 shown in FIG. 14 has been pressed or not. The delete button 72 is to delete the electronic bulletin board data entered in the uploading information input section 70. If the judgment is YES, at step SC7, the news server 35 deletes the electronic bulletin board data, and returns to the processing in the main routine shown in FIG. 4.

Figure 8:
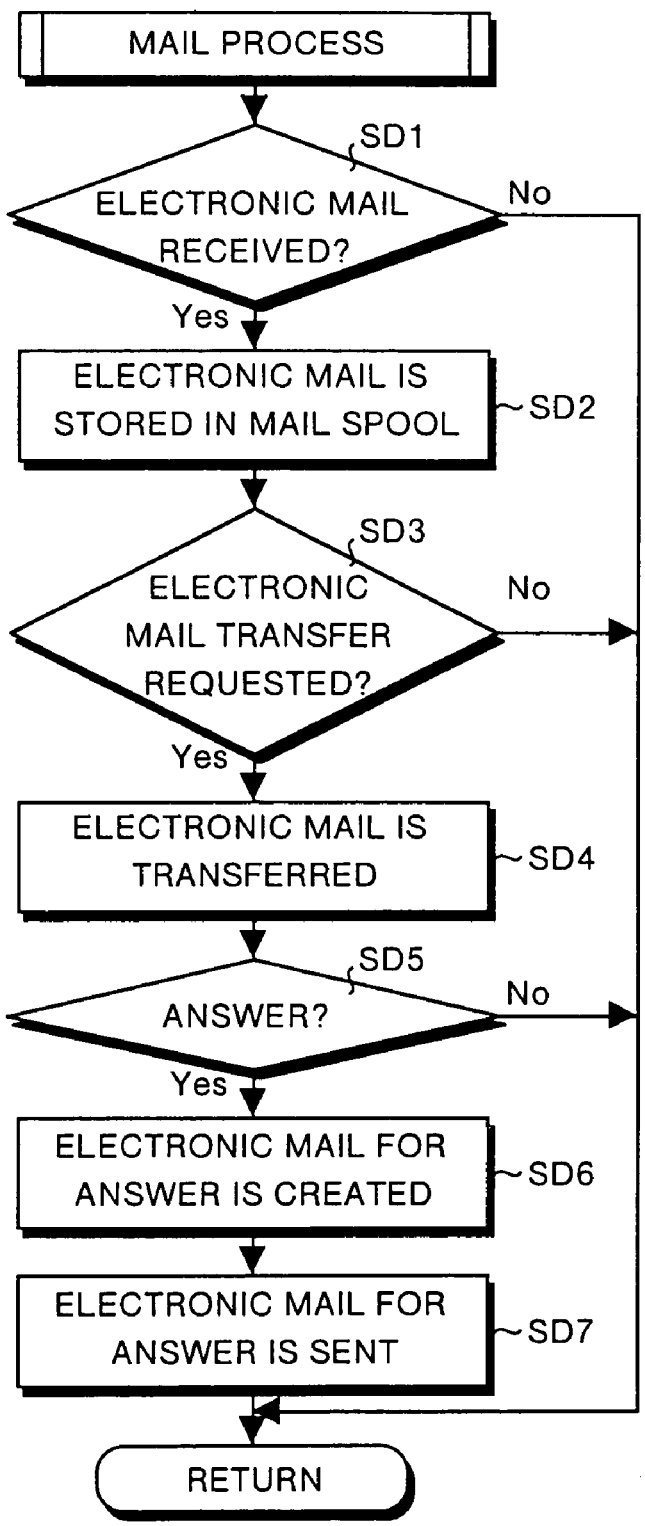
FIG. 8 is a flowchart explaining the mail process shown in FIG. 4 and FIG. 5.

In the mail processing, at step SD1 shown in FIG. 8, the mail server 61 judges if an electronic mail has been received or not. If judgment is NO, the mail server 61 returns to the processing in the main routine shown in FIG. 4. Herein, if the customer $3_1$ browsing the home page 5 queries about the merchandise planning and/or development, the customer $3_1$ starts up a mailer $12_1$ shown in FIG. 3, and prepares an electronic query mail QM including questions, and sends it to a merchandise maker client 53 (or a publisher client 40). The electronic query mail QM is received in the mail server 61 by way of the modem 131, the Internal 20, and the router 60.

Returning to FIG. 8, the mail server 61 judges YES at step SD1. At step SD2, the mail server 61 stores the received electronic mail (in this case, the query mail QM) in the mail spool 63. At step SD3, the mail server 61 judge if there is mail transfer request form the client. If the judgment is NO, mail server 61 returns to the process in the main routine shown in FIG. 4. Herein, if there is a mail transfer request from the merchandise maker client 53, the mail server 61 judges YES at step SD3.

At step SD4, the mail server 61 reads out the electronic query mail QM to the merchandise maker client 53 from the mail spool 63, and transfers it to the merchandise maker client 53 by way of the router 60, the Internet 20, router 50, firewall 51, and LAN 52 shown in FIG. 3. As a result, the query is displayed on the display of the merchandise maker client 53.

Returning to FIG. 8, at step SD5, the person in charge at the merchandise maker 1 judges if necessary to reply the query or not. If the judgment is NO, the process returns to the main routine shown in FIG. 4. In this case, if the reply is necessary, the person in charge judges at step SD5 to be YES. At step SD6, the person in charge starts up the mailer 55, and prepares an electronic answer mail AM including the reply (see FIG. 3).

At step SD7, the merchandise maker client 53 sends the answer mail AM to the customer client $10_1$ to the mail server 61 by way of the LAN 52, the firewall 51, router 50, the Internet 20, and router 60 and returns to the process in the main routine. The customer client $10_1$ receives the electronic answer mail AM, and displays the answer from the merchandise maker 1 on the display. As a result, the customer $3_1$ can recognize the answer. The other customers $3_2$ to $3_n$ same as the customer $3_1$ queries about the merchandise to the merchandise maker 1 (or the publisher 2) through the electronic mail, and receives the answers.

Returning to FIG. 4, at step SA12, needs of customers are analyzed on the basis of the contents of the inquiry result database, electronic bulletin board data, and electronic query mail QM. Precisely, the merchandise maker client 53 and publisher client 40 collect the inquiry result database, electronic bulletin board data, and electronic query mail QM. The merchandise maker 1 and the publisher 2 analyze the needs (reactions) of the customers about the trial products $X_1$ and $X_2$ shown in FIG. 13A.

At step SA13, the merchandise maker 1 and the publisher 2, receiving the analysis result of the needs at step SA12, discuss to improve the design and specification of the trial products $X_1$ and $X_2$ shown in FIG. 13A. At step SA14, the merchandise maker 1 and the publisher 2 determine the improved design and specification of the trial products. After the decision, at step SA15, the person in charge of design at the merchandise maker 1 drafts an improved trial product (design) by using the CAD device 56. The data of this design is transferred through the Internet 20, and is incorporated into the HTML file operating on the WWW server 33.

Figure 13B:
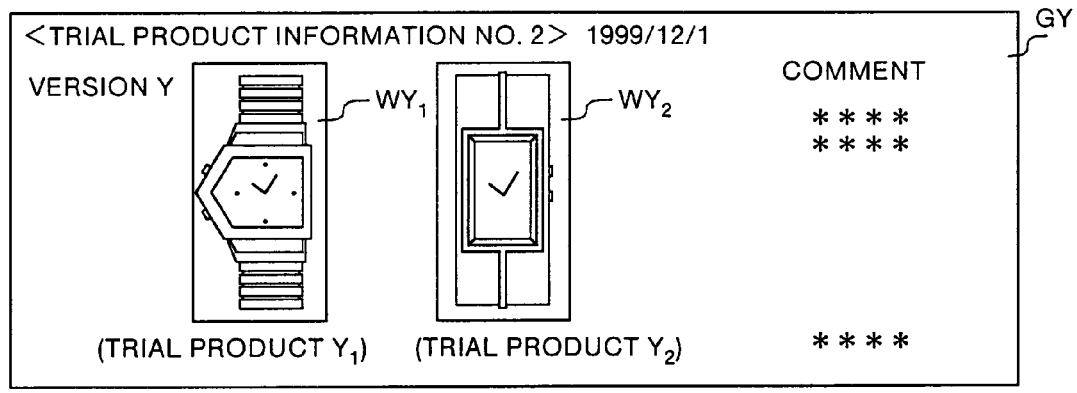

At step SA16, consequently, version Y trial product notice screen GY (improved trial product) shown in FIG. 13B is noticed to the customers $3_1$ to $3_n$ through the home page 5. The version Y trial product notice screen GY shows version Y trial product image $WY_1$ and version Y trial product image $WY_2$ about two improved trial products $Y_1$ and $Y_2$ (the watch designs). The customers $3_1$ to $3_n$ browsing the home page 5 recognize the improved designs, and evaluate the designs by the inquiry process, electronic bulletin board process, and mail process.

Figure 13C:
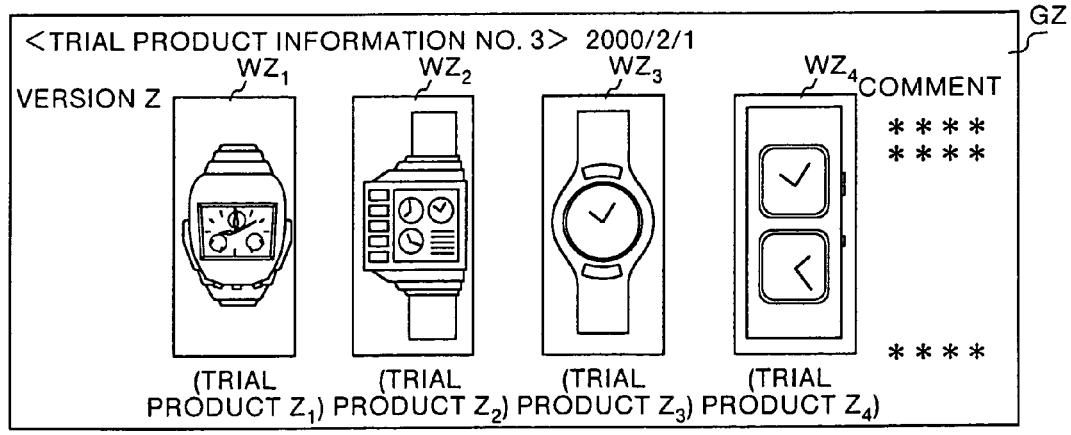

At step SA17, the WWW server 33 judges whether or not to execute the popularity investigation process for investigating the popularity about the trial products. Assume that the judgment made by the WWW server 33 is NO. Hereinafter, the same operation is repeated until the customer needs survey period is over. At step SA16, suppose version Z trial product notice screen GZ (improved trial product) shown in FIG. 13C is noticed to the customers $3_1$ to $3_n$ through the home page 5. The version Z trial product notice screen GZ shows version Z trial product images $WZ_1$ to version Z trial product image $WZ_4$ about four improved trial products $Z_1$ and $Z_4$ (the watch designs).

At step SA17, the WWW server 33 judges whether or not to execute the popularity investigation process for investigating the popularity about the trial products. Assume that the judgment made by the WWW server 33 is YES. This popularity investigation process is executed when the directivity of the design is no determined or the needs of customers are not understood. At step SA18, the popularity investigation process is executed.

Figure 9:
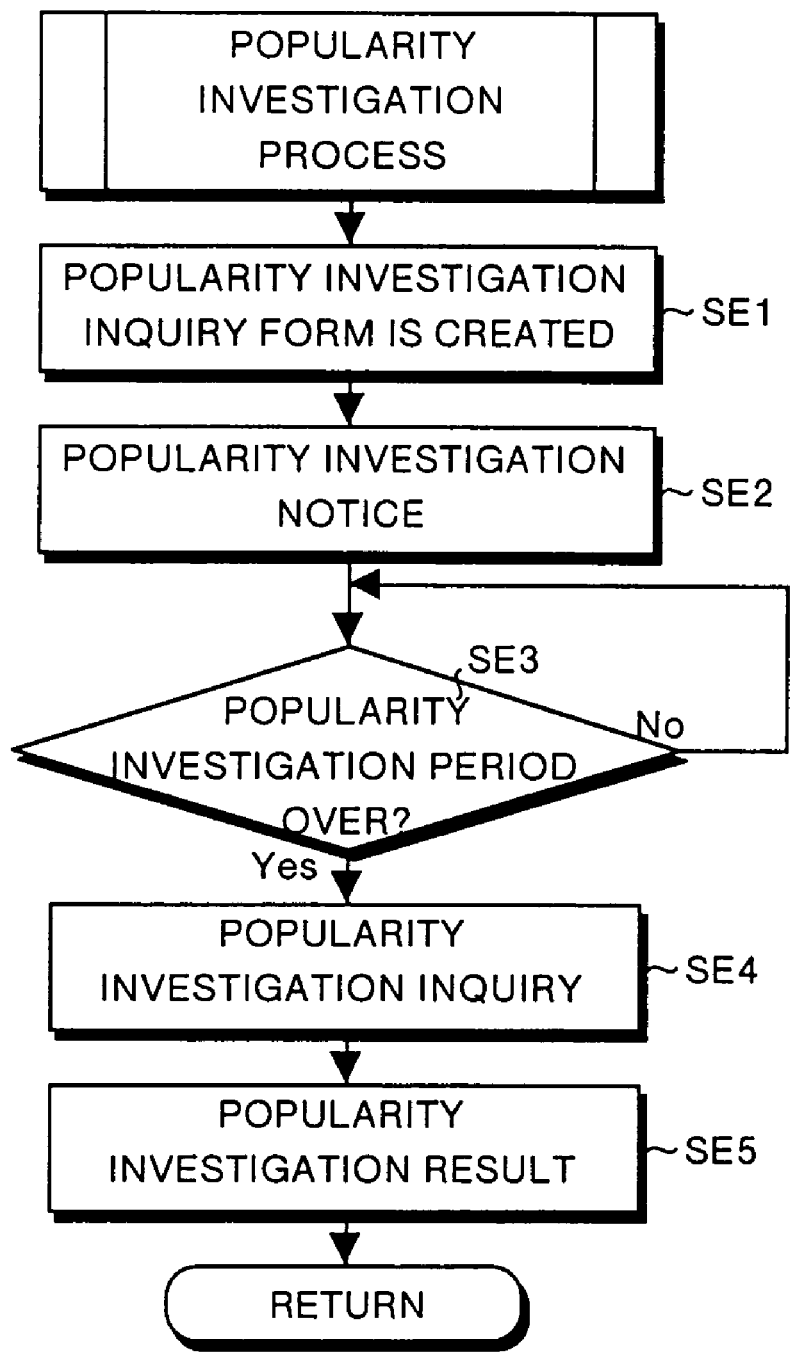
FIG. 9 is a flowchart explaining the popularity investigation process shown in FIG. 4.

That is, at step SE1 shown in FIG. 9, the WWW server 33 prepares a popularity investigation inquiry form. This popularity investigation inquiry form is same as shown in FIG. 15 and FIG. 16, and the trial products $Z_1$ to $Z_4$ shown in FIG. 13C are entered in the choice items corresponding to the inquiry item "1. Interested in any product?" shown in FIG. 15.

At step SE2, the WWW server 33 notices the execution of popularity investigation of trial products $Z_1$ to $Z_4$ shown in FIG. 13C to the customers $3_1$ to $3_n$ through the home page 5, by showing the period of popularity investigation and method of execution. The method of execution is, herein, to select the best product by the customers by using the popularity investigation inquiry form. At step SE3, the WWW server 33 judges if the popularity investigation period is over or not. In this case, the WWW server 33 makes the judgment as NO, and repeats the same judgement. Within the popularity investigation period, in the same procedure as in the inquiry process (see FIG. 6), the process using the popularity investigation inquiry form is executed.

Figure 17:
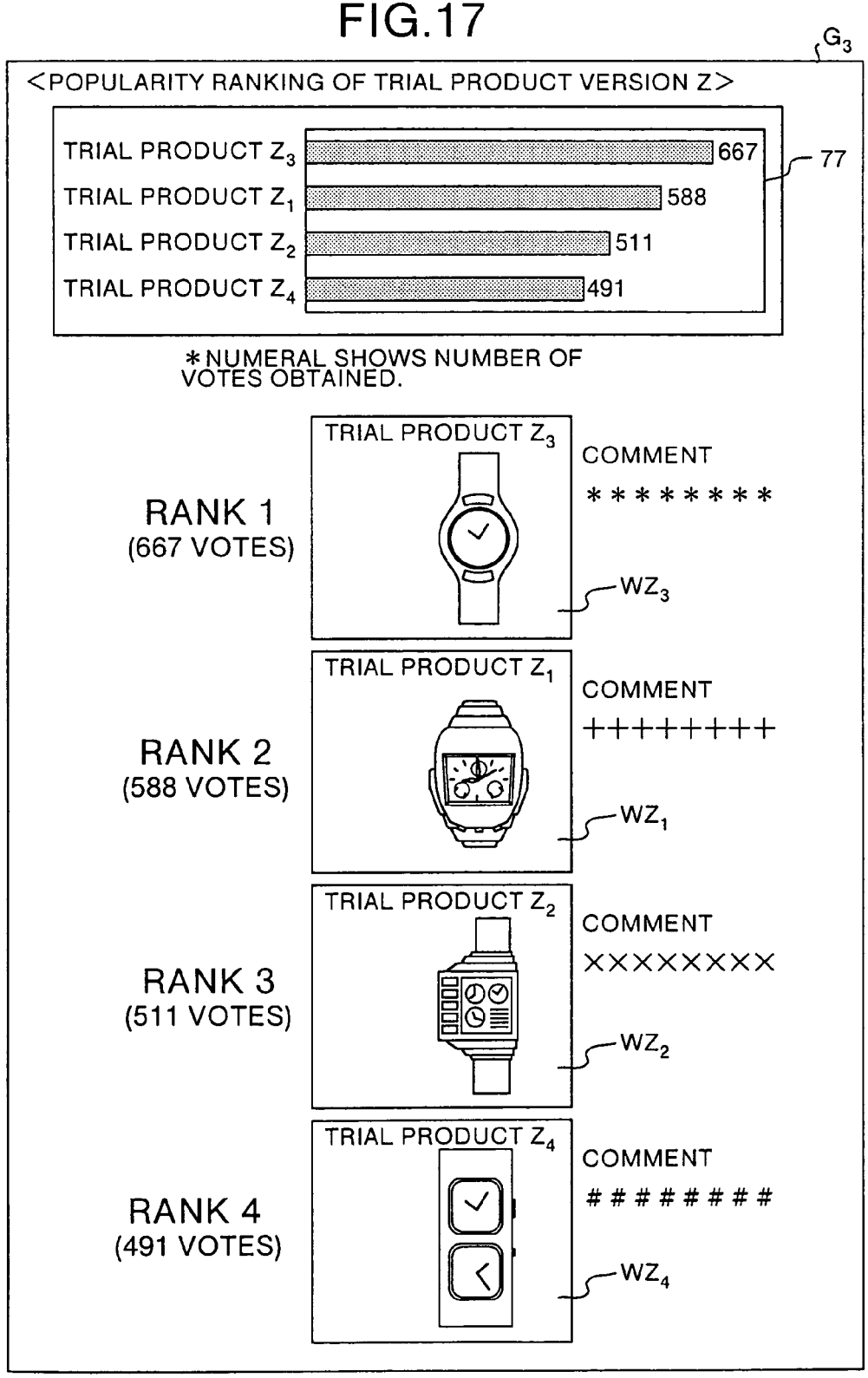
FIG. 17 is a diagram showing an example of popularity investigation result notice screen $G_3$ in the first embodiment.

When the popularity investigation period is over, the WWW server 33 makes a judgment as YES at step SE3. At step Se4, the WWW server 33 sums up the results of the popularity investigation. At step SE5, the WWW server 33 uploads the popularity investigation result notice screen $G_3$ shown in FIG. 17 on the home page 5 as the result of popularity investigation. The customers refer to the popularity investigation result notice screen $G_3$, and recognize the popularity ranking of trial products $Z_1$ to $Z_4$ shown in FIG. 13C.

This popularity investigation result notice screen $G_3$ shows the popularity investigation result graph 77 graphically showing the number of votes for the objects of investigation (in this case, trial products $Z_1$ to $Z_4$), and version Z trial product images $WZ_1$ to $WZ_4$ (see FIG. 13C) corresponding to the ranking. In this case, the popularity number 1 is the trial product $Z_3$ (gaining 667 votes), and number 4 is the trial product $Z_4$ (gaining 491 votes). Herein, the merchandise maker 1 and the publisher 2 can understand the needs of customers adequately from the result of the popularity investigation.

When the customer needs survey period is over, the WWW server 33 makes the judgment as YES at step SA8. At step SA19, needs of customers are comprehensively analyzed on the basis of the contents of the inquiry result database corresponding to the customer needs survey period, electronic bulletin board data, electronic query mail QM, and popularity investigation result. Precisely, the merchandise maker client 53 and publisher client 40 collect the inquiry result database corresponding to the customer needs survey period, electronic bulletin board data, electronic query mail QM, and popularity investigation result. Accordingly, the merchandise maker 1 and the publisher 2 comprehensively analyze general needs about the merchandise.

At step SA20, the merchandise maker 1 and the publisher 2, receiving the needs comprehensive analysis result at step SA19, determine finally the design and specification of the merchandise (mass production model). Receiving this decision, the person in charge of design at the merchandise maker 1 drafts the design of the merchandise (mass production model) by using the CAD device 56. This design data is transferred through the Internet 20, and is incorporated into the HTML file operating on the WWW server 33.

At step SA21, the merchandise maker 1 and the publisher 2, on the basis of the needs analysis result, determine the selling price zone in the light of the merchandise sales prediction, manufacturing cost, sales cost and others. The selling price zone is determined in the plurality of stages depending on the merchandise reserved quantity, and is set in the WWW server 33. Precisely, as shown in FIG. 18 and FIG. 19, the selling price is set to be lower in gradual steps depending on the increase in the number of reservations.

Figure 5:
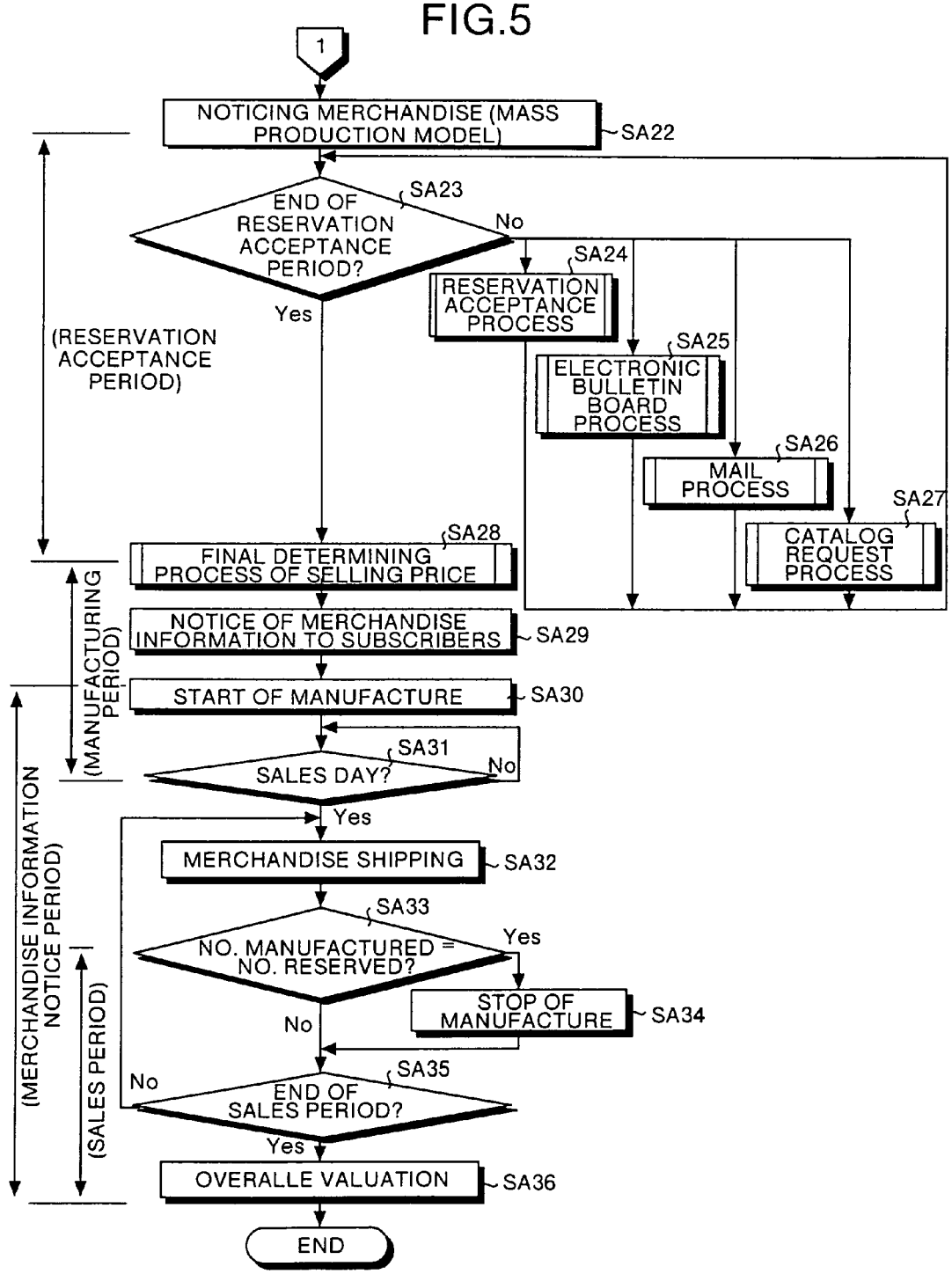
FIG. 5 is a flowchart explaining the operation of the first embodiment.
Figure 19:
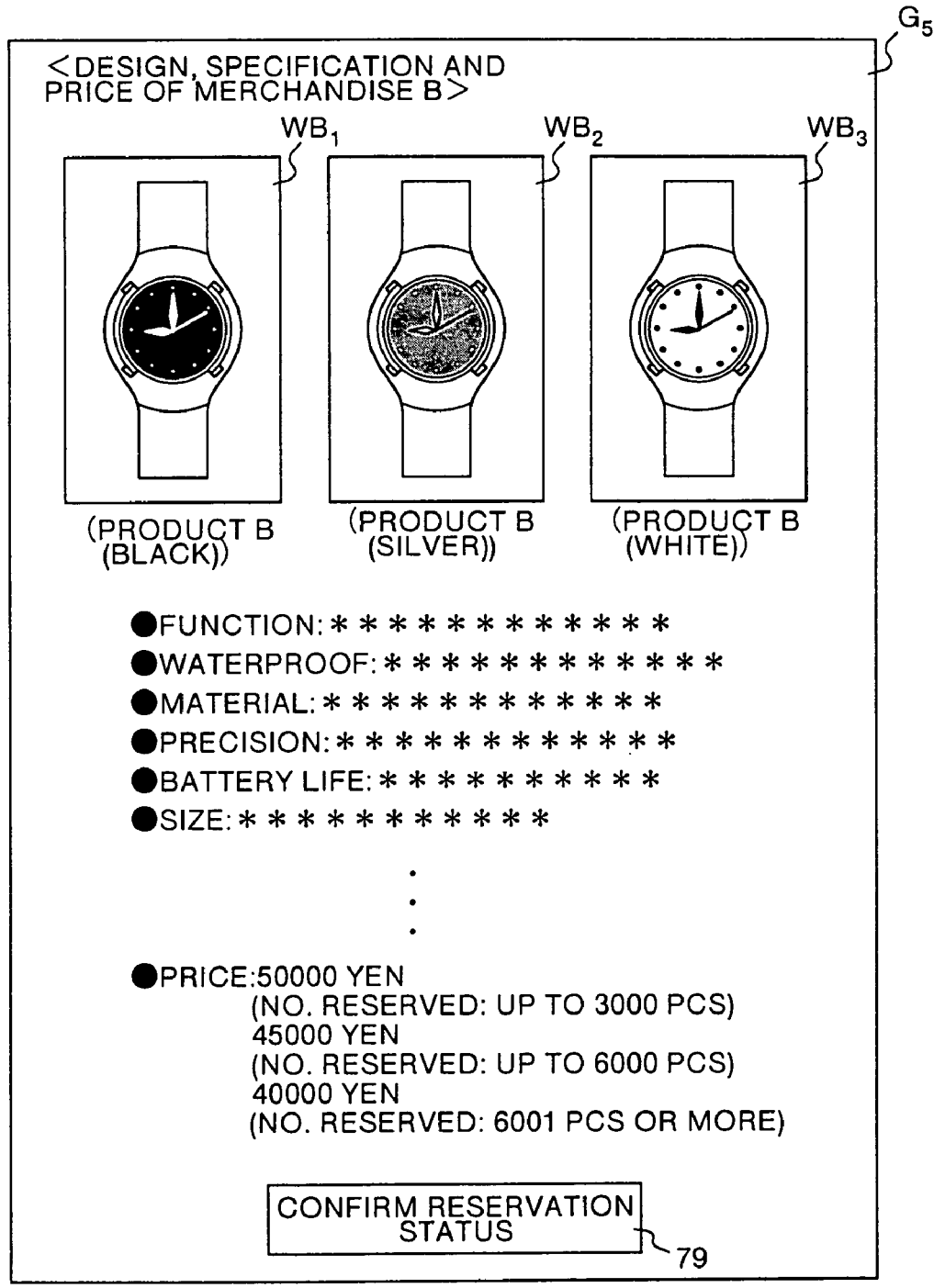
FIG. 19 is a diagram showing an example of merchandise (mass production model) notice screen $G_5$ in the first embodiment.

At step SA22 shown in FIG. 5, the WWW server 33 notices the merchandise (mass production model) to the customers $3_1$ to $3_n$ by displaying the merchandise (mass production model) notice screen $G_4$ shown in FIG. 18 and the merchandise (mass production model) notice screen $G_5$ shown in FIG. 19 on the home page 5. The merchandise (mass production model) notice screen $G_4$ shown in FIG. 18 shows the merchandise A (green) image $WA_1$ to merchandise A (blue) image $WA_3$, specification, price and others showing designs of different colors relating to one merchandise A.

In the similar manner, the merchandise (mass production model) notice screen $G_5$ shown in FIG. 19 shows the merchandise B (black) image $WB_1$ to merchandise B (white) image $WB_3$, specification, price and others showing designs of different colors relating to other merchandise B. Thus, it is ready to receive sales reservations about merchandise A or merchandise B. At step SA23, the WWW sever 33 judges if the reservation receiving period is over or not. In this case, the WWW sever 33 makes a judgment of NO. As a result, the process of step SA24 to step SA27 is executed parallel.

At step SA26, same as in the mail process at step SA11, mails about the merchandise A and B (see FIG. 18 and FIG. 19) are processed. At step SA25, same as in the electronic bulletin board process at step SA10, the electronic bulletin board process about the merchandise A and B is executed.

Figure 10:
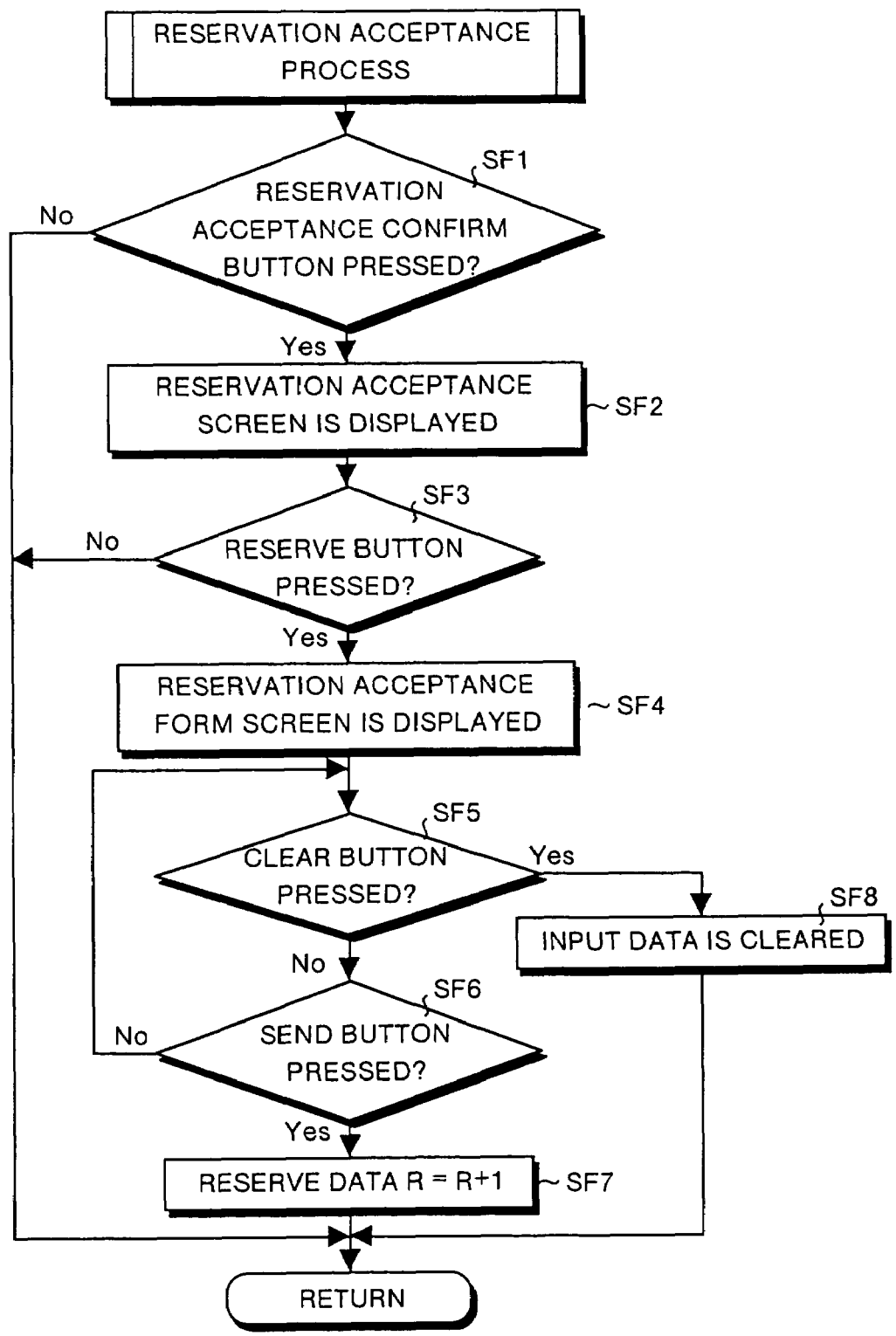
FIG. 10 is a flowchart explaining the reservation receiving process shown in FIG. 5.
Figure 11:
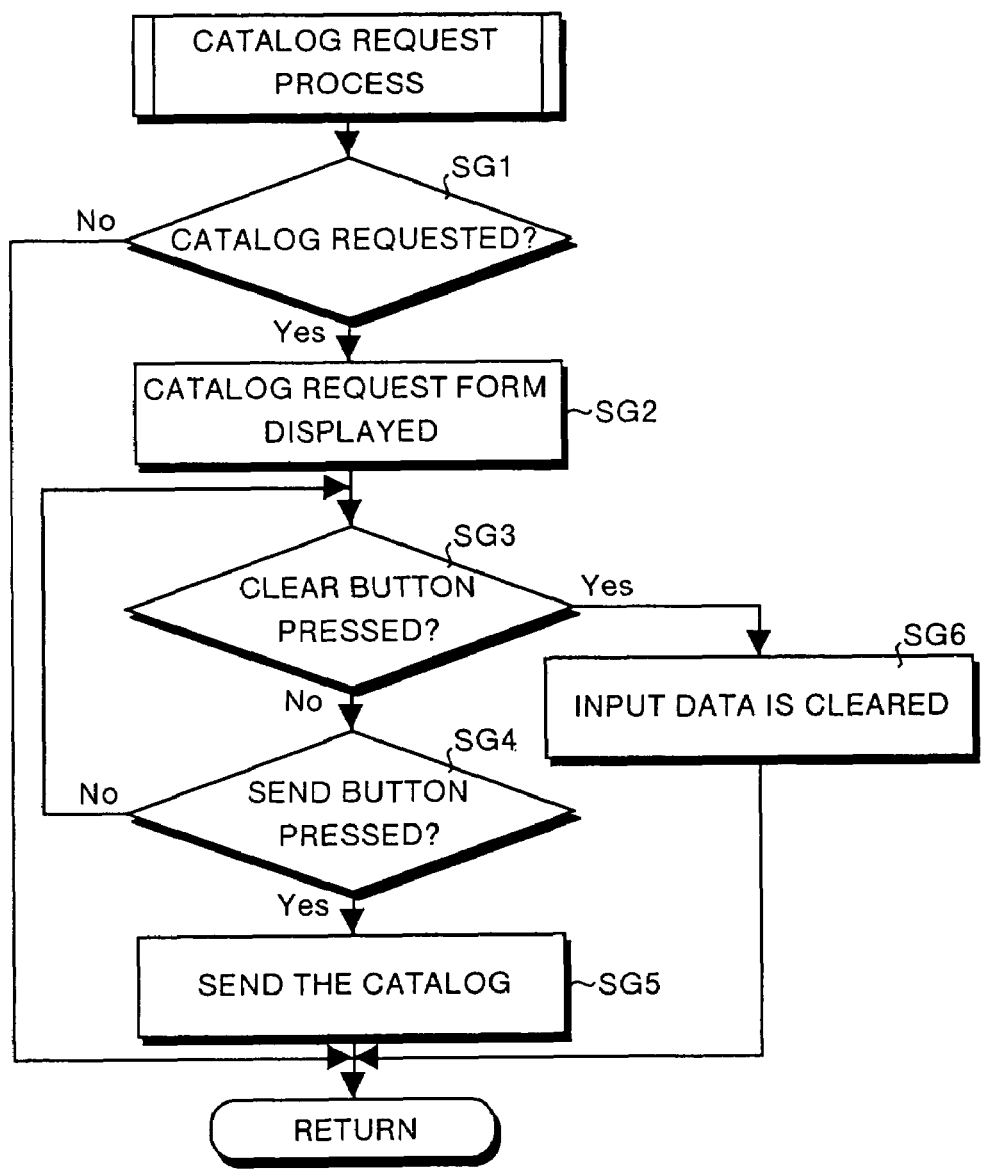
FIG. 11 is a flowchart explaining the catalog request process shown in FIG. 5.
Figure 12:
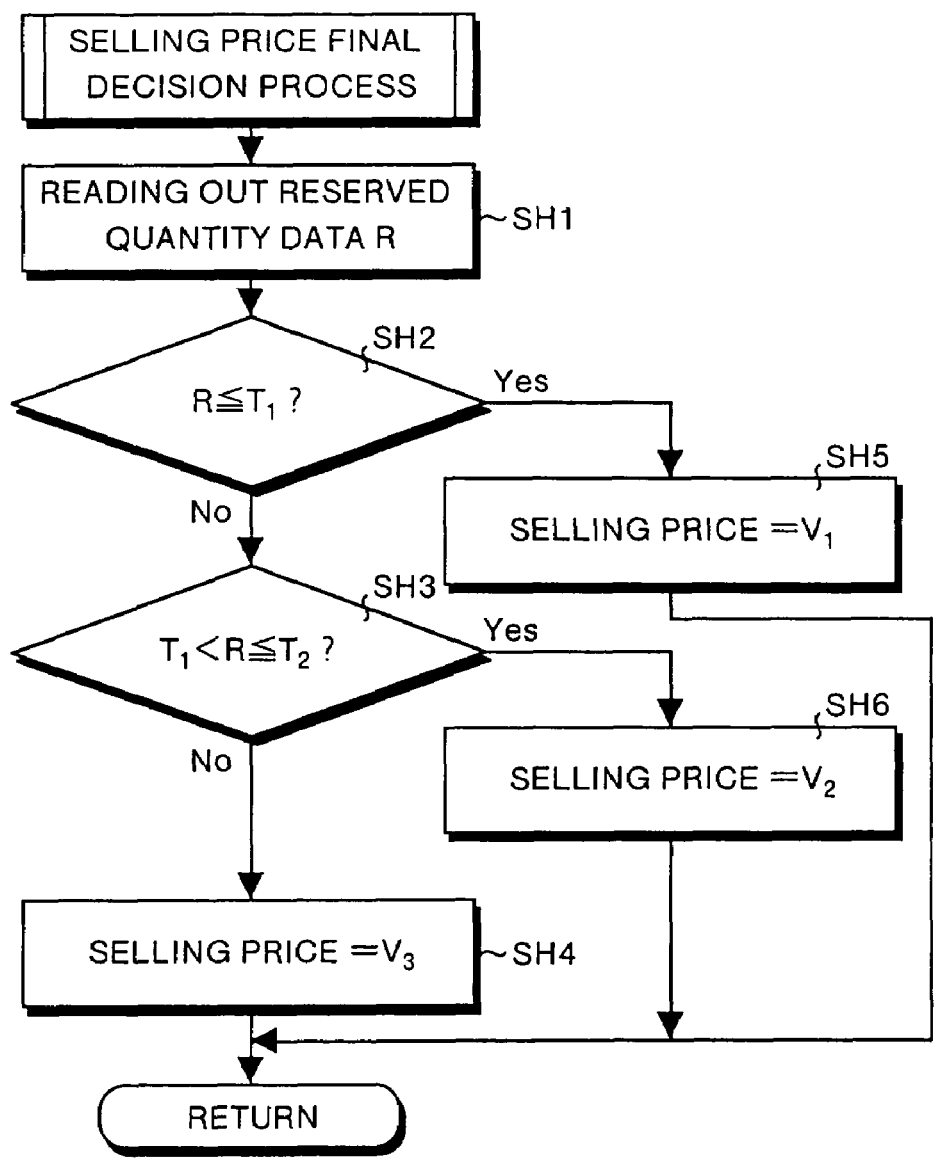
FIG. 12 is a flowchart explaining the selling price final decision process shown in FIG. 5.

The reservation receiving process at step SA24 is the process for receiving sales reservations about merchandise A or B from the customers $3_1$ to $3_n$ That is, in the reservation receiving process, at step SF1 shown in FIG. 10, the WWW server 33 judges if a reservation status confirm reservation status button 78 (see FIG. 18) or a confirm reservation status button 79 (see FIG. 19) is pressed or not by the manipulation of the customer looking up the merchandise (mass production model) notice screen $G_4$ or merchandise (mass production model) notice screen $G_5$. The reservation status confirm button 78 and reservation status confirm button 79 are buttons for confirming the reservation status of the merchandise A and B at the present.

For example, if the reservation status confirm button 78 shown in FIG. 18 is pressed by the manipulation of the customer $3_1$ the WWW server 33 makes a judgment of YES at step SF1. If judged NO at step SF1, the WWW server 33 returns to the main routine shown in FIG. 5. In this case, at step SF2, the WWW server 33 displays a reservation status confirm screen $G_6$ shown in FIG. 20 on the display of the customer client $10_1$. At step SF3, the WWW server 33 judges if a reserve button 81 shown in FIG. 20 is pressed by the customer or not, and if judged NO, it returns to the main routine in FIG. 5.

Figure 20:
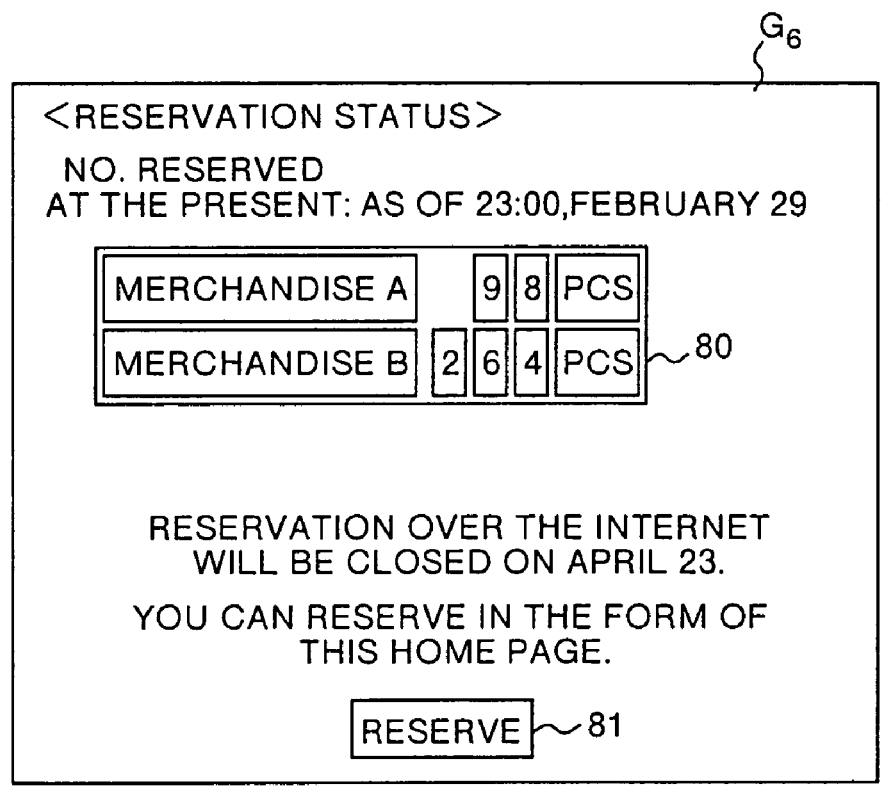
FIG. 20 is a diagram showing an example of reservation status confirm screen $G_6$ in the first embodiment.

A reservation status display 80 of the reservation status confirm screen $G_6$ shown in FIG. 20 displays the number of reservations (98 pieces) of merchandise A and the number of reservations (264 pieces) of merchandise B at the present time of 23:00 on February 29. Herein, when the reserve button 81 is pressed by the customer 3$_1$ the WWW server 33 makes a judgment of YES at step SF3. At step SF4, the WWW server 33 displays the reservation acceptance screen G$_7$ which is the reservation acceptance form shown in FIG. 21 on the display of the customer client 10$_1$.

This reservation acceptance screen G$_7$ shows, aside from the personal information of the customer (subscriber) (name, . . . , e-mail), a product name display 82 for input of the merchandise reserved for purchase (merchandise A (green), merchandise A (yellow), merchandise A (blue); see FIG. 18), and a reserved quantity display 83 for input of number of reservations. Further, the reservation acceptance screen G$_7$ shows a product name display 84 for input of the merchandise reserved for purchase (merchandise B (black), merchandise B (silver), merchandise B (white); see FIG. 19), and a reserved quantity display 85 for input of number of reservations. The customer 3$_1$ enters necessary reservation information in the product name display 82, reserved quantity display 83, product name display 84, and reserved quantity display 85.

Returning to FIG. 10, at step SF5, the WWW server 33 judges if a clear button 87 shown in FIG. 21 is pressed or not. The clear button 87 is pressed when clearing the input data in the reservation acceptance screen G$_7$. If the judgment made at step SF5 is YES, then at step SF8 the WWW server 33 clears the input data in the reservation acceptance screen G$_7$, and returns to the process in the main routine shown in FIG. 5.

If the judgment made at step SF5 is NO, then at step SF6 the WWW server 33 judges if a send button 86 shown in FIG. 21 is pressed or not. In this case, the WWW server 33 makes a judgment as NO. If the customer 3, presses the end button 86, the WWW server 33 makes a judgment as YES. At step SF7, the WWW server 33 increments the reserved quantity data R by one, and returns to the main routine. This reserved quantity data R is the data showing the number of reserved pieces of merchandise A and B. The reserved quantity data R is stored in the memory device 34.

The catalog request process at step SA27 shown in FIG. 5 is a process for accepting the catalog request of paper medium relating to merchandise A or B. That is, in the catalog request process, at step SG1 shown in FIG. 11, the WWW server 33 judges if a catalog request button (not shown) displayed on the home page 5 is pressed by the customer or not. If the WWW server 33 makes a judgment as NO, then the process returns to the main routine shown in FIG. 5.

In this case, if the customer 3$_1$ presses the catalog request button (not shown), the WWW server 33 makes a judgment as YES at step SG1. At step SG2, the WWW server 33 displays a catalog request screen G$_8$ shown in FIG. 22 on the display of the customer client 10$_1$. This catalog request screen G$_8$ shows the personal information of the customer 3$_1$ (the catalog requesting person) (name, . . . , e-mail). The customer 3$_1$ enters the personal information.

Returning to FIG. 11, at step SG3, the WWW server 33 judges if a clear button 89 shown in FIG. 22 is pressed or not. This clear button 89 is pressed when clearing the input content of the catalog request screen G$_8$. If the judgment at step SG3 is YES, then at step SG6 the WWW server 33 clears the input data of the catalog request screen G$_8$, and the process returns to the main routine shown in FIG. 5.

If the judgment at step SG3 is NO, then at step SG4 the WWW server 33 judges if a send button 88 shown in FIG. 22 is pressed or not. In this case, the WWW server 33 makes a judgment as NO. However, if the customer 3$_1$ presses the send button 88, the WWW server 33 makes a judgment at step SG4 as YES. As a result, at step SG5, the catalog is dispatched to the customer 3$_1$. Hereinafter, this operation is repeated until the reservation receiving period is terminated.

When the reservation receiving period is terminated, the WWW server 33 makes a judgment of YES at step SA23 shown in FIG. 5. At step SA28, the WWW server 33 executes the selling price final decision process for determining finally the selling price depending on the number of reservations. That is, at step SH1 shown in FIG. 12, the WWW server 33 reads out the reserved quantity data R at the tend of reservation acceptance. At step SH2, the WWW server 33 judges if the reserved quantity data R is blow the threshold T$_1$ (for example, 3000; see FIG. 18 and FIG. 19) or not.

If the judgment made at step SA23 is YES, at step SH5, the WWW server 33 sets the selling price at V$_1$. For example, when the number of reservations about the merchandise A shown in FIG. 18 is less than 3000 pieces, the selling price V$_1$ of the merchandise A is 30,000 yen. Similarly, if the number of reservations about the merchandise B shown in FIG. 19 is less than 3000 pieces, the selling price V$_1$ of the merchandise B is 50,000 yen.

On the other hand, if the judgment at step SH2 is NO, going to step SH3, the WWW server 33 judges if the reserved quantity data R is over the threshold T$_1$ (for example, 3000 pieces) and less than the threshold T$_2$ (for example, 6000 pieces). If the judgment made at step SH2 is YES, then at step SH6 the WWW server 33 sets the selling price at V$_2$.

For example, if the number of reservations for the merchandise A shown in FIG. 18 is 5000 pieces, the selling price V$_2$ of the merchandise A is 25,000 yen, a discount of 5,000 yen from the case of less than 3000 pieces. Similarly, if the number of reservations for the merchandise B shown in FIG. 19 is 5500 pieces, the selling price V$_2$ of the merchandise B is 45,000 yen, a discount of 5,000 yen from the case of less than 3000 pieces.

If the judgment made at step SH3 is NO, the WWW server 33 judges that the reserved quantity data R is over the threshold T$_2$ (for example, 6000 pieces). At step SH4, the WWW server 33 sets the selling price at V$_3$. For example, if the number of reservations for the merchandise A shown in FIG. 18 is 7000 pieces, the selling price V$_3$ of the merchandise A is 20,000 yen, a further discount of 5,000 yen. Similarly, if the number of reservations for the merchandise B shown in FIG. 19 is 7500 pieces, the selling price V$_3$ of the merchandise B is 40,000 yen, a further discount of 5,000 yen.

Returning to FIG. 5, at step SA29, the WWW server 33 notices the merchandise information (the finally determined price, specification, design, etc.) to the subscribers through the home page 5. At step SA30, the merchandise maker 1 starts manufacture of merchandise A and B. At step SA31, the merchandise maker 1 judges if reaching the sales day of the merchandise A and B or not. At step SA31 the merchandise maker 1 makes a judgment of NO and repeats the judgement. On the sales day, the merchandise maker 1 makes a judgment of YES at step SA31.

At step SA32, the merchandise maker 1 distributes the merchandise A and B to the subscribers in the sequence of reservations. At step SA33, the merchandise maker 1 judges if the number of manufactured pieces of merchandise A and B is equal to the number of reservations (reserved quantity data R), and it is judged NO herein. At step SA35, the merchandise maker 1 judges if the sales period is over or not, and it is judged NO. Hereinafter, the merchandise A and B will be sequentially distributed to the subscribers.

If the merchandise maker 1 makes a judgment of YES at step SA33, then at step SA34 the merchandise maker 1 judges that the number of manufactured pieces has coincided with the number of reservations, and stops manufacture of merchandise A and B. If the merchandise maker 1 makes a judgment of YES at step SA35, hen at step SA36 the merchandise maker 1 and the publisher 2 evaluate the series of process from planning and development to sales of the merchandise comprehensively, and feed back the result of the overall evaluation to planning and development of next merchandise.

As explained herein, according to the first embodiment, the opinion information of customers is collected interactively by the electronic bulletin board, electronic mail or inquiry through the Internet 20, and the merchandise information suited to the needs of customers on the basis of the opinion information is noticed, and therefore differentiation of the merchandise can be expressed, and versatile needs of individual customers can be fed back to development of new merchandise.

Further, since the trial product information is noticed through the Internet 20 according to the needs of customers on the basis of the opinion information, trial products can be manufactured the plurality of times, and the needs of customers can be adequately fed back to the development of new merchandise.

Further, since the popularity of the plurality of trial products is investigated in the planning or development stage, at step SA18, on the basis of the results of investigation, needs of customers can be understood quickly and easily.

Further, since the sales reservations are collected at step SA24, and the selling price of the new merchandise is determined so as to be lower in proportion to increase in the number of sales reservations (step SA28), it is not necessary to keep an excessive stock, and the service of higher quality is presented to the customers at lower price.

Figure 23:
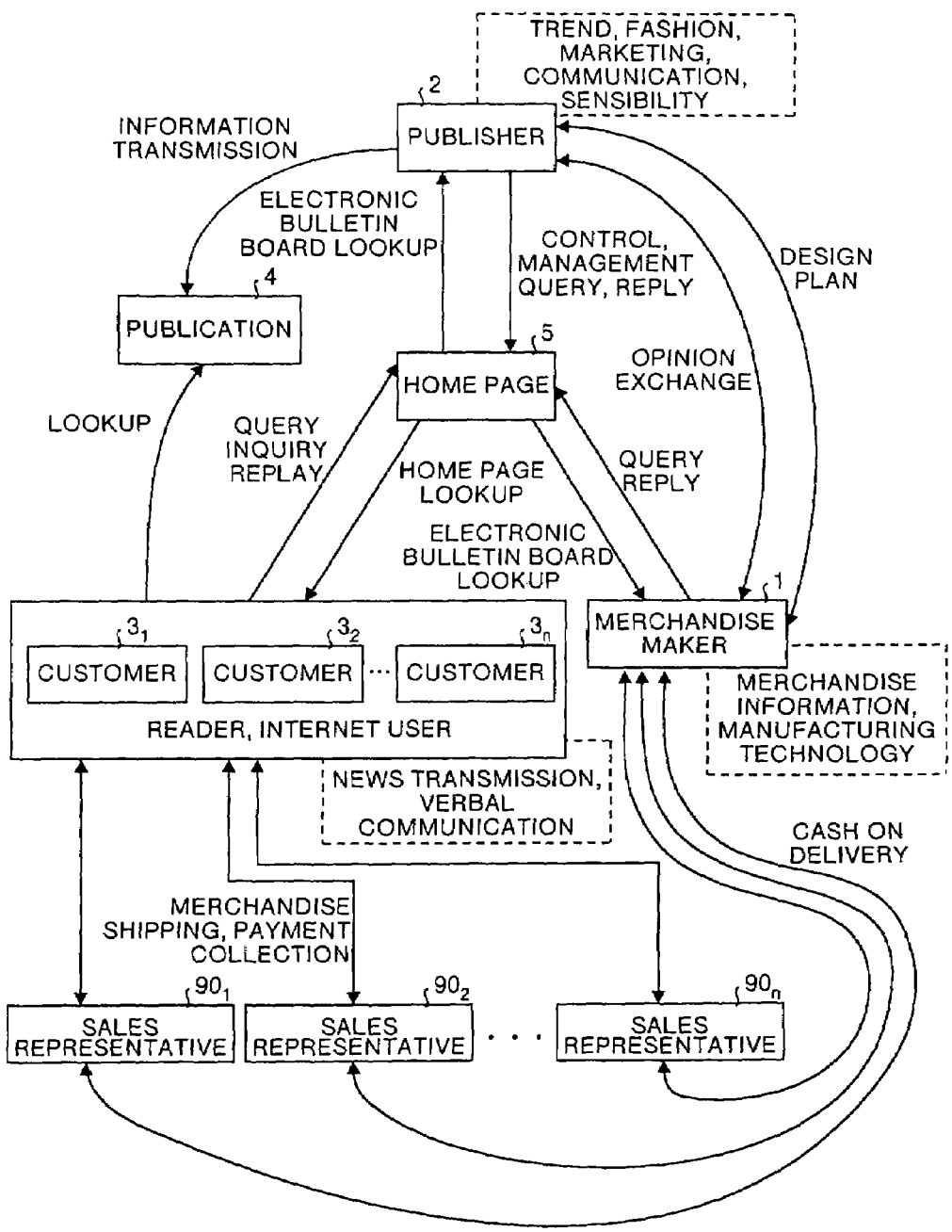
FIG. 23 is a diagram explaining an outline of a second embodiment of the invention.

FIG. 23 is a diagram explaining the outline of the second embodiment of the invention. Those components that perform same or similar functions as the components shown in FIG. 1 have been provided with the same legends. Sales representatives $90_1$ to $90_n$ have been newly provided in this second embodiment. These sales representatives $90_1$ to $90_n$ are, for example, convenience stores, and they sell the merchandise supplied from the merchandise maker 1 to the customers $3_1$ to $3_n$ (subscribers of the merchandise) in place of the merchandise maker 1.

The sales representatives $90_1$ to $90_n$ remit the amount of money received from the customers $3_1$ to $3_n$ to the bank account of the merchandise maker 1 by on-line banking or the like. The merchandise maker 1 ships the developed merchandise (mass production model) before sales day to the sales representatives $90_1$ to $90_n$, and collects the money of the sold merchandise from the sales representatives $90_1$ to $90_n$ after sales by on-line banking or the like. In the second embodiment, in addition to the merchandise sale through the sales representatives $90_1$ to $90_n$ mentioned above, the merchandise is also soled by the cash on delivery system.

Figure 25:
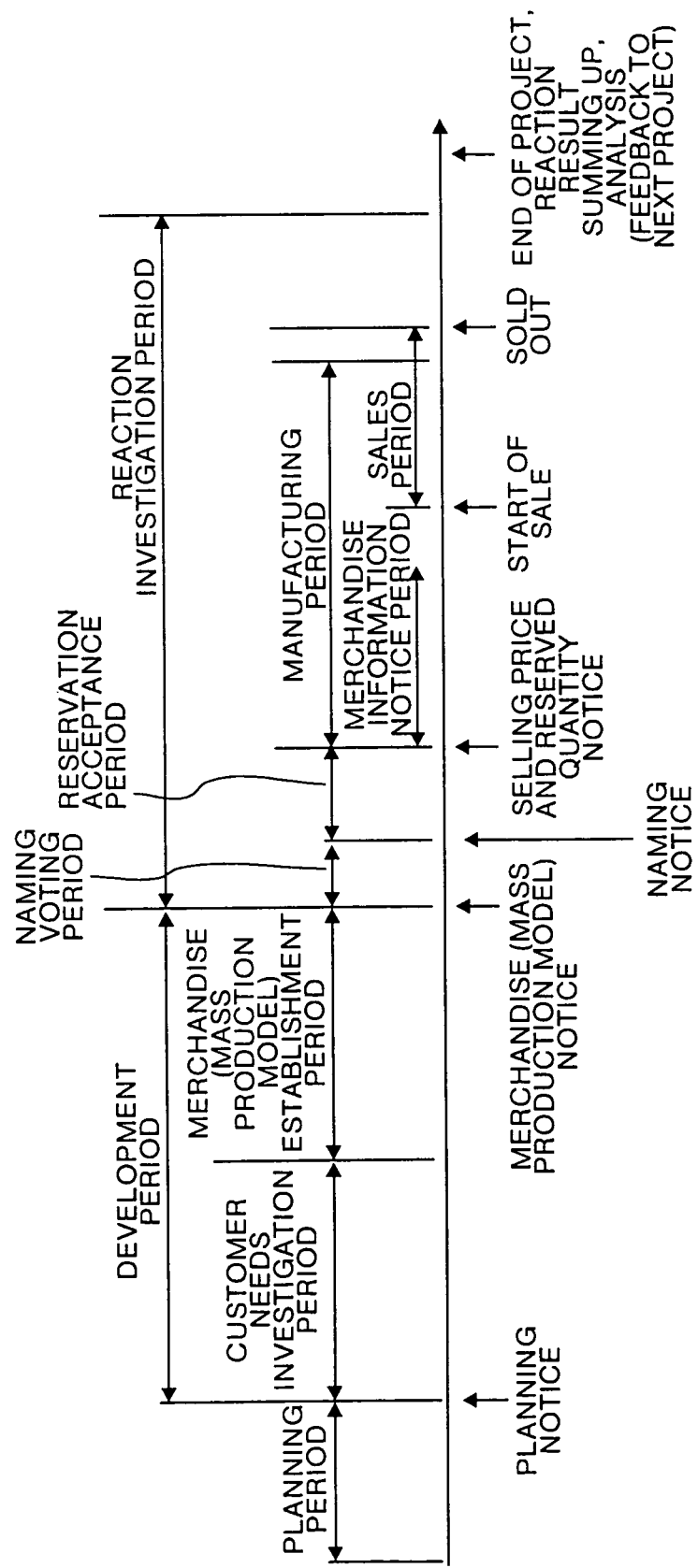
FIG. 25 is a diagram showing the schedule from planning and/or development of merchandise to end of planning in the second embodiment.

FIG. 25 shows the schedule from planning and/or development of merchandise to end of planning in the second embodiment. Portions that correspond to those in FIG. 2 have been provided with the same legends. In FIG. 25, the naming voting period and reaction investigation period are newly provided.

In the naming voting period, through the home page on the Internet, naming of the merchandise (mass production model) is widely voted and determined. After termination of the naming voting period, the decided naming is announced on the home page. The reaction investigation period is the period from notice of the merchandise (mass production model) till end of planning. In this reaction investigation period, the reaction of customers about the merchandise (mass production model) is investigated by way of the home page.

Figure 24:
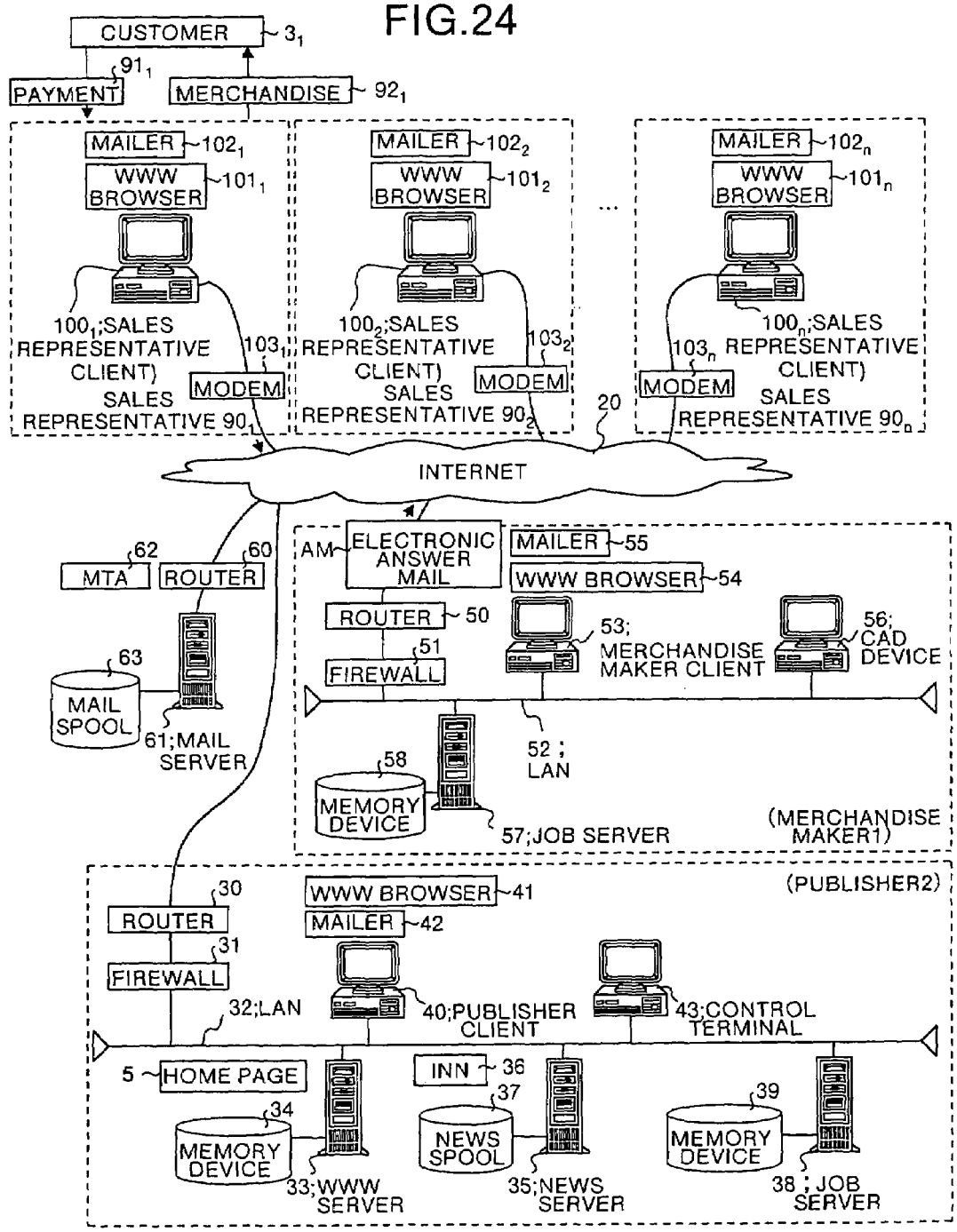
FIG. 24 is a diagram showing the configuration of the second embodiment.

A specific structure from planning and/or development of merchandise till end of planning is shown in FIG. 24. Components or portions that correspond to those shown in FIG. 3 and FIG. 23 are provided with the same legends. In FIG. 24, sales representative clients $100_1$ to $100_n$, WWW browsers $101_1$ to $101_n$, mailers $102_1$ to $102_n$, and modems $103_1$ to $103_n$ are newly provided. Although not shown in the diagram, same as in the case of the first embodiment, customer clients $10_1$ to $10_n$, WWW browsers $11_1$ to $11_n$, mailers $12_1$ to $12_n$, and modems $13_1$ to $13_n$ shown in FIG. 3 are also provided at the side of the customers $3_1$ to $3_n$.

The sales representative clients $100_1$ to $100_n$ are provided at the side of the sales representatives $90_1$ to $90_n$ (see FIG. 23), and are connected to the Internet 20. These sales representatives clients $100_1$ to $100_n$ are computer terminals for accessing the Internet according to the TCP/IP.

The sales representative client $100_1$ is composed of computer main body, display, keyboard, mouse and others, and is manipulated by the clerk at the sales representative $90_1$. The sales representative client $100_1$ receives presentation of various services on the Internet 20 through the WWW browser $101_1$ and mailer $102_1$, and also obtains the reservation information for selling, for example, merchandise $92_1$ to the customer $3_1$ from the job server 57. The merchandise $92_1$ is developed by the technique explained in the first embodiment, and the customer $3_1$ is a subscriber who has reserved to buy the merchandise $92_1$. The sales representative client $100_1$ is connected to the Internet 20 through the modem $103_1$.

The sales representative client $100_2$ is, same as the sales representative client $100_1$, composed of computer main body, display, keyboard, mouse and others, and is manipulated by the clerk at the sales representative $90_2$. The sales representative client $100_2$ receives, same as the sales representative client $100_1$, presentation of various services on the Internet 20 through the WWW browser $101_2$ and mailer $102_2$, and also obtains the reservation information for selling merchandise to the customer (subscriber) from the job server 57. The sales representative client $100_2$ is connected to the Internet 20 through the modem $103_2$.

The sales representative client $100_n$ is, same as the sales representative client $100_1$, composed of computer main body, display, keyboard, mouse and others, and is manipulated by the clerk at the sales representative $90_n$. The sales representative client $100_n$ receives, same as the sales representative client $100_1$, presentation of various services on the Internet 20 through the WWW browser $101_n$ and mailer $102_n$, and also obtains the reservation information for selling merchandise to the customer (subscriber) from the job server 57. The sales representative client $100_n$ is connected to the Internet 20 through the modem $103_n$.

Figure 26:
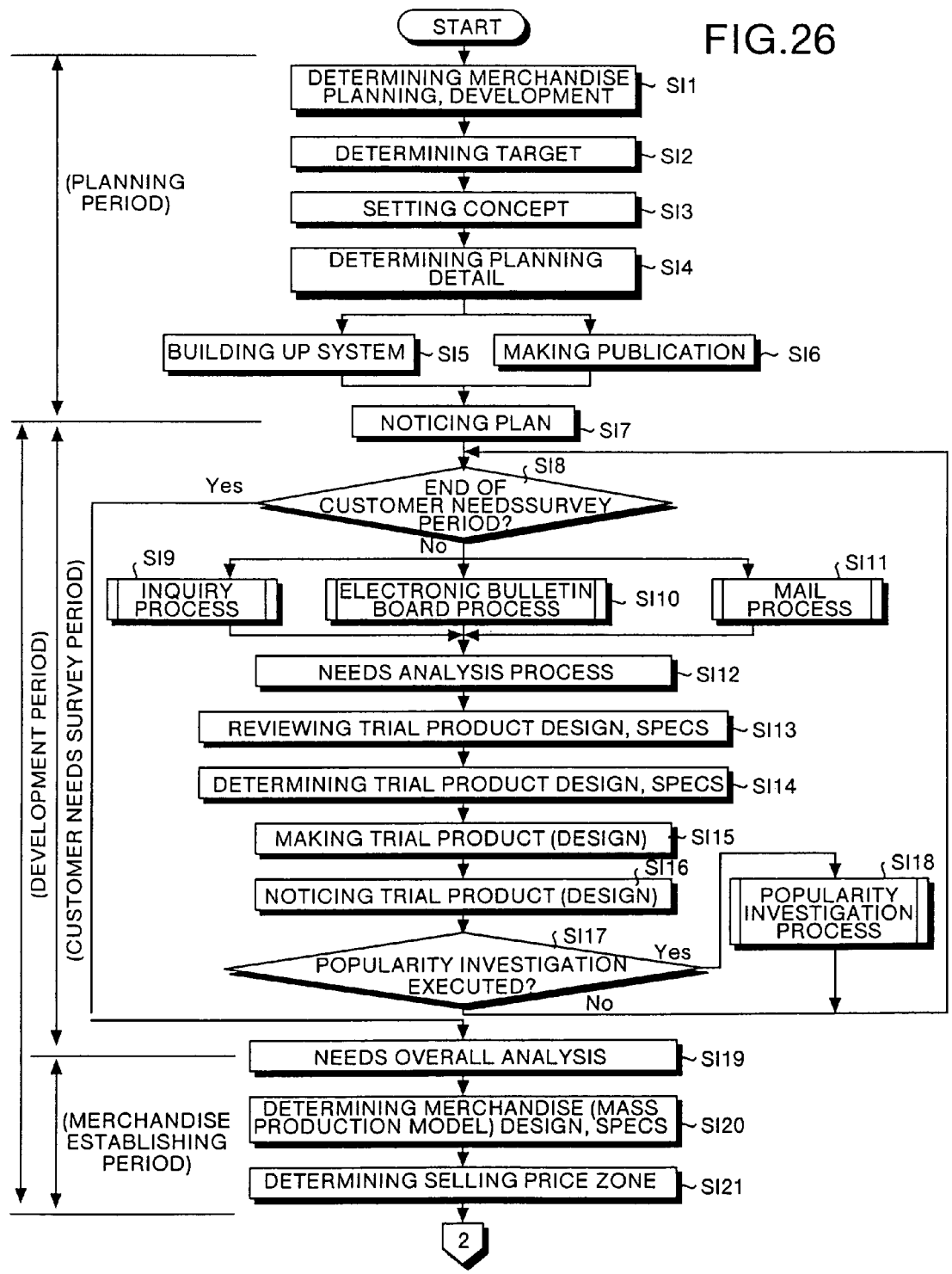
FIG. 26 is a flowchart explaining the operation of the second embodiment.
Figure 27:
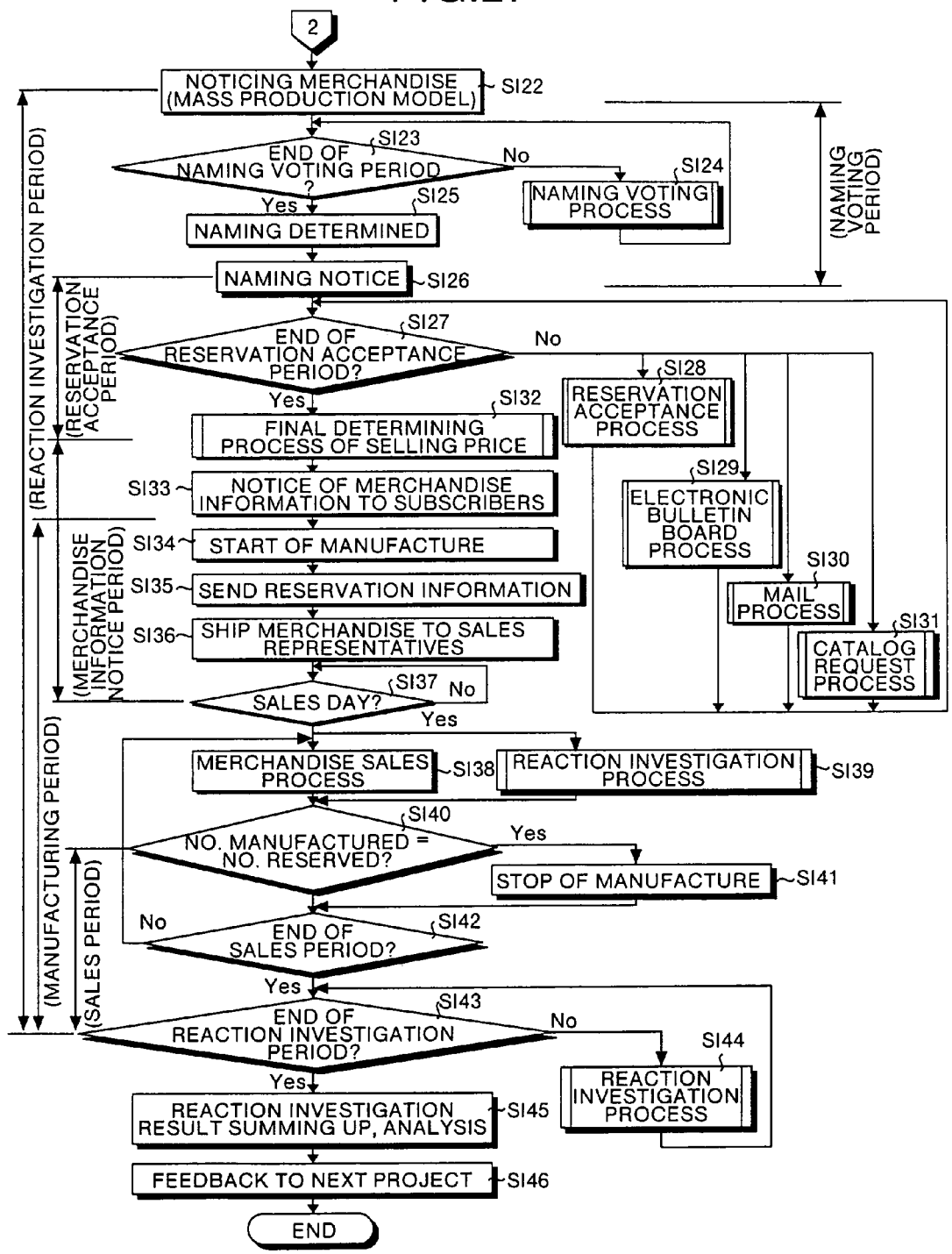
FIG. 27 is a flowchart explaining the operation of the second embodiment.

Operation of the second embodiment will be explained here while referring to the flowcharts in FIG. 26 to FIG. 29. Herein, the planning period to reaction investigation period shown in FIG. 26 and FIG. 27 correspond to each period shown in FIG. 25. Step SI1 to step SI21 shown in FIG. 26 are same as step SA1 to step SA21 shown in FIG. 4, and the detailed description is omitted. The operation on and after step SI22 shown in FIG. 27 is explained below.

Figure 30:
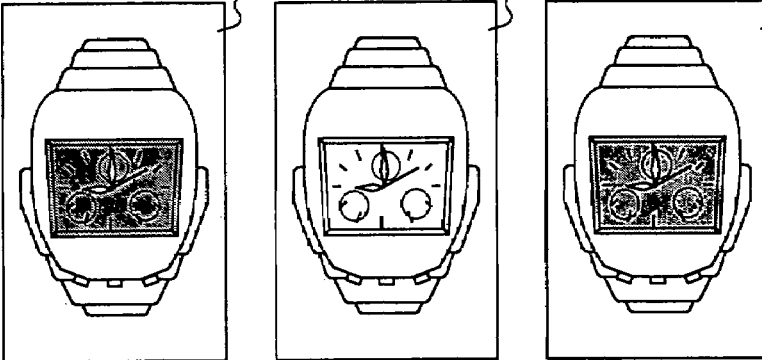
FIG. 30 is a diagram showing an example of merchandise (mass production model) notice screen $G_9$ in the second embodiment.

At step SI22 shown in the diagram, the WWW server 33 notices the merchandise (mass production model) to the customers 3 to 3, by showing the merchandise (mass production model) notice screen $G_9$ shown in FIG. 30 and the merchandise (mass production model) notice screen $G_{13}$ shown in FIG. 34 on the home page 5. The merchandise (mass production model) notice screen $G_9$ shown in FIG. 30 shows, same as the merchandise (mass production model) notice screen $G_4$, merchandise A (green) image $WA_1$ to merchandise A (blue) image $WA_3$, specification, price and others, relating to designs of different colors of one merchandise A, and also shows customize button 110 newly.

The customize button 110 is a button for displaying the screen for customizing the design and function of the components (for example, watch crystal or winding crown) for composing merchandise A. That is, when the customize button 110 is pressed, the WWW server 33 displays a merchandise A customizing parts selection screen $G_{10}$ shown in FIG. 31 on the home page 5.

The merchandise A customizing parts selection screen $G_{10}$ displays customizing watch crystal images $GAF_1$ to $GAF_3$, customizing winding crown images $GAR_1$, $GAR_2$, a customizing parts selector 111, and a customizing image button 112. The merchandise A customizing parts selection screen $G_{10}$ is a screen for allowing the customers wishing to customize merchandise A to select from the plurality of customizing parts differing in design.

The customizing watch crystal images $GAF_1$ to $GAF_3$ are images relating to three types of watch crystal $AF_1$ to $AF_3$ for customizing the merchandise A (see FIG. 30). These watch crystals $AF_1$ to $AF_3$ are different in design (including color and function), and are all prepared for merchandise A. The customizing winding crown images $GAR_1$ and $GAR_2$ are images of two types of winding crowns $AR_1$ and $AR_2$ for customizing the merchandise A. These winding crowns $AR_1$ and $AR_2$ differ in the head design, but are both prepared for merchandise A. Herein, the designs of the watch crystals $AF_1$ to $AF_3$ and winding crowns $AR_1$ and $AR_2$ are manufactured on the basis of the needs comprehensive analysis result at step SI19 (see FIG. 26).

Figure 32:
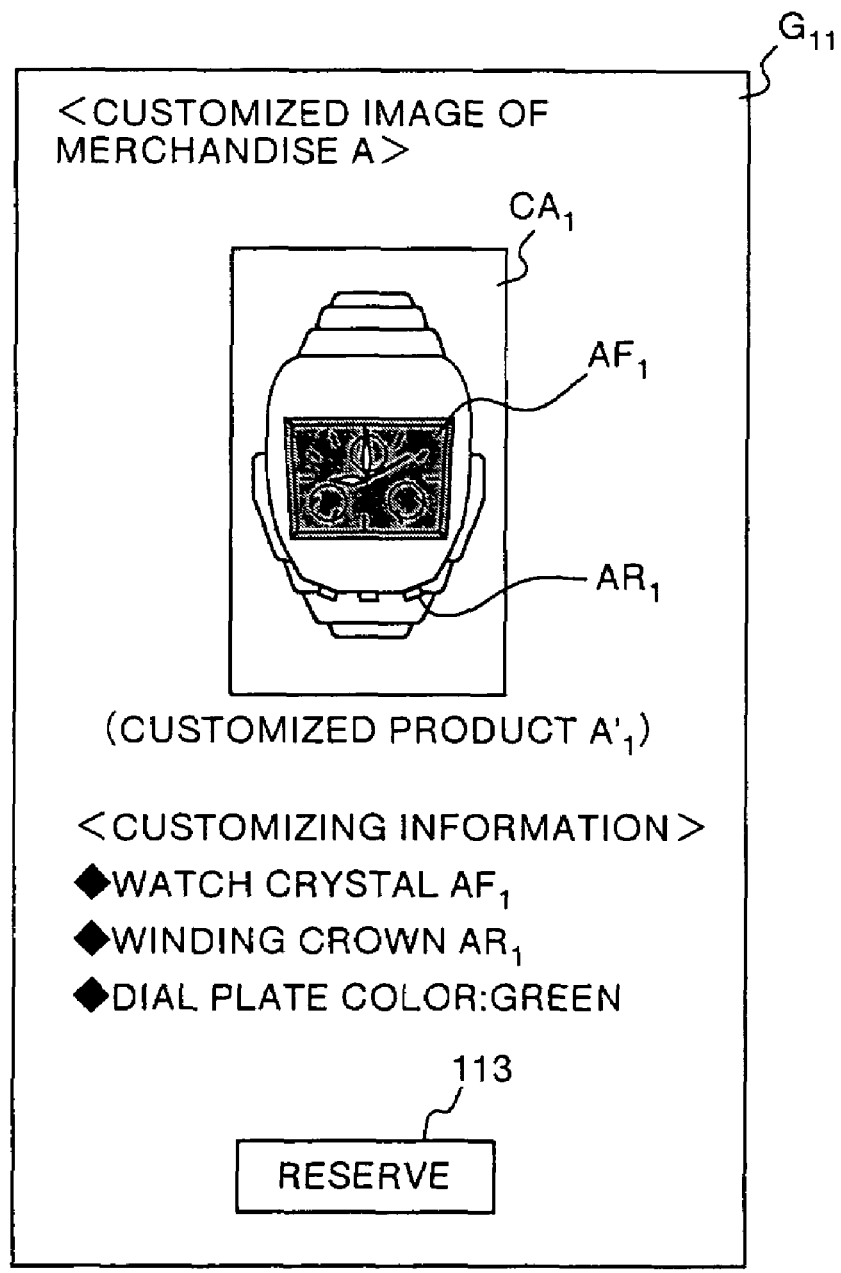
FIG. 32 is a diagram showing an example of merchandise A customizing screen $G_{11}$ in the second embodiment.

The customizing parts selector 111 has a check button for selecting one from three types of watch crystal ($AF_1$ to $AF_3$), one from two types of winding crown ($AR_1$ and $AR_2$), and one from three types of dial plate color (green, yellow, blue). After each check button is selected by the customer, when the customize image button 112 is pressed, the WWW server 33 displays a merchandise A customizing screen $G_{11}$ shown in FIG. 32 on the home page 5.

Figure 31:
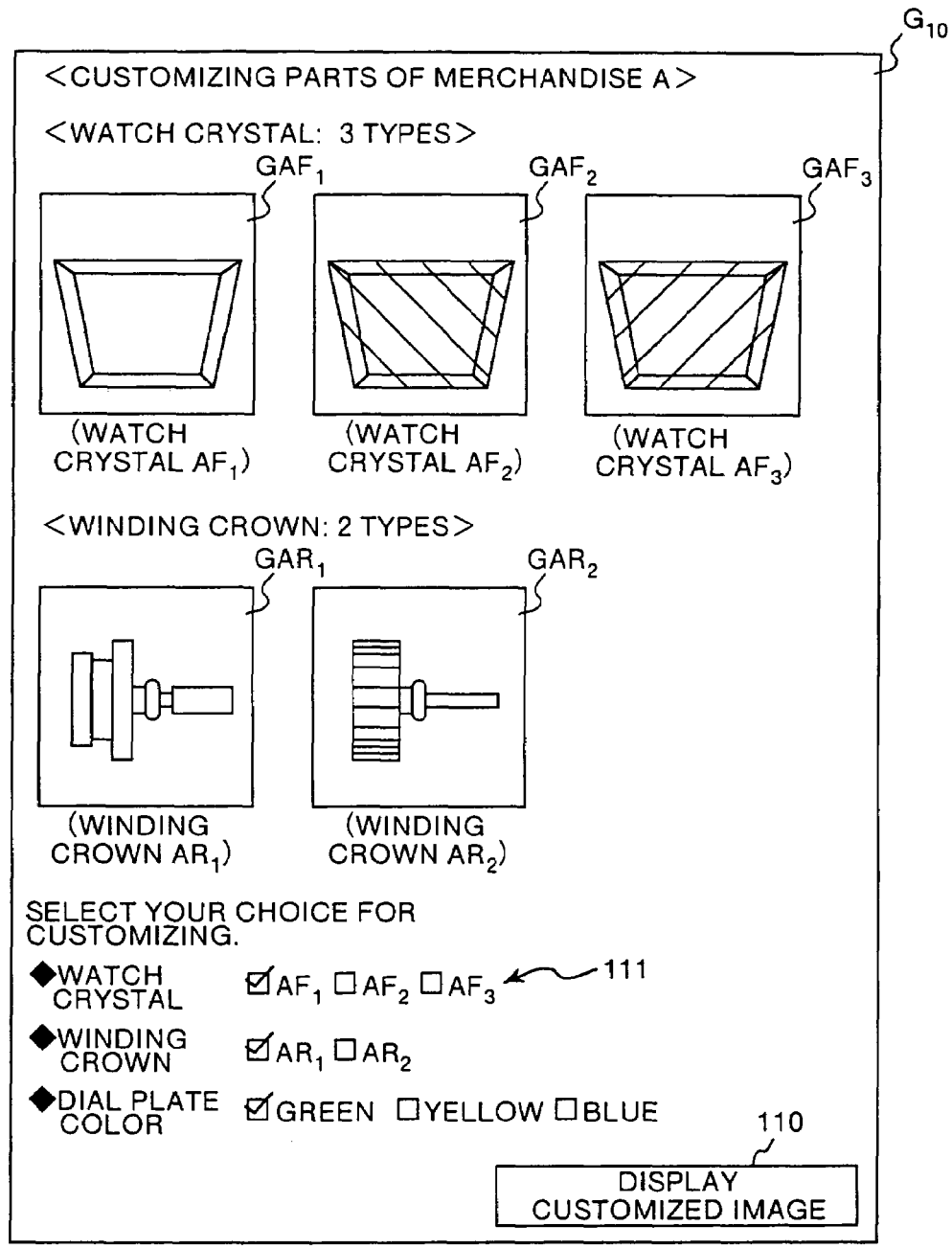
FIG. 31 is a diagram showing an example of merchandise A customized component selection screen $G_{10}$ in the second embodiment.

The merchandise A customizing screen $G_{11}$ displays the merchandise A customized image $CA_1$ relating to the customized merchandise $A_1'$ customized by using the customizing parts (in this case, the watch crystal $AF_1$, winding crown $AR_1$, and dial plate color green) selected on the merchandise A customizing parts selection screen $G_{10}$ (see FIG. 31). As a result, the customer can visually check the image of the customized merchandise, and can have an advice on decision of buying or not. The merchandise A customizing screen $G_{11}$ also shows a reserve button 113 for reserving to buy the customized merchandise $A_1'$.

Similarly, the merchandise (mass production model) notice screen $G_{13}$ shown in FIG. 34 shows, same as the merchandise (mass production model) notice screen $G_5$ (see FIG. 19), merchandise B (black) image $WB_1$ to merchandise B (white) image $WB_3$, specification, price and others, relating to designs of different colors of other merchandise B, and also shows customize button 117 newly.

The customize button 117 is, same as the customize button 110 (see FIG. 30), a button for displaying the screen for customizing the design and function of the components (for example, watch crystal or winding crown) for composing merchandise B. That is, when the customize button 117 is pressed, the WWW server 33 displays a merchandise B customizing parts selection screen $G_{14}$ shown in FIG. 35 on the home page 5.

The merchandise B customizing parts selection screen $G_{14}$ displays customizing watch crystal images $GBF_1$ to $GBF_3$, customizing winding crown images $GBR_1$, $GBR_2$, a customizing parts selector 118, and a customizing image button 119. The merchandise B customizing parts selection screen $G_{14}$ is a screen for allowing the customers wishing to customize merchandise B to select from the plurality of customizing parts differing in design.

The customizing watch crystal images $GBF_1$ to $GBF_3$ are images relating to three types of watch crystal $BF_1$ to $BF_3$ for customizing the merchandise B (see FIG. 34). These watch crystals $BF_1$ to $BF_3$ are different in design (including color and function), and are all prepared for merchandise B.

On the other hand, the customizing winding crown images $GBR_1$ and $GBR_2$ are images of two types of winding crowns $BR_1$ and $BR_2$ for customizing the merchandise B. These winding crowns $BR_1$ and $BR_2$ differ in the head design, but are both prepared for merchandise B. Herein, the designs of the watch crystals $BF_1$ to $BF_3$ and winding crowns $BR_1$ and $BR_2$ are manufactured on the basis of the needs comprehensive analysis result at step SI19 (see FIG. 26).

Figure 36:
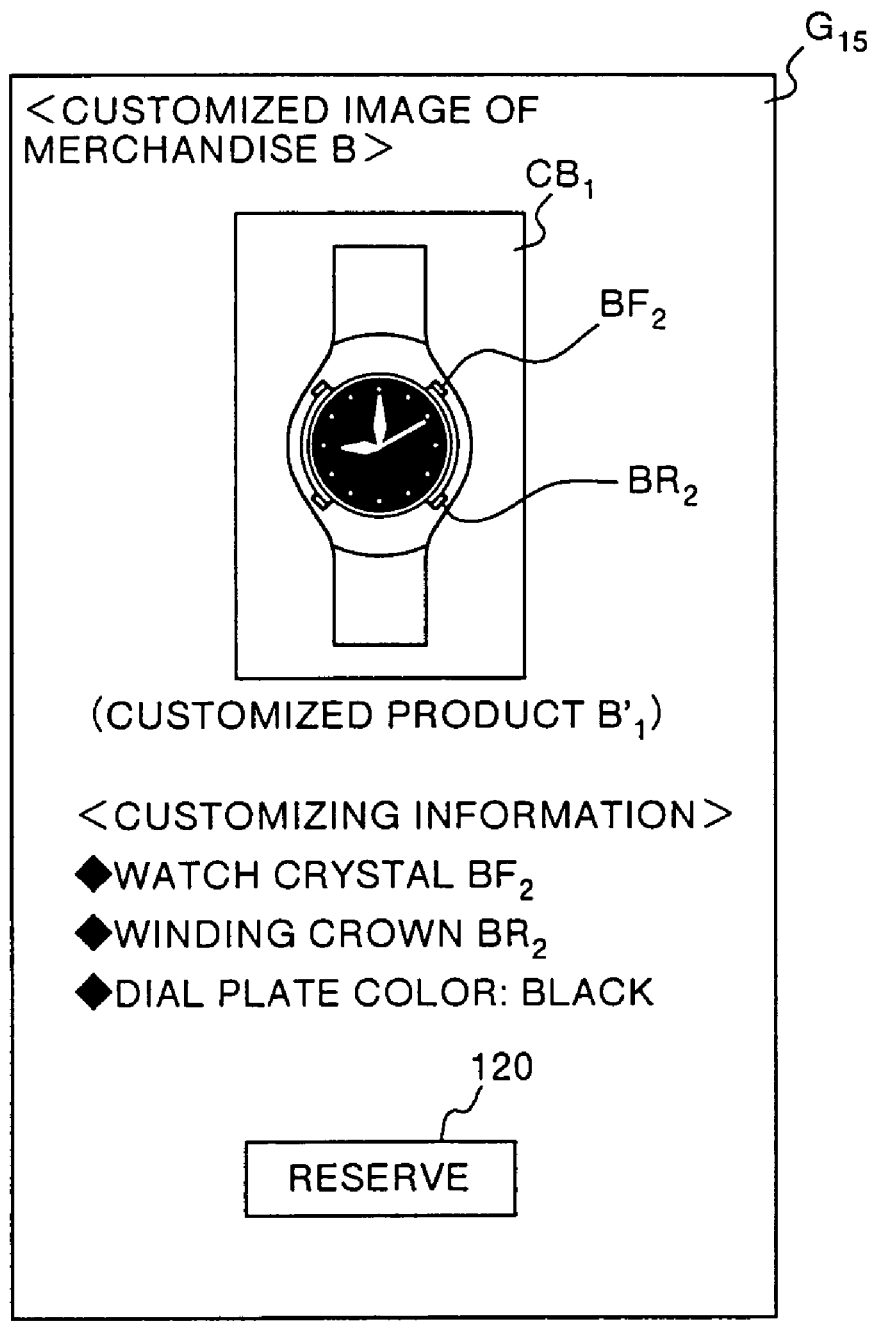
FIG. 36 is a diagram showing an example of merchandise B customizing screen $G_{15}$ in the second embodiment.

The customizing parts selector 118 has a check button for selecting one from three types of watch crystal ($BF_1$ to $BF_3$), one from two types of winding crown ($BR_1$ and $BR_2$), and one from three types of dial plate color (black, silver, white). After each check button is selected by the customer, when the customize image button 119 is pressed, the WWW server 33 displays a merchandise B customizing screen $G_{15}$ shown in FIG. 36 on the home page 5.

The merchandise B customizing screen $G_{15}$ displays the merchandise B customized image $CB_1$ relating to the customized merchandise $B_1'$ customized by using the customizing parts (in this case, the watch crystal $BF_2$, winding crown $BR_2$, and dial plate color black) selected on the merchandise B customizing parts selection screen $G_{14}$ (see FIG. 35). As a result, the customer can visually check the image of the customized merchandise, and can have an advice on decision of buying or not. The merchandise B customizing screen $G_{15}$ also shows a reserve button 120 for reserving to buy the customized merchandise $B_1'$. Thus, in the second embodiment, the merchandise A and B can be customized, instead of being sold in the standard specification.

At step SI23, the WWW server 33 judges whether the naming voting period (see FIG. 25) is over or not. In this case, the WWW server 33 makes a judgment of NO. At step SI24, the WWW server 33 executes the naming voting process for receiving naming votes for the merchandise A and merchandise B through the Internet 20.

Figure 28:
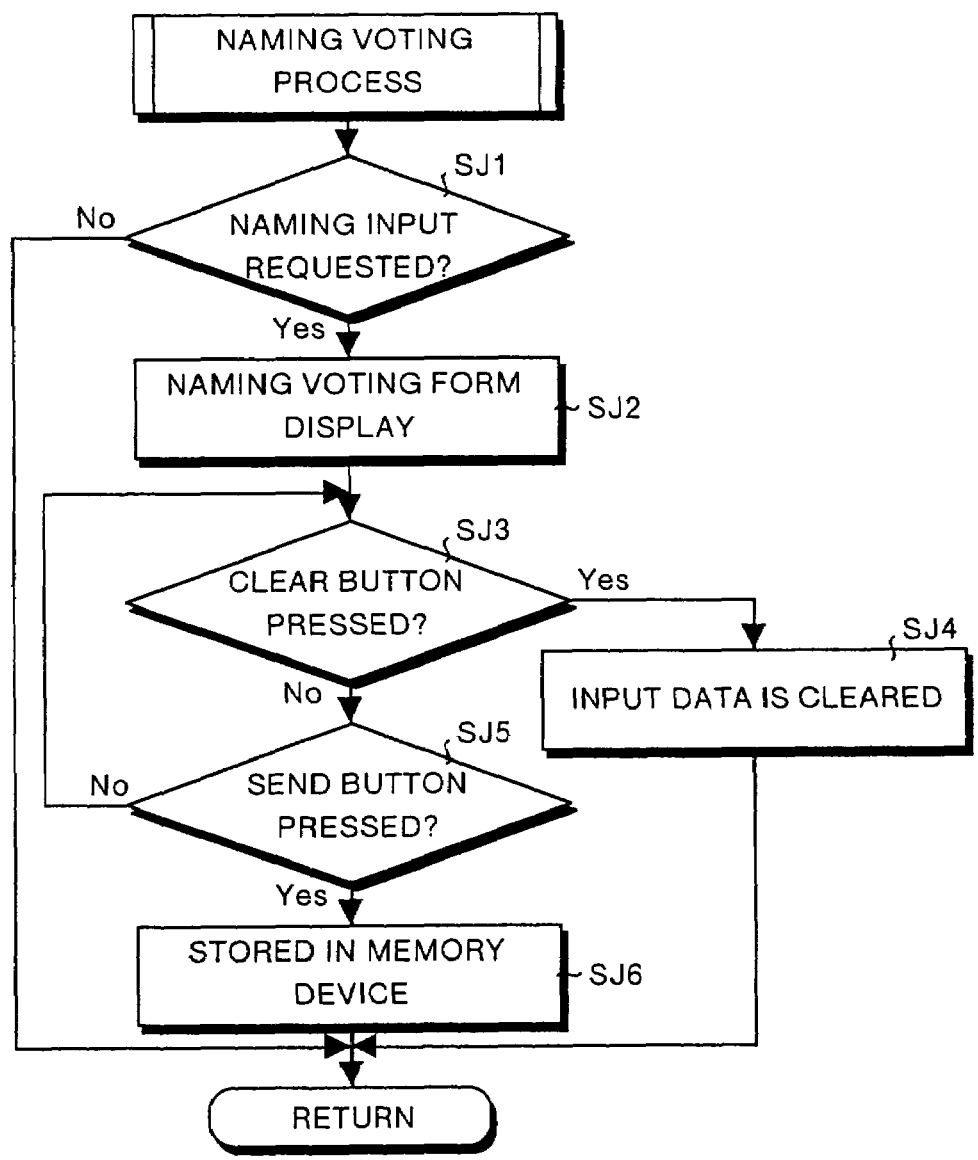
FIG. 28 is a flowchart explaining the naming voting process shown in FIG. 27.
Figure 29:
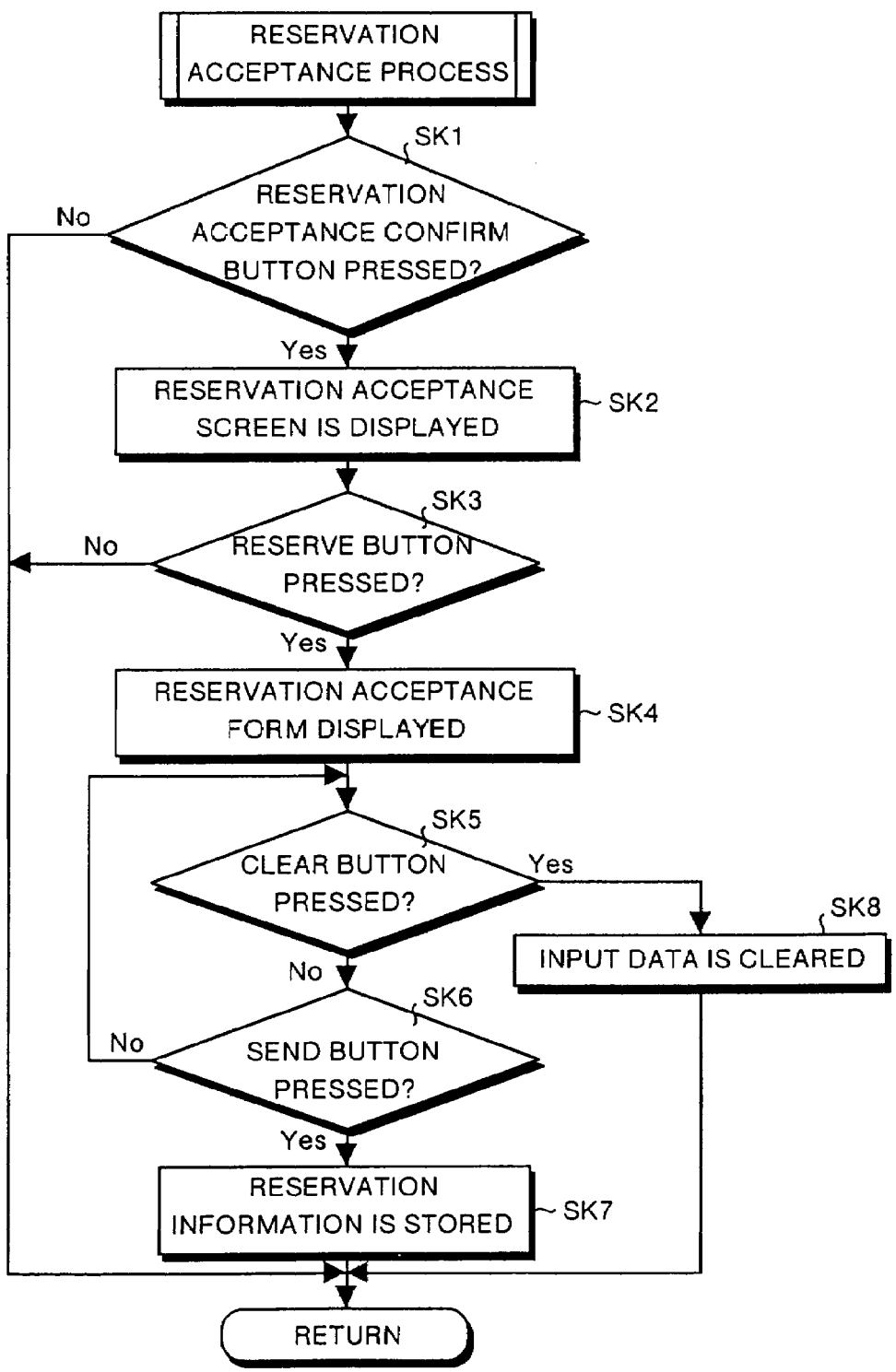
FIG. 29 is a flowchart explaining the reservation receiving process shown in FIG. 27.

That is, at step SJ1 shown in FIG. 28, the WWW server 33 judges if there is a naming input request for entry of naming about the merchandise A and merchandise B. Precisely, the WWW server 33 judges whether the naming entry button (not shown) on the home page 5 has been pressed or not. If the WWW server 33 makes a judgment of NO at step SJ1, the process is returned to the main routine shown in FIG. 27.

In this case, suppose the naming entry button (not shown) is pressed by the manipulation of the customer $3_1$. At step SJ2, the WWW server 33 displays the naming voting form, that is, a naming voting form screen $G_{16}$ shown in FIG. 37 on the screen of the customer client $10_1$. The naming voting form screen $G_{16}$ shows, aside from the personal information of the customer (name, . . . , e-mail), entry naming input items 121 and 122 for input of naming to be entered for the merchandise A (see FIG. 30) and merchandise B (FIG. 34). Therefore, the customer $3_1$ enters the naming of merchandise A and merchandise B in the naming entry input items 121 and 122.

At step SJ3, the WWW server 33 judges if a clear button 124 shown in FIG. 37 has been pressed or not. This clear button 124 is pressed when clearing the input data of the naming voting form screen $G_{16}$. If the WWW server 33 makes a judgment of YES at step SJ3, then at step SJ4 the WWW server 33 clears the input data of the naming voting form screen $G_{16}$, and the process is returned to the main routine shown in FIG. 27.

If the WWW server 33 makes a judgment of NO at step SJ3, then at step SJ5 the WWW server 33 judges if a send button 123 shown in FIG. 37 has been pressed or not. In this case, the WWW server 33 makes a judgment of NO. When the input of the naming voting form screen $G_{16}$ is completely finished, the customer $3_1$ presses the send button 123 by manipulating the mouse or the like.

As a result, the WWW server 33 makes a judgment of YES at step SJ5. At step SJ6, the WWW server 33 stores the naming of merchandise A and merchandise B in the naming voting result database in the memory device 34, corresponding to the personal information. Hereinafter, the process of step SJ1 to step SJ5 and step SJ6 is repeated, and the names of merchandise A and merchandise B are entered in the naming voting result database.

After the naming voting period, the WWW server 33 makes a judgment of YES at step SI23. At step SI25, the naming voting result database in the memory device 34 is referred to, and the names of merchandise A and merchandise B are determined from the plurality of names by the merchandise maker 1 and publisher 2. In the second embodiment, by making the result of the naming voting open on the home page 5, the names of merchandise A and merchandise B may be determined by receiving the result of popularity voting by the customers $3_1$ to $3_n$.

At step SI26, the WWW server 33 displays a naming notice screen $G_{17}$ shown in FIG. 38 on the home page 5, and the decided names of merchandise A and merchandise B are noticed. As a result, in addition to merchandise A and merchandise B, acceptance of sales reservation of their customized products is started. After step SI22, the reaction of customers after merchandise notice is investigated by the technique explained at step SA9 (see FIG. 4).

At step SI27, the WWW server 33 judges if the reservation acceptance period is over or not. In this case, the WWW server 33 makes a judgment of NO. As a result, the process of step SI28 to step SI31 is executed parallel. Each process at step SI29 to step SI31 corresponds to each process at step SA25 to step SA27 in the first embodiment (see FIG. 5), and the detailed description is omitted.

The reservation acceptance process at step SI28 is a process of receiving sales reservations about the customized products, in addition to merchandise A and merchandise B, from the customers $3_1$ to $3_n$. That is, in the reservation acceptance process, at step SK1 shown in FIG. 29, the WWW server 33 judges if reservation status confirm button 78 (see FIG. 30) or reservation status confirm button 79 (see FIG. 34) has been pressed or not by the manipulation of the customer looking up the merchandise (mass production model) notice screen $G_9$ or merchandise (mass production model) notice screen $G_{13}$. The reservation status confirm button 78 and reservation status confirm button 79 are buttons for confirming the reservation status of merchandise A (including customized merchandise A) and merchandise B (including customized merchandise B) at the present.

Herein, suppose the customer $3_1$ has pressed the reservation status confirm button 78 shown in FIG. 30, then the WWW server 33 makes a judgment of YES at step SK1. If the WWW server 33 makes a judgment of NO at step SK1, then the WWW server 33 returns to the process in the main routine shown in FIG. 27. In this case, at step SK2, the WWW server 33 shows the reservation status confirm screen $G_{18}$ shown in FIG. 39 on the display of the customer client $10_1$. At step SK3, the WWW server 33 judges if either reserve button 126 (see FIG. 39), reserve button 120 (see FIG. 36) or reserve button 113 (see FIG. 32) is pressed by manipulation of the customer. If the WWW server 33 makes a judgment of NO at this step, it returns to the process in the main routine shown in FIG. 27.

Figure 39:
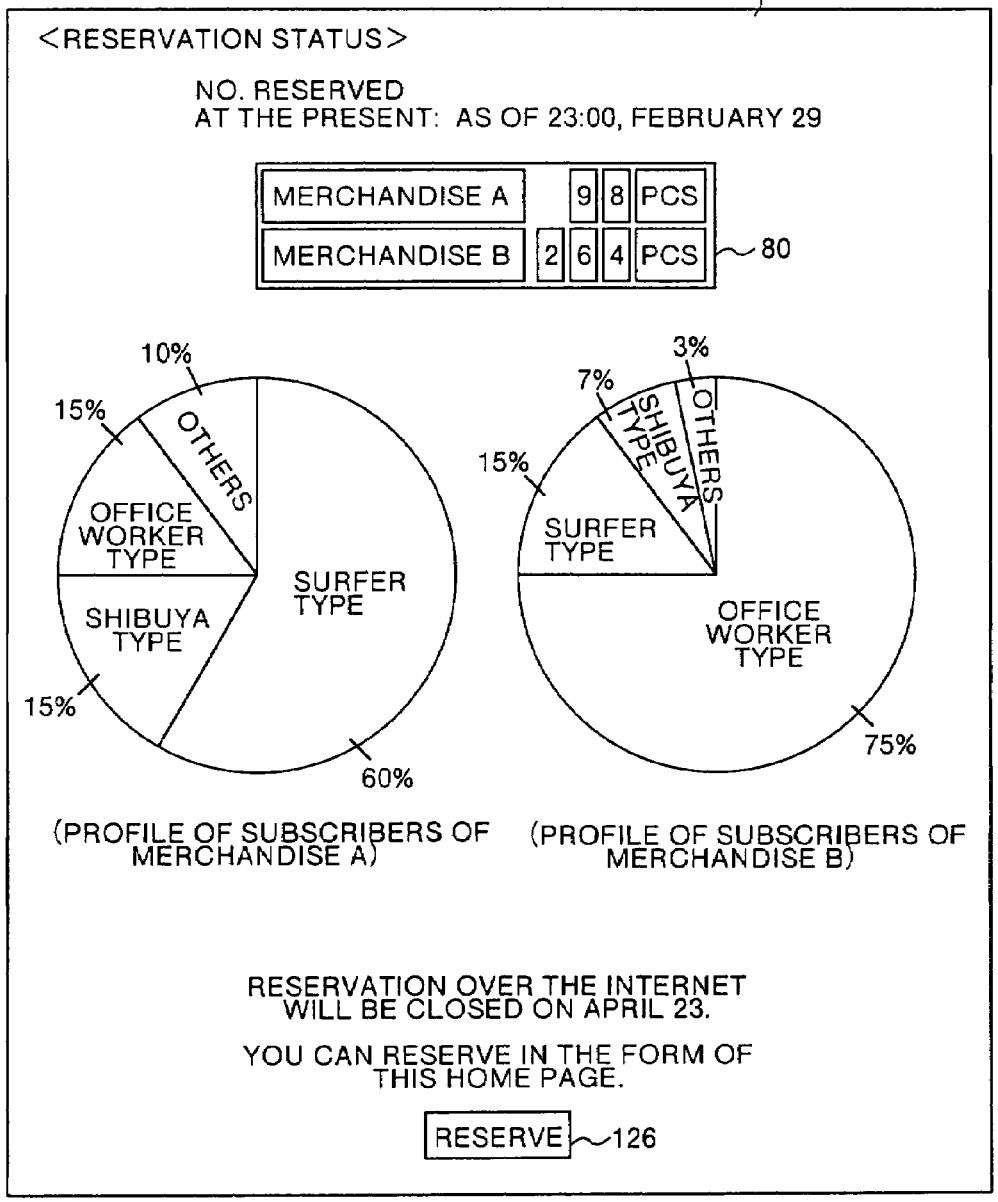
FIG. 39 is a diagram showing an example of reservation status confirm screen $G_{18}$ in the second embodiment.

A reservation status display 80 in the reservation status confirm screen $G_{18}$ shown in FIG. 39 shows the number of reservations (98 pieces) of merchandise A (including customized merchandise) and the number of reservations (264 pieces) of merchandise B (including customized merchandise) as of 23:00 of February 29.

The reservation status confirm screen $G_{18}$ shows a pie chart of composition ratio of profiles about the subscribers of merchandise A (including customized merchandise) and merchandise B (including customized merchandise). The customer refers to these profiles, understands the trend of sales target of merchandise A and merchandise B, and judges whether or not to buy. The pie chart of profiles is displayed on the basis of profiles of reservation information table J (see FIG. 40) described later.

Herein, when the reserve button 126 is pressed by manipulation of the customer $3_1$ the WWW server 33 makes a judgment of YES at step SK3. At step SK4, the WWW server 33 displays the reservation acceptance screen $G_{12}$ which is the reservation acceptance form shown in FIG. 33, on the display of the customer client $10_1$. In the reservation acceptance screen $G_{12}$ shown in FIG. 33, the parts corresponding to those in FIG. 21 are identified with the same legends.

The reservation acceptance screen $G_{12}$ newly shows a profile selector 125 for selecting and entering the subscriber's profile (see FIG. 39), a customized merchandise name display 114 for displaying the name (in the diagram, customized merchandise $A_1$' (green)) of customized merchandise (see FIG. 32, FIG. 36), a reserved quantity display 115 for displaying the number of reservations of the merchandise, and a merchandise delivery method selector 116 for selecting the delivery method of reserved merchandise (sales representative or cash on delivery). The customer $3_1$ enters the information necessary for reservation.

Returning to FIG. 29, at step SK5, the WWW server 33 judges if a clear button 87 shown in FIG. 33 is pressed or not. This clear button 87 is pressed when clearing the input data of the reservation acceptance screen $G_{12}$. If a judgment made at this step is YES, then at step SK8 the WWW server 33 clears the input data of the reservation acceptance screen $G_{12}$, and returns to the process in the main routine shown in FIG. 27.

If a judgment made at step SK5 is NO, then at step SK6 the WWW server 33 judges if the send button 86 shown in FIG. 33 is pressed or not. In this case, the WWW server 33 makes a judgment of NO. However, if the send button 86 is pressed by manipulation of the customer $3_1$, the WWW server 33 makes a judgment of YES at step SK6. At step SK7, the WWW server 33 stores the information entered in the reservation acceptance screen $G_{12}$ in the memory device 34 as the reservation information table J shown in FIG. 40.

The reservation information table J has fields for reserved quantity data, reserved date, name of subscriber, profile, address, flag showing customized merchandise or not, customizing parts, merchandise name, quantity, delivery method, sales representative, and selling price. In the field of the sales representative, when the sales representative is selected in the merchandise delivery method selector 116 shown in FIG. 33, the sales representative nearest to the address of the subscriber is automatically set by the WWW server 33 among the preset sales representatives $90_1$ to $90_n$. If the cash on delivery is selected in the merchandise delivery method selector 116, no information is stored in the field of the sales representative. Hereinafter, the same operation is repeated until the expiration of the reservation acceptance period.

When the reservation acceptance period expires, the WWW server 33 makes a judgment of YES at step SI27 shown in FIG. 27. As a result, at step SI32, the WWW server 33, same as the process at step SA28 (see FIG. 5) explained in the first embodiment, executes the selling price final decision process for finally determining the selling price depending on the number of reservations. In this case, the WWW server 33 stores the determined selling price in the reservation information table J (see FIG. 40). In this case, the selling price of the merchandise A is 25000 yen, and the selling price of the merchandise B is 45000 yen.

At step SI33, the WWW server 33 informs the subscribers of the merchandise information (finally determined price, specification, design, etc.) through the home page 5. At step SI34, the WWW server 33 sends the reservation information table J stored in the memory device 34 to the job server 57 at the side of the merchandise maker 1 through the Internet 20. As a result, the merchandise maker 1 starts manufacture of the merchandise A and merchandise B (both including customized merchandise) on the basis of the reservation information table J (see FIG. 40). The customized merchandise is manufactured by referring to the field of the customizing parts in the reservation information table J.

At step SI35, the job server 57 sends the reservation information table J (see FIG. 40) to the sales representative clients $100_1$ to $100_n$ through the Internet 20. As a result, the sales representatives $90_1$ to $90_n$, referring to the field of the sales representative in the reservation information table J, can obtain the information of merchandise to be handled and the information of customers. At step SI36, the merchandise maker 1 ships the merchandise to the sales representatives $90_1$ to $90_n$ according to the reservation information table J.

At step SI37, the merchandise maker 1 and the sales representatives $90_1$ to $90_n$ judge if reaching the sales day of the merchandise A and merchandise B (both including customized merchandise). In this case, the judgment made will be NO and the same step will be repeated till the day is the sales day. When the day is the sales day, the merchandise maker 1 and the sales representatives $90_1$ to $90_n$ make a judgment of YES at step SI37. As a result, the process at step SI38 and step SI39 is executed parallel.

That is, at step SI38, the merchandise maker 1, referring to the reservation information table J shown in FIG. 40, ships the merchandise A and merchandise B (both including customized merchandise) by cash on delivery to the subscribers not listed in the field of the sales representatives in the sequence of reservations. On the other hand, the sales representatives $90_1$ to $90_n$ referring to the reservation information table J, sell the merchandise to the subscribers listed in the field of the own sales representative, and remit the corresponding amount of money to the bank account of the merchandise maker 1. At step SI39, by the same technique as in step SA9 (see FIG. 4), the reaction of the customers after sales of merchandise is investigated.

At step SI40, the merchandise maker 1 judges if the number of productions of the merchandise A and merchandise B (both including customized merchandise) is equal to the number of reservations, or not. In this case, the merchandise maker 1 makes a judgment of NO. At step SI42, the merchandise make 1 judges if the sales period is terminated or not. In this case, the merchandise maker 1 makes a judgment of NO. Thereafter, the merchandise A and merchandise B (both including customized merchandise) are being sold.

When the judgment made at step SI40 is YES, then at step SI41 the merchandise maker 1 understands that the number of productions has reached the number of reservations, and stops manufacture of the merchandise A and merchandise B (both including customized merchandise). When the judgment made at step SI42 is YES, then at step SI43, it is judged if the reaction investigation period is terminated or not. If the judgment made at step SI42 is NO, then at step SI44 the reaction investigation period continues in the same manner as at step SI39.

When the judgment made at step SI43 is YES, then at step SI45 the merchandise maker 1 and the publisher 2 sum up and analyze the results of reaction investigation, and evaluate comprehensively about the series of operation from planning and/or development of merchandise to sales. At step SI46, the merchandise maker 1 and the publisher 2 feed back the result of overall evaluation to planning and development of next merchandise.

In this second embodiment, at step SI32 shown in FIG. 27 (selling price final decision process), the selling price is determined in gradual steps depending on the number of reservations, but not limited to this, for example, the selling price may be determined based on four cases of selling price final decision logic. These four cases will be explained below as modified examples 1 to 4 of the second embodiment.

Figure 42:
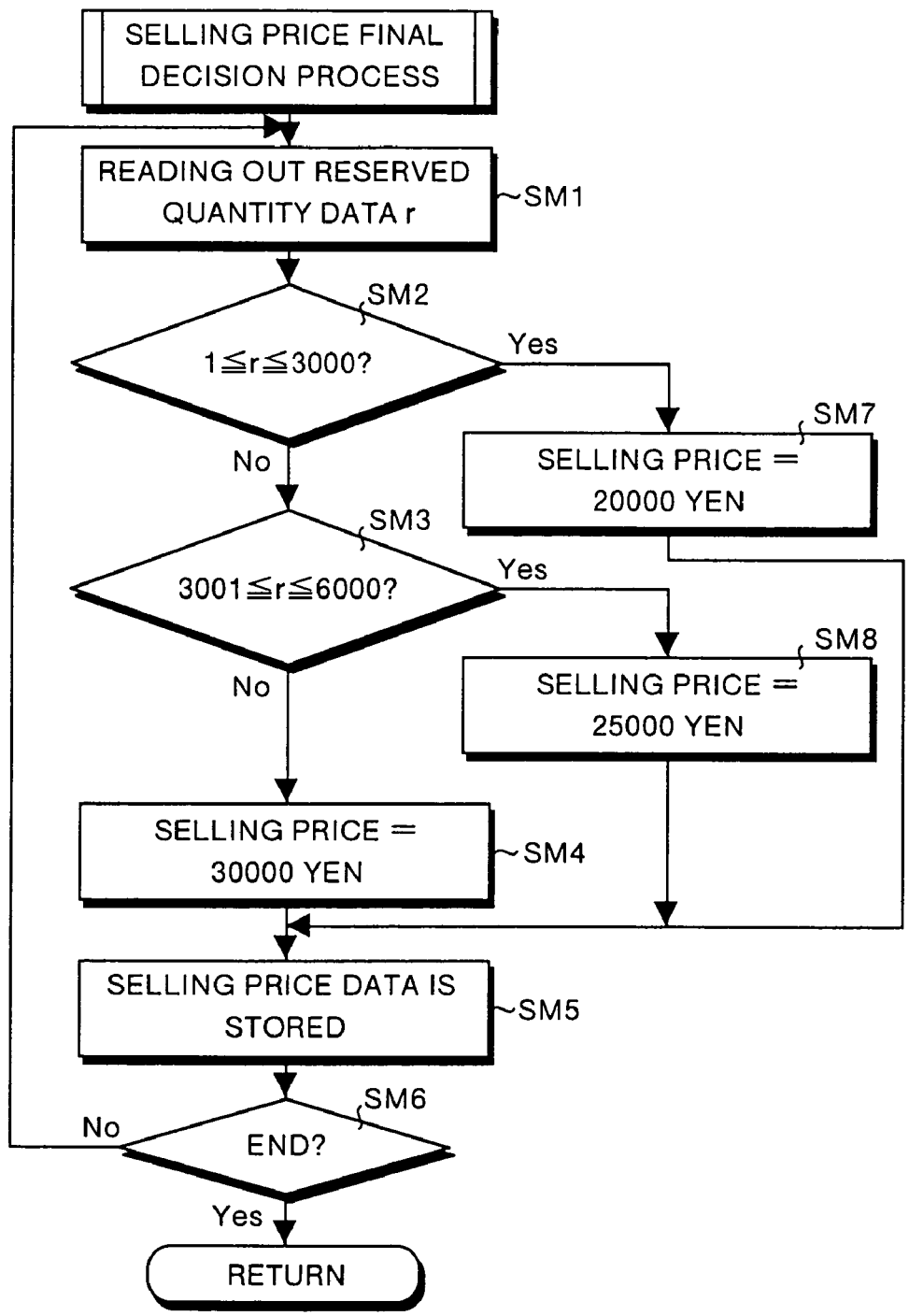
FIG. 42 is a flowchart explaining the selling price final decision process in modified example 1 of the second embodiment.

In the modified example 1, the selling price of the merchandise is decided based on the selling price final decision logic $H_1$ shown in FIG. 41A. In this selling price final decision logic $H_1$, during the reservation acceptance period at step SI27 shown in FIG. 27, the selling price is determined in gradual steps on the first-come-first-served basis of reservations. Precisely, the price is 20000 yen for first to 3000th customers, 25000 yen for 3001st to 6000th customers, and 30000 yen for 6001st and later customers. In this modified example 1, at step SI32 (see FIG. 27), the selling price final decision process shown in FIG. 42 is executed.

That is, at step SM1 shown in the diagram, the WWW server 33 refers to the reservation information table J (see FIG. 40), and reads out the reserved quantity data r of the first record. This reserved quantity data r is the data showing the reservation incoming order of the merchandise. At step SM2, the WWW server 33 judges if the reserved quantity data r is in a range of 1 to 3000 customers (see FIG. 41A).

If the judgment made is YES, then at step SM7 the WWW server 33 sets the selling price at 20000 yen (see FIG. 41A). At step SM5, the WWW server 33 stores the selling price (20000 yen) in the corresponding record of the reservation information table J. At step SM6, the WWW server 33 judges if the price is determined for all reserved merchandise. Assume that the judgment made at step SM6 is NO. Accordingly, the entire operation shown in this flowchart is repeated until the price is decided.

If the judgment made at step SM2 is NO, then at step SM3 the WWW server 33 judges if the reserved quantity data r is in a range of 3001 to 6000 customers. If the judgment made at this step is YES, then at step SM8 the WWW server 33 sets the selling price at 25000 yen (see FIG. 41A). If the judgment made at step SM3 is NO, that is, if the reserved quantity data r is 6001 or more, at step SM4, the WWW server 33 sets the selling price at 30000 yen.

Figure 43:
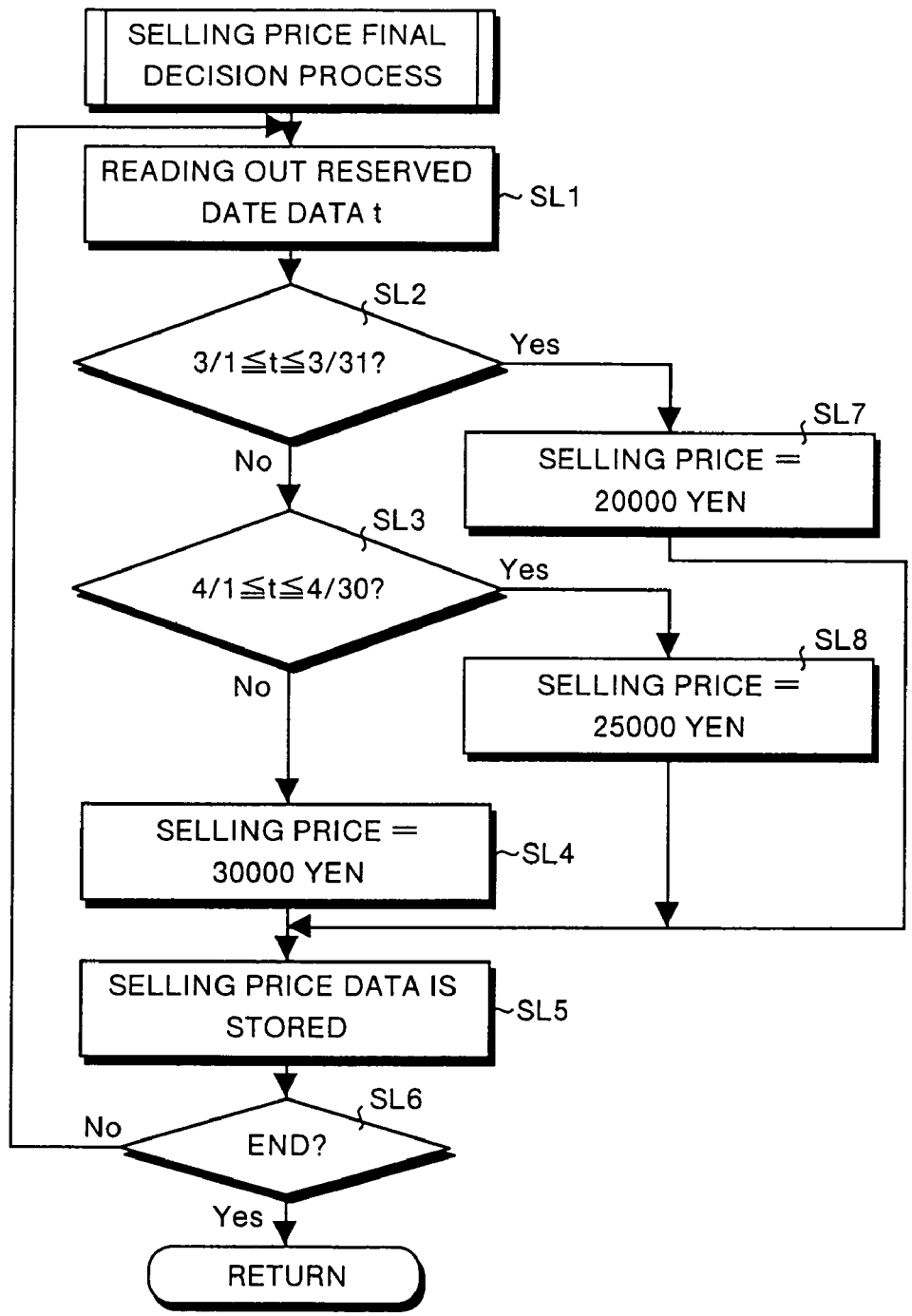
FIG. 43 is a flowchart explaining the selling price final decision process in modified example 2 of the second embodiment.

In the modified example 2, the selling price of the merchandise is decided based on to the selling price final decision logic $H_2$ shown in FIG. 41B. In this selling price final decision logic $H_2$, during the reservation acceptance period at step SI27 shown in FIG. 27, the selling price is determined in gradual steps according to the reservation timing. Specifically, it is 20000 yen if reserved from March 1 (reservation start day) till March 31, 25000 yen if reserved from April 1 till April 30, and 30000 yen if reserved on May 1 and after. In this modified example 2, at step SI32 (see FIG. 27), the selling price final decision process shown in FIG. 43 is executed.

That is, at step SL1 shown in the diagram, the WWW server 33 refers to the reservation information table J (see FIG. 40), and reads out the reserved date data t of the first record. This reserved date data t is the data showing the reservation date of the merchandise. At step SL2, the WWW server 33 judges if the reserved date data t is in a range of March 1 to March 31.

If the judgment made at step SL2 is YES, then at step SL7 the WWW server 33 sets the selling price at 20000 yen (see FIG. 41B). At step SL5, the WWW server 33 stores the selling price (20000 yen) in the corresponding record of the reservation information table J. At step SL6, the WWW server 33 judges if the price is determined for all reserved merchandise. Assume that the judgment made at step SL6 is NO. Accordingly, the entire operation shown in this flowchart is repeated until the price is decided.

If the judgment made at step SL2 is NO, then at step SL3 the WWW server 33 judges if the reserved date data t is in a range of April 1 to April 30. If the judgment made at step SL2 is YES, then at step SL8 the WWW server 33 sets the selling price at 25000 yen (see FIG. 41B). If the judgment made at step SL3 is NO, that is, if the reserved date data t is May 1 or later, then at step SL4 the WWW server 33 sets the selling price at 30000 yen.

Figure 45:
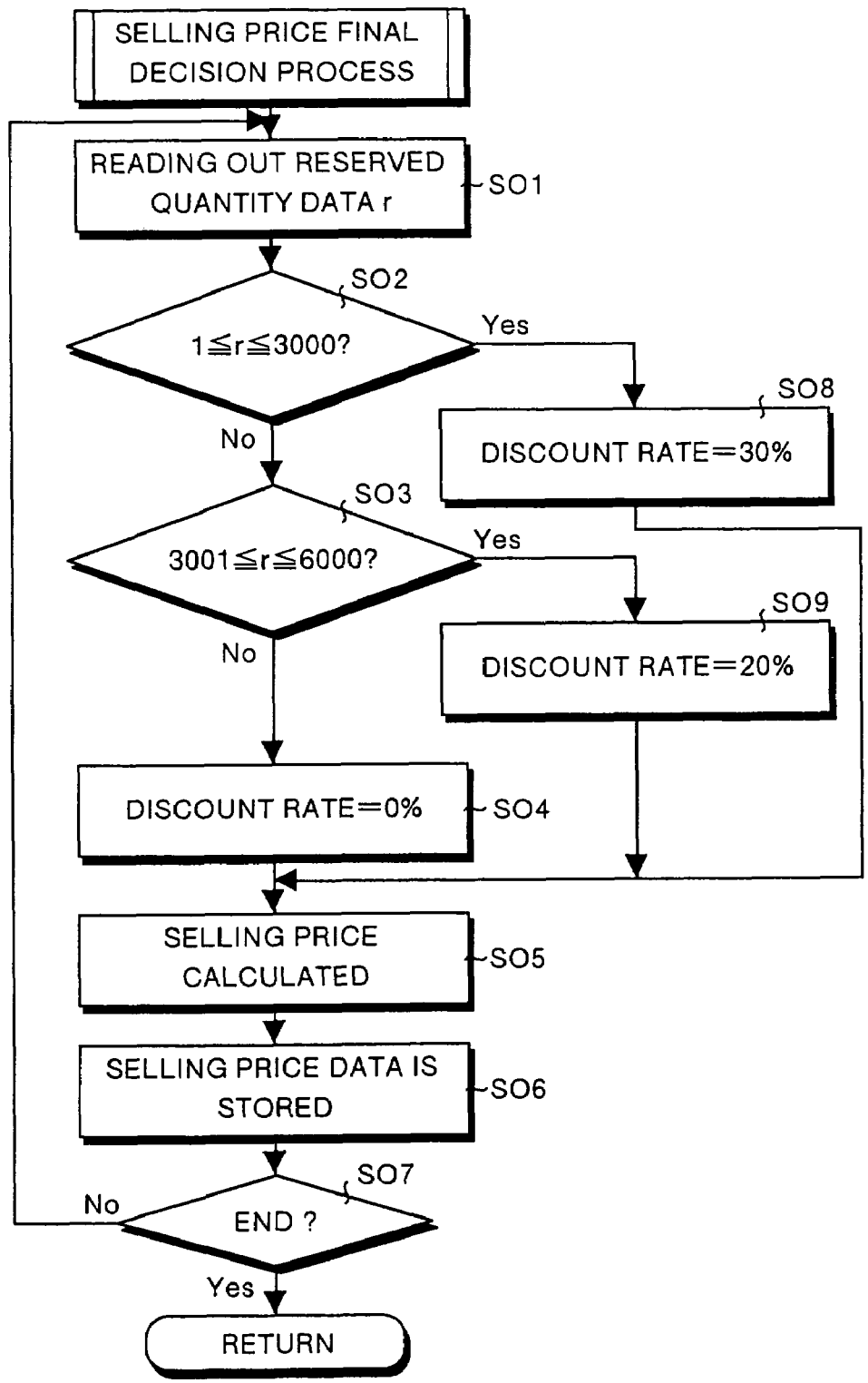
FIG. 45 is a flowchart explaining the selling price final decision process in modified example 3 of the second embodiment.

In the modified example 3, the selling price of the merchandise is decided based on the selling price final decision logic $H_3$ shown in FIG. 44A. In this selling price final decision logic $H_3$, during the reservation acceptance period at step SI27 shown in FIG. 27, the discount rate of the fixed price of the merchandise is determined in gradual steps on the first-come-first-served basis of reservations. Specifically, the discount rate is 30% for first to 3000th customers, 20% for 3001st to 6000th customers, and 0% (fixed price) for 6001st and later customers. In this modified example 3, at step SI32 (see FIG. 27), the selling price final decision process shown in FIG. 45 is executed.

That is, at step SO1 shown in the diagram, the WWW server 33 refers to the reservation information table J (see FIG. 40), and reads out the reserved quantity data r of the first record. At step SO2, the WWW server 33 judges if the reserved quantity data r is in a range of 1 to 3000 customers (see FIG. 44A). If the judgment made at step SO2 is YES, then at step SO8 the WWW server 33 sets the discount rate at 30% (see FIG. 44A). At step SO5, the WWW server 33 calculates the selling price (fixed price×(1-0.3)) by applying the discount rate (30%) to the fixed price.

At step SO6, the WWW server 33 stores the data of the selling price (at the discount rate of 30%) in the corresponding record of the reservation information table J. At step SO7, the WWW server 33 judges if the price is determined for all reserved merchandise. Assume that the judgment made at step SO7 is NO. Accordingly, the entire operation shown in this flowchart is repeated until the price is decided.

If the judgment made at step SO2 is NO, then at step SO3 the WWW server 33 judges if the reserved quantity data r is in a range of 3001 to 6000 customers. If the judgment made at step SO3 is YES, then at step SO9 the WWW server 33 sets the discount rate of the merchandise at 20%. At step SO5, the WWW server 33 calculates the selling price (fixed price×(1-0.2)) by applying the discount rate (20%) to the fixed price. At step SO6, the WWW server 33 stores the data of the selling price (at the discount rate of 20%) in the corresponding record of the reservation information table J.

If the judgment made at step SO3 is NO, that is, if the reserved quantity data r is 6001 or more, at step SO4, the WWW server 33 sets the discount rate at 0%. At step SO5, the WWW server 33 calculates the selling price by applying the discount rate (0%) to the fixed price. In this case, the selling price is the fixed price. At step SO6, the WWW server 33 stores the data of the selling price (=fixed price) in the corresponding record of the reservation information table J.

In the modified example 4, the selling price of the merchandise is decided based on the selling price final decision logic $H_4$ shown in FIG. 44B. In this selling price final decision logic $H_4$, if the reservation acceptance quantity is limited, for example, to 1000 pieces, during the reservation acceptance period at step SI27 shown in FIG. 27, the selling price is determined in gradual steps according to the time required from start of acceptance of reservation until the reservation of the limited 1000 pieces is completed (reservation sold-out time).

Figure 46:
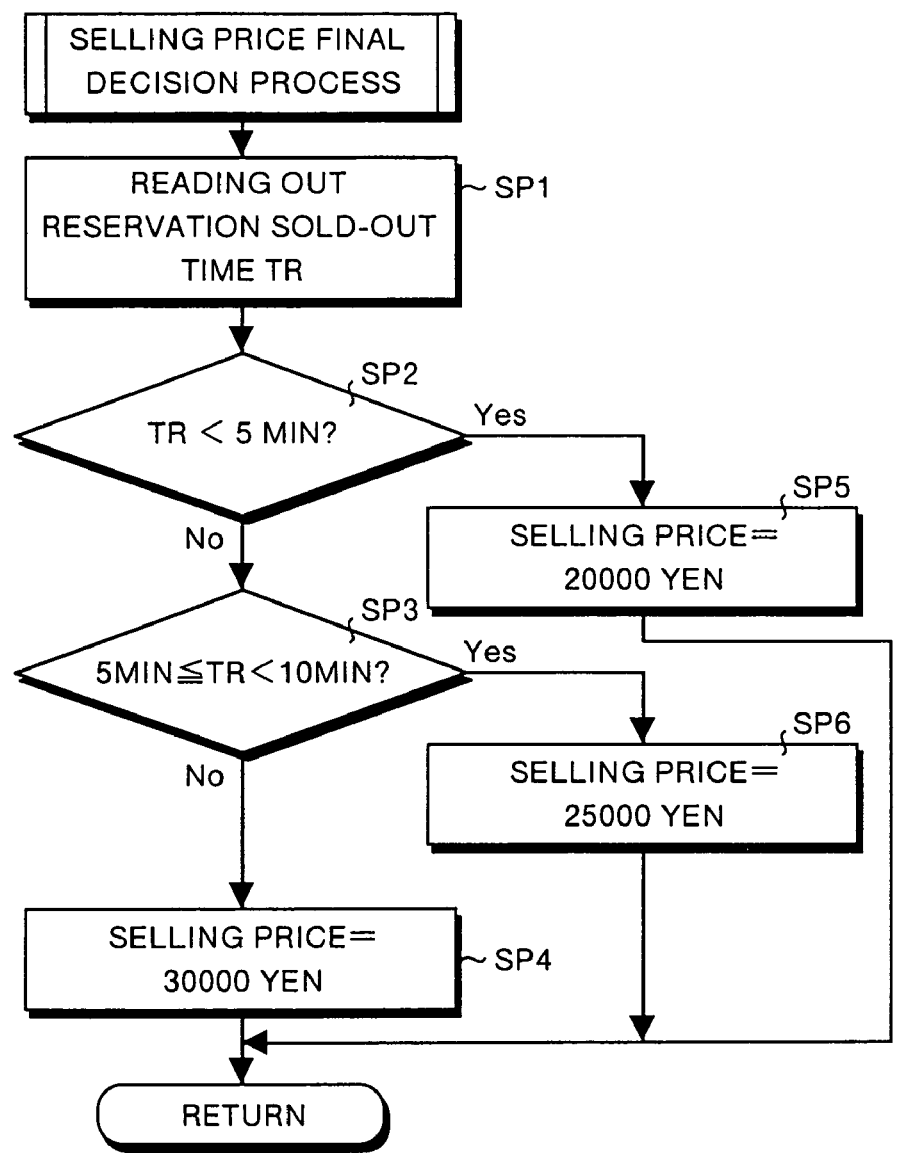
FIG. 46 is a flowchart explaining the selling price final decision process in modified example 4 of the second embodiment.

Precisely, the selling price is 20000 yen if the reservation sold-out time is less than 5 minutes, 25000 yen if sold out in 5 minutes to less than 10 minutes, and 30000 yen if sold out in 10 minutes or more. In this modified example 4, at step SI32 (see FIG. 27), the selling price final decision process shown in FIG. 46 is executed.

That is, in this modified example 4, the WWW server 33 starts up a not shown timer when acceptance of reservation is started, and stops the timer when the reservation quantity (for example, 1000 pieces) is sold out. In this case, at step SP1 shown in FIG. 46, the WWW server 33 reads out the timer counting result as the reservation sold-out time TR. At step SP2, the WWW server 33 judges if the reservation sold-out time TR is less than 5 minutes or not. If the judgment made at step SP2 is YES, at step SP5, the WWW server 33 sets the selling price uniformly at 20000 yen (see FIG. 44B).

On the other hand. If the judgment made at step SP2 is NO, then at step SP3 the WWW server 33 judges if the reservation sold-out time TR is in a range of 5 minutes to less than 10 minutes. If the judgment made at step SP3 is YES, then at step SP6, the WWW server 33 sets the selling price uniformly at 25000 yen (see FIG. 44B). If the judgment made at step SP3 is NO, that is, when the reservation sold-out time TR is 10 minutes or more, the WWW server 33 sets the selling price uniformly at 30000 yen. The WWW server 33 stores the data of the determined selling price in each record of the reservation information table J (see FIG. 40). Incidentally, the discount rate explained in the modified example 3 may be also applied to the modified examples 1, 2 and 4.

Figure 48:
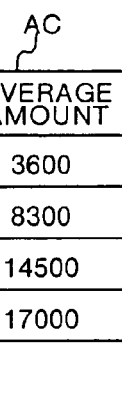
FIG. 48 is a diagram showing an example of bidding table AC in modified example 5 of the second embodiment.

Meanwhile, in the second embodiment, the selling price of the merchandise A and B may be decided based on the bidding system by auction. Such case is explained below as modified example 5 of the second embodiment. In this modified example 5, the WWW server 33 displays an auction bidding form screen $G_1$ shown in FIG. 47. By referring to this screen, each customer enters the personal information (name, kana, etc.) by using each client terminal, and enters the bidding amount for merchandise A in a bidding amount input column 127, and further enters the bidding amount for merchandise B in a bidding amount input column 128. A clear button 130 is pressed when correcting the input data. When a tender button 129 is pressed, the bidding amount data is collected by the WWW server 33, and the WWW server 33 stores the bidding amount data in the bidding table AC shown in FIG. 48.

Figure 49:
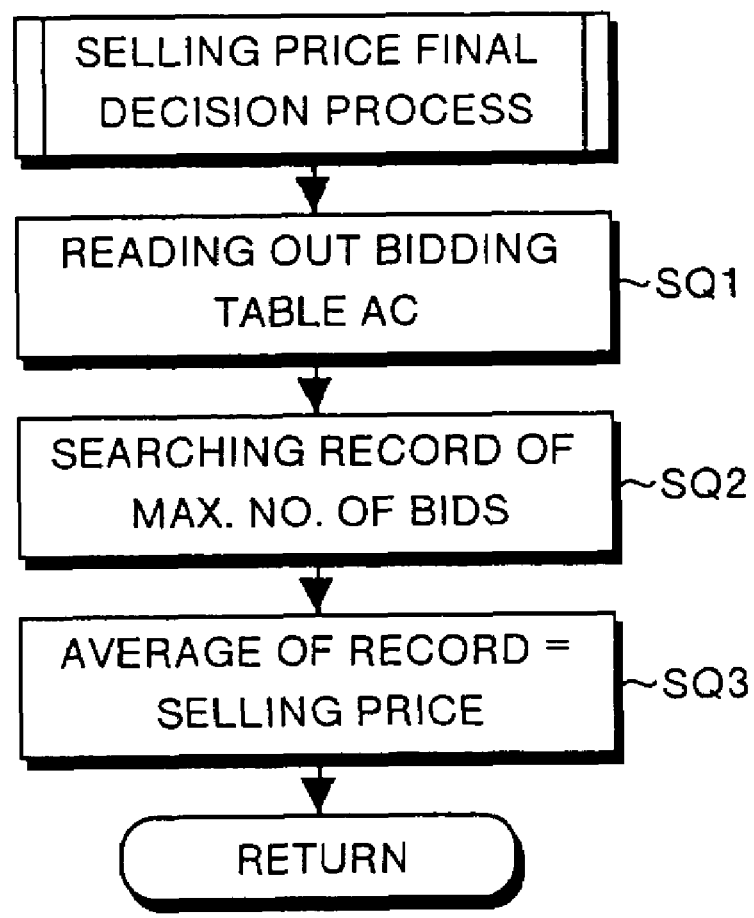
FIG. 49 is a flowchart explaining the selling price final decision process in modified example 5 of the second embodiment.

The WWW server 33 updates the data of the number of bids about the merchandise A and merchandise B at every new tender, and determines the average of bidding amount in every bidding amount price zone (for example, 1000 yen to 5000 yen). At the tender closing time, at step SQ1 shown in FIG. 49, the WWW server 33 reads out the bidding table AC. At step SQ2, the WWW server 33 searches the record of the greatest number of bids in the bidding table AC. In this case, the record of 317 bids is searched for merchandise A, and the record of 462 bids for merchandise B.

At step SQ3, the WWW server 33 determines the average of the record as the selling price. In this case, the selling price of merchandise A is 18000 yen, and the selling price of merchandise B is 17000 yen. In the second embodiment, the highest bidding amount may be set as the selling price.

According to the second embodiment, the merchandise planning and development information about planning and/or development of a plurality of new products (for example, shoes, bags, belts) on the basis of one concept may be noticed to many and unspecified customers through the Internet 20 by employing the technique mentioned above, and the opinion information may be collected from the customers. In this case, the enterprise planning and developing a plurality of new merchandise can understand the needs of customers according to the opinion information.

Further, manufacture of the new merchandise recording the greatest number of reservations only can be decided, and manufacture of other new merchandise can be stopped, so that the thrilling sensation and interest of planning can be presented to the subscribers.

Thus, since the investigation result of the popularity of the plurality of trial products can be noticed to many and unspecified customers in the stage of planning and/or development, the directivity of planning and/or development can be established in an early stage.

Further, receiving sales reservations, since the selling price of the new merchandise is determined so that the selling price may be lower on the first-come-first-served basis of the sales reservation, it stimulates the desire of customers to buy the new merchandise at lower price, and many reservations will be obtained earlier, so that manufacture of new merchandise can be started earlier.

Further, receiving sales reservations, since the selling price of the new merchandise is determined so that the discount rate may be higher on the first-come-first-served basis of the sales reservation, it stimulates the desire of customers to buy the new merchandise at lower price, and many reservations will be obtained earlier, so that manufacture of new merchandise can be started earlier.

Further, receiving sales reservations, since the selling price of the new merchandise is determined so that the price may be lower as the sales reservation is accepted earlier, it stimulates the desire of customers to buy the new merchandise at lower price, and many reservations will be obtained earlier, so that manufacture of new merchandise can be started earlier.

Further, receiving sales reservations, since the selling price of the new merchandise is determined so that the discount rate may be higher as the sales reservation is accepted earlier, it stimulates the desire of customers to buy the new merchandise at lower price, and many reservations will be obtained earlier, so that manufacture of new merchandise can be started earlier.

Further, receiving sales reservations, since the selling price of the new merchandise is determined so that the price may be lower as the reservation sold-out time from start of acceptance of sales reservation until reaching a specified reservation quantity is shorter, it stimulates the desire of customers to buy the merchandise limited in the number of reservation copies, and to buy the new merchandise at lower price, and many reservations will be obtained earlier, so that manufacture of new merchandise can be started earlier, and moreover the new merchandise may be provided with a premium.

Further, receiving sales reservations, since the selling price of the new merchandise is determined so that the discount rate may be higher as the reservation sold-out time from start of acceptance of sales reservation until reaching a specified reservation quantity is shorter, it stimulates the desire of customers to buy the merchandise limited in the number of reservation copies, and to buy the new merchandise at lower price, and many reservations will be obtained earlier, so that manufacture of new merchandise can be started earlier, and moreover the new merchandise may be provided with a premium.

Further, since the bidding system is intended to determine the selling price of the new merchandise on the basis of the bidding price zone of the greatest number of bids, the customer-oriented selling price can be set, and the new merchandise is presented to the customers at an appropriate selling price.

Further, since the selling price of the new merchandise is determined by the auction unit, the customers have the right to determine the selling price of the new merchandise, and the customers' consciousness of participation in planning and/or development of merchandise can be enhanced, while the effects of current topic and advertisement can be enhanced by the auction.

Further, having sales representative clients accommodated in a sales representative, since the information about reservation is transmitted to the sales representative clients through the network, choices of method purchase for customers are increased, and the convenience for customers is enhanced.

Further, since the customer is allowed to select a desired customized component among the plurality of customized components when reserving the sale, and the customized new merchandise is sold, the customer's preference is carefully satisfied, and the customer comes to have the affection of one's own original merchandise.

Further, receiving votes of naming of new merchandise by the naming voting unit, since the determined name is noticed to many and unspecified customers, and the "godfather" of the merchandise is also the customer, the customers' consciousness of participation in planning and/or development of merchandise is enhanced, and the psychological distance between the new merchandise and customers can be shortened.

Further, the opinion information of customers about the plurality of new merchandise on the basis of one concept is interactively collected through the network, and the merchandise information suited to the needs of customers on the basis of the opinion information is noticed, and therefore needs of customers about the plurality of new merchandise being totally coordinated can be fed back to development of new merchandise.

Further, since the investigation result of the popularity of the plurality of trial products can be noticed to many and unspecified customers, the directivity of planning and/or development can be established in an early stage.

Further, since the profile information about the subscribers is noticed, the tendency of the subscribers having already reserved the new merchandise can be recognized by the customers, and the material for judging whether or not to buy can be presented to the customers.

The invention has been described herein about the first and second embodiments while referring to the accompanying drawings, but it must be noted that the specific structural examples are not limited to the first and second embodiments alone, but that changes and modifications within the scope of the invention are all included in the scope of the invention. For example, in the first and second embodiments, the merchandise planning and development program for realizing the merchandise planning and development may be recorded in a computer-readable recording medium 300 shown in FIG. 50, and the merchandise planning and development program recorded in the recording medium 300 may be read in a computer 200 shown in the diagram, and the merchandise planning and development may be conducted by executing it.

Figure 50:
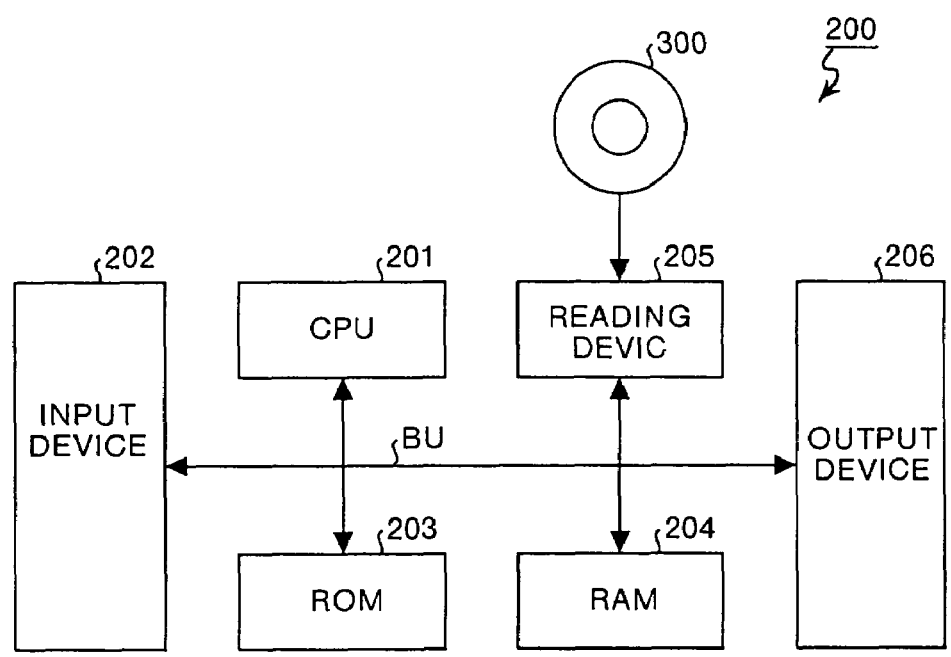
FIG. 50 is a block diagram showing the configuration of modified examples of the first and second embodiments.

The computer 200 shown in FIG. 50 comprises a CPU 201 for executing the merchandise planning and development program, an input device 202 such as keyboard and mouse, a ROM (Read Only Memory) 203 for storing various data, a RAM (Random Access Memory) 204 for storing operation parameters, a reading device 205 for reading the merchandise planning and development program from the recording medium 300, and output device 206 such as display and printer, and a bus BU for connecting the parts.

The CPU 201 reads in the merchandise planning and development program stored in the recording medium 300 through the reading device 205, and executes this merchandise planning and development program, so that the process necessary for the merchandise planning and development is executed. The recording medium 300 includes optical disk, floppy disk, hard disk, and other portable recording medium, and also a transfer medium for recording and storing data temporarily such as the network.

The first and second embodiments refer to an example of merchandise planning and development by business partnership between the merchandise maker 1 and the publisher 2, but the merchandise may be planned and developed by one party only. Further, the functions of the WWW server 33, news server 35, and mail server 61 shown in FIG. 3 and FIG. 24 may be realized by only one server. Further, planning and development of the watches are narrated, but the applied merchandise is not limited to watches, but any other merchandise is included in the scope of the invention.

As explained above, according to the merchandise planning and development system and method of this invention, the opinion information of customers is interactively collected through the network, and the merchandise information suited to the needs of customers on the basis of the opinion information is noticed, and therefore differentiation of merchandise can be expressed, and versatile needs of individual customers can be fed back to development of new merchandise.

Further, the trial product information suited to the needs of customers on the basis of opinion information is noticed through the network. Accordingly, the trial products can be manufactured the plurality of times, and the needs of customers can be appropriately fed back to development of new merchandise.

Further, the popularity of the plurality of trial products is investigated in the stage of planning and/or development by an electronic technique. Accordingly, the needs of customers can be understood promptly and easily on the basis of the investigation result.

Further, the investigation result of the popularity of the plurality of trial products can be noticed to many and unspecified customers in the stage of planning and/or development. Accordingly, the directivity of planning and/or development can be established in an early stage.

Further, the opinion information of customers can be collected by the highly interactive electronic bulletin board system, and the merchandise information suited to the needs of customers on the basis of the opinion information is noticed. Accordingly, differentiation of merchandise can be expressed, and versatile needs of individual customers can be fed back to development of new merchandise.

Further, the opinion information of customers can be collected by the highly interactive electronic mail system, and the merchandise information suited to the needs of customers on the basis of the opinion information is noticed. Accordingly, differentiation of merchandise can be expressed, and versatile needs of individual customers can be fed back to development of new merchandise.

Further, the opinion information of customers can be collected on the basis of the results of the highly interactive electronic inquiry, and the merchandise information suited to the needs of customers on the basis of the opinion information is noticed. Accordingly, differentiation of merchandise can be expressed, and versatile needs of individual customers can be fed back to development of new merchandise.

Further, the selling price of the new merchandise is determined so that the price may be lower in proportion to the increase in the sales reserved quantity. Accordingly, excessive stock is not needed, and the service quality to the customers is enhanced at low cost.

Further, when accepting reservations, the selling price of the new merchandise is determined so that the price may be lower on the first-come-first-served basis of the sales reservation. Accordingly, it stimulates the desire of customers to buy the new merchandise at lower price, and many reservations will be obtained earlier, so that manufacture of new merchandise can be started earlier.

Further, when accepting reservations, the selling price of the new merchandise is determined so that the discount rate may be higher on the first-come-first-served basis of the sales reservation. Accordingly, it stimulates the desire of customers to buy the new merchandise at lower price, and many reservations will be obtained earlier, so that manufacture of new merchandise can be started earlier.

Further, when accepting reservations, the selling price of the new merchandise is determined so that the price may be lower as the sales reservation is accepted earlier. Accordingly, it stimulates the desire of customers to buy the new merchandise at lower price, and many reservations will be obtained earlier, so that manufacture of new merchandise can be started earlier.

Further, when accepting reservations, the selling price of the new merchandise is determined so that the discount rate may be higher as the sales reservation is accepted earlier. Accordingly, it stimulates the desire of customers to buy the new merchandise at lower price, and many reservations will be obtained earlier, so that manufacture of new merchandise can be started earlier.

Further, when accepting reservations, the selling price of the new merchandise is determined so that the price may be lower as the reservation sold-out time from start of acceptance of sales reservation until reaching a specified reservation quantity is shorter. Accordingly, it stimulates the desire of customers to buy the merchandise limited in the number of reservation copies, and to buy the new merchandise at lower price, and many reservations will be obtained earlier, so that manufacture of new merchandise can be started earlier, and moreover the new merchandise may be provided with a premium. Further, when accepting reservations, the selling price of the new merchandise is determined so that the discount rate may be higher as the reservation sold-out time from start of acceptance of sales reservation until reaching a specified reservation quantity is shorter. Accordingly, it stimulates the desire of customers to buy the merchandise limited in the number of reservation copies, and to buy the new merchandise at lower price, and many reservations will be obtained earlier, so that manufacture of new merchandise can be started earlier, and moreover the new merchandise may be provided with a premium.

Further, the bidding system is intended to determine the selling price of the new merchandise on the basis of the bidding price zone of the greatest number of bids, the customer-oriented selling price can be set, and the new merchandise is presented to the customers at an appropriate selling price.

Further, the selling price of the new merchandise is determined by the auction unit. Accordingly, the customers can decide the selling price of the new merchandise, and the customers' consciousness of participation in planning and/or development of merchandise can be enhanced, while the effects of current topic and advertisement can be enhanced by the auction.

Further, having sales representative clients accommodated in a sales representative, since the information about reservation is transmitted to the sales representative clients through the network, choices of method purchase for customers are increased, and the convenience for customers is enhanced.

Further, the customer is allowed to select a desired customized component among the plurality of customized components when reserving the sale, and the customized new merchandise is sold. Accordingly, the customer's preference is carefully satisfied, and the customer comes to have the affection of one's own original merchandise.

Further, receiving votes of naming of new merchandise by the naming voting unit, the determined name is noticed to many and unspecified customers, and the "godfather" of the merchandise is also the customer. Accordingly, the customers' consciousness of participation in planning and/or development of merchandise is enhanced, and the psychological distance between the new merchandise and customers can be shortened.

According to the merchandise planning and development system and method of this invention, the opinion information of customers about the plurality of new merchandise on the basis of one concept is interactively collected through the network, and the merchandise information suited to the needs of customers on the basis of the opinion information is noticed, and therefore needs of customers about the plurality of new merchandise being totally coordinated can be fed back to development of new merchandise.

According to the merchandise planning and development system and method of this invention, after noticing the merchandise information of a plurality of trial products, since the popularity is investigated by an electronic technique, the needs of customers can be understood promptly and easily on the basis of the investigation result.

Further, the investigation result of the popularity of a plurality of trial products or merchandise can be noticed to many and unspecified customers. Accordingly, the directivity of planning and/or development can be established in an early stage.

Further, the profile information about the subscribers is noticed. Accordingly, the tendency of the subscribers having already reserved the new merchandise can be recognized by the customers, and the material for judging whether or not to buy can be presented to the customers.

Further, manufacture of the new merchandise recording the greatest number of reservations only can be continued, and manufacture of other new merchandise can be stopped. Accordingly, the thrilling sensation and interest of planning can be presented to the subscribers.

According to the computer-readable recording medium of this invention, the merchandise planning and development method of this invention can be realized on a computer.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A merchandise planning and development method, comprising:
    a merchandise planning information notice step of informing many and unspecified customers of merchandise planning and development information relating to design specifications of a trial product of new merchandise in a development period, through the Internet, and until before the trial product of the new merchandise is manufactured;
    a displaying step of displaying, on a display of a customer client the merchandise planning and development information including a preview design of an image of the trial product received through the Internet; and
    a step of displaying an inquiry input screen on the display of the customer client after displaying the preview design of the image of the trial product;
    receiving input opinion information based on the displayed merchandise planning and development information in the development period of the new merchandise, prior to manufacture of the trial product of the new merchandise,
    wherein the received input opinion information is not on actual use of the new merchandise by the customers, but on the merchandise planning and development information displayed on the display of the customer client, and,
    wherein, when the opinion information is input by the customers, the method further includes:
        an opinion information collecting step of collecting the received opinion information input by the customers, through the Internet;
        a drafting step of drafting an improved design of the trial product of the new merchandise using a computer-aided design (CAD) device, based on an improved design and specification of the trial product of the new merchandise determined according to an analysis of the opinion information collected; and
        a merchandise information notice step of informing the customers of information on the improved design of the trial product of the new merchandise, through the Internet.

2. The merchandise planning and development method according to claim 1, further comprising:
    a trial product information notice step of informing said many and unspecified customers of the trial product information suited to the needs of the customers according to the opinion information through the Internet,
    wherein the opinion information collecting step collects the opinion information of the customers looking up the trial product information in addition to the merchandise planning information.

3. The merchandise planning and development method according to claim 2, further comprising:
    a trial product popularity investigation step of investigating the popularity of each trial product corresponding to the information of the plurality of trial products, when the trial product information notice step informs the customers of information of a plurality of trial products, by an electronic technique.

4. The merchandise planning and development method according to claim 3, further comprising:
a trial product popularity investigation result notice step of informing said many and unspecified customers of investigation results of the trial product popularity investigation step through the Internet.

5. The merchandise planning and development method according to claim 1, further comprising:
a sales booking step of accepting sales reservations of new merchandise to be released corresponding to the merchandise information from said many and unspecified customers through the Internet; and
a selling price determining step of determining the selling price of the new merchandise so that the selling price may be lower in proportion to an increase in a sales reserved quantity depending on the sales reserved quantity of the new merchandise.

6. The merchandise planning and development method according to claim 5, wherein the sales booking step transmits information about reservations to sales representative clients provided at a sales representative through the Internet, while the sales representative sells the new merchandise according to the reservation information.

7. The merchandise planning and development method according to claim 5, further comprising:
a customized component display step of displaying a plurality of types of customized components different in design about the components for composing the new merchandise to said many and unspecified customers, the customized component display step further displaying a reservation acceptance screen for allowing the customers to input information on reservations of the new merchandise, through the Internet; and
a customized component selecting step of allowing customers to select desired customized components from the plurality of types of customized components at a time of booking,
wherein the sales booking step accepts the merchandise adopting the selected customized component as new customized merchandise.

8. The merchandise planning and development method according to claim 5, further comprising:
a naming voting step of allowing said many and unspecified customers to vote for naming of the new merchandise through the Internet; and
a naming notice step of informing said many and unspecified customers of the naming determined based on a voting result of the naming voting step through the Internet.

9. The merchandise planning and development method according to claim 1, further comprising:
a sales booking step of accepting sales reservations of new merchandise to be released corresponding to the merchandise information from said many and unspecified customers through the Internet; and
a selling price determining step of determining a selling price of the new merchandise in gradual steps so that the selling price may be lower on a first-come-first-served basis of the sales reservations.

10. The merchandise planning and development method according to claim 9, wherein the selling price determining step firstly sets a discount rate so that the discount rate of a fixed price may be higher in gradual steps on the first-come-first-served basis of the sales reservations, and the selling price determining step secondly determines the selling price according to the discount rate.

11. The merchandise planning and development method according to claim 9, wherein the sales booking step transmits information about reservations to sales representative clients provided at a sales representative through the Internet, while the sales representative sells the new merchandise according to the reservation information.

12. The merchandise planning and development method according to claim 9, further comprising:
a customized component display step of displaying a plurality of types of customized components different in design about the components for composing the new merchandise to said many and unspecified customers, the customized component display step further displaying a reservation acceptance screen for allowing the customers to input information on reservations of the new merchandise, through the Internet; and
a customized component selecting step of allowing the customers to select desired customized components from the plurality of types of customized components at a time of booking,
wherein the sales booking step accepts the merchandise adopting the selected customized component as new customized merchandise.

13. The merchandise planning and development method according to claim 9, further comprising:
a naming voting step of allowing said many and unspecified customers to vote for naming of the new merchandise through the Internet; and
a naming notice step of informing said many and unspecified customers of the naming determined based on a voting result of the naming voting step through the Internet.

14. The merchandise planning and development method according to claim 1, further comprising:
a sales booking step of accepting sales reservations of new merchandise to be released corresponding to the merchandise information from said many and unspecified customers through the Internet; and
a selling price determining step of determining a selling price of the new merchandise so that the selling price may be lower as the sales reservations are accepted earlier.

15. The merchandise planning and development method according to claim 14, wherein the selling price determining step firstly sets a discount rate so that the discount rate of a fixed price may be higher in gradual steps as the sales reservations are accepted earlier, and the selling price determining step secondly determines the selling price according to the discount rate.

16. The merchandise planning and development method according to claim 14, wherein the sales booking step transmits information about reservation to sales representative clients provided at a sales representative through the Internet, while the sales representative sells the new merchandise according to the reservation information.

17. The merchandise planning and development method according to claim 14, further comprising:
a customized component display step of displaying a plurality of types of customized components different in design about the components for composing the new merchandise to said many and unspecified customers, the customized component display step further displaying a reservation acceptance screen for allowing the customers to input information on reservations of the new merchandise, through the Internet; and a customized component selecting step of allowing the customers to select desired customized components from the plurality of types of customized components at a time of booking, wherein the sales booking step accepts the merchandise adopting the selected customized component as new customized merchandise.

18. The merchandise planning and development method according to claim 14, further comprising:

a naming voting step of allowing said many and unspecified customers to vote for naming of the new merchandise through the Internet; and a naming notice step of informing said many and unspecified customers of the naming determined based on a voting result of the naming voting step through the Internet.

19. The merchandise planning and development method according to claim 1, further comprising:

a sales booking step of accepting sales reservations of new merchandise to be released corresponding to the merchandise information from said many and unspecified customers through the Internet; and a selling price determining step of determining a selling price of the new merchandise so that the selling price may be lower as a reservation sold-out time from a start of acceptance of sales reservations until reaching a specified reservation quantity is shorter.

20. The merchandise planning and development method according to claim 19, wherein the selling price determining step firstly sets a discount rate so that the discount rate of a fixed price may be higher as the reservation sold-out time is shorter, and the selling price determining step secondly determines the selling price according to the discount rate.

21. The merchandise planning and development method according to claim 19, wherein the sales booking step transmits information about reservation to sales representative clients provided at a sales representative through the Internet, while the sales representative sells the new merchandise according to the reservation information.

22. The merchandise planning and development method according to claim 19, further comprising:

a customized component display step of displaying a plurality of types of customized components different in design about the components for composing the new merchandise to said many and unspecified customers, the customized component display step further displaying a reservation acceptance screen for allowing the customers to input information on reservations of the new merchandise, through the Internet; and a customized component selecting step of allowing the customers to select desired customized components from the plurality of types of customized components at a time of booking, wherein the sales booking step accepts the merchandise adopting the selected customized component as new customized merchandise.

23. The merchandise planning and development method according to claim 19, further comprising:

a naming voting step of allowing said many and unspecified customers to vote for naming of the new merchandise through the Internet; and a naming notice step of informing said many and unspecified customers of the naming determined based on a voting result of the naming voting step through the Internet.

24. The merchandise planning and development method according to claim 1, further comprising:

a bidding price collecting step of collecting bidding prices of new merchandise to be released corresponding to the merchandise information from said many and unspecified customers; and a selling price determining step of investigating a distribution of bidding prices based on a result of collection of the bidding price collecting step, and determining a selling price of the new merchandise based on a bidding price zone of a greatest number of bids.

25. The merchandise planning and development method according to claim 1, further comprising:

an auction step of auctioning new merchandise to be released corresponding to the merchandise information through the Internet among said many and unspecified customers; and a selling price determining step of determining a selling price of the new merchandise based on an auction result of the auction step.

26. A merchandise planning and development method, comprising:

a merchandise planning information notice step of informing many and unspecified customers of merchandise planning and development information relating to design specifications of a plurality of trial products of new merchandise on the basis of one concept in a development period through the Internet, and until before the trial products of the new merchandise are manufactured;

a displaying step of displaying, on a display of a customer client the merchandise planning and development information including a preview design of images of the trial products received through the Internet; and a step of displaying an inquiry input screen on the display of the customer client after displaying the preview design of the images of the trial products;

receiving input opinion information based on the displayed merchandise planning and development information in the development period of the new merchandise, prior to manufacture of the trial products of the new merchandise, wherein the received input opinion information is not on actual use of the new merchandise by the customers, but on the merchandise planning and development information displayed on the display of the customer client, and, wherein, when the opinion information is input by the customers, the method further includes:

an opinion information collecting step of collecting the received opinion information input by the customers, through the Internet;

a drafting step of drafting an improved design of the trial products of the new merchandise using a computer-aided design (CAD) device, based on an improved design and specification of the trial products of the new merchandise determined according to an analysis of the opinion information collected; and a merchandise information notice step of informing the customers of information on the improved design of the trial products of the new merchandise, through the Internet.

* * * * *